(12) United States Patent
Todd

(10) Patent No.: US 10,907,721 B2
(45) Date of Patent: Feb. 2, 2021

(54) NON-PREVALENT ORDER RANDOM SPROCKET

(71) Applicant: BorgWarner Inc., Auburn Hills, MI (US)

(72) Inventor: Kevin B. Todd, Freeville, NY (US)

(73) Assignee: BorgWarner Inc., Auburn Hills, MI (US)

(*) Notice: Subject to any disclaimer, the term of this patent is extended or adjusted under 35 U.S.C. 154(b) by 235 days.

(21) Appl. No.: 16/060,432

(22) PCT Filed: Dec. 1, 2016

(86) PCT No.: PCT/US2016/064356
§ 371 (c)(1),
(2) Date: Jun. 8, 2018

(87) PCT Pub. No.: WO2017/100069
PCT Pub. Date: Jun. 15, 2017

(65) Prior Publication Data
US 2018/0363753 A1   Dec. 20, 2018

Related U.S. Application Data

(60) Provisional application No. 62/265,175, filed on Dec. 9, 2015.

(51) Int. Cl.
*F16H 55/30* (2006.01)
(52) U.S. Cl.
CPC ....... *F16H 55/30* (2013.01); *F16H 2055/306* (2013.01)
(58) Field of Classification Search
CPC ...... F16H 55/30; F16H 7/06; F16H 2035/003; B62M 9/08; B62M 2009/002

USPC .................................................. 474/156, 152
See application file for complete search history.

(56) References Cited

U.S. PATENT DOCUMENTS

| | | | | |
|---|---|---|---|---|
| 1,650,449 A | * | 11/1927 | Jaeger | F16H 9/24 474/53 |
| 1,936,117 A | * | 11/1933 | Peschl | F16H 9/00 474/31 |
| 1,963,314 A | * | 6/1934 | Savell | A21B 1/46 198/797 |
| 2,344,757 A | * | 3/1944 | Weisberger | B62M 1/30 74/437 |
| 2,477,441 A | * | 7/1949 | Cole | A63H 33/042 434/401 |

(Continued)

FOREIGN PATENT DOCUMENTS

| | | |
|---|---|---|
| DE | 2014537 | 10/1970 |
| DE | 2338865 | 2/1974 |

(Continued)

OTHER PUBLICATIONS

International Search Report for PCT/US2016/064356 dated Mar. 17, 2017.

(Continued)

*Primary Examiner* — Henry Y Liu
(74) *Attorney, Agent, or Firm* — Brown & Michaels, PC

(57) ABSTRACT

A non-prevalent order random sprocket for an internal combustion engine comprising a pattern of pitch radii, such that the radial variation of the pitch radii excite tensions at non-prevalent orders in a drive system of the internal combustion engine.

14 Claims, 100 Drawing Sheets

(56) References Cited

U.S. PATENT DOCUMENTS

| | | | | |
|---|---|---|---|---|
| 2,941,413 A * | 6/1960 | Huber | F16G 5/20 | 474/250 |
| 3,259,398 A * | 7/1966 | Hattan | B62M 9/08 | 280/236 |
| 3,375,022 A * | 3/1968 | Hattan | B62M 9/08 | 280/238 |
| 3,583,250 A * | 6/1971 | Kongelka | F16H 7/023 | 474/133 |
| 3,752,035 A * | 8/1973 | Cozzy | F41F 1/10 | 89/13.05 |
| 3,752,601 A * | 8/1973 | Karagozian | F04C 14/26 | 417/300 |
| 3,830,212 A * | 8/1974 | Seino | F16H 7/06 | 123/192.2 |
| 3,858,454 A * | 1/1975 | Duff | B65G 23/06 | 198/684 |
| 3,858,457 A * | 1/1975 | Mathues | G05G 1/46 | 74/512 |
| 3,899,932 A * | 8/1975 | Durham | F16H 55/30 | 474/141 |
| 4,036,071 A * | 7/1977 | McKnight | F16H 55/30 | 474/156 |
| 4,168,634 A * | 9/1979 | Griffel | F16H 55/30 | 474/148 |
| 4,181,034 A * | 1/1980 | Daniel | B62M 9/08 | 474/141 |
| 4,193,324 A * | 3/1980 | Marc | B62M 9/06 | 280/260 |
| 4,337,056 A * | 6/1982 | Bruns | F16G 1/28 | 474/153 |
| 4,504,074 A * | 3/1985 | Smith | B62D 7/02 | 280/93.506 |
| 4,515,577 A * | 5/1985 | Cathey | F16H 7/023 | 474/204 |
| 4,522,610 A * | 6/1985 | Nagano | B62M 3/003 | 280/261 |
| 4,526,558 A * | 7/1985 | Durham | B62M 9/10 | 474/152 |
| 4,810,237 A * | 3/1989 | Mantovaara | F16H 9/12 | 474/166 |
| 4,865,577 A * | 9/1989 | Freudenstein | B62M 9/08 | 474/141 |
| 4,913,684 A * | 4/1990 | Mantovaara | B62M 9/06 | 474/12 |
| 4,915,598 A * | 4/1990 | Kubis | F02B 63/06 | 417/380 |
| 4,936,812 A * | 6/1990 | Redmond | F16H 7/16 | 474/141 |
| 5,394,282 A * | 2/1995 | Wada | G11B 15/67568 | 360/85 |
| 5,397,280 A * | 3/1995 | Skurka | F01L 1/02 | 474/156 |
| 5,427,580 A * | 6/1995 | Ledvina | F01L 1/02 | 474/84 |
| 5,437,581 A | 8/1995 | Ledvina et al. | | |
| 5,453,059 A * | 9/1995 | Avramidis | F01L 1/02 | 474/212 |
| 5,490,282 A * | 2/1996 | Dreps | H03M 9/00 | 331/2 |
| 5,492,390 A * | 2/1996 | Kugelmann, Sr. | B60B 19/00 | 301/5.1 |
| 5,549,314 A * | 8/1996 | Sassi | B62M 9/08 | 280/236 |
| 5,551,925 A * | 9/1996 | Mott | F01L 1/02 | 474/228 |
| 5,562,557 A | 10/1996 | Ledvina et al. | | |
| 5,611,744 A * | 3/1997 | Shen | B62M 9/085 | 474/141 |
| 5,683,319 A | 11/1997 | Mott et al. | | |
| 5,772,546 A * | 6/1998 | Warszewski | B62M 9/08 | 474/50 |
| 5,816,967 A | 10/1998 | Ledvina et al. | | |
| 5,846,149 A | 12/1998 | Ledvina et al. | | |
| 5,876,295 A * | 3/1999 | Young | F16H 7/06 | 474/156 |
| 5,882,025 A * | 3/1999 | Runnels | B62M 9/08 | 280/259 |
| 5,935,046 A * | 8/1999 | Maresh | A63B 22/0605 | 482/52 |
| 5,971,721 A * | 10/1999 | Carstensen | F04B 17/03 | 417/362 |
| 5,976,045 A * | 11/1999 | Young | F16H 55/30 | 474/160 |
| 6,019,692 A * | 2/2000 | Kojima | F16F 15/1442 | 474/87 |
| 6,050,916 A * | 4/2000 | Hunkert | F01L 1/022 | 474/153 |
| 6,155,943 A * | 12/2000 | Ledvina | F16H 7/06 | 160/152 |
| 6,189,639 B1 * | 2/2001 | Fuse | B62M 9/00 | 180/231 |
| 6,213,905 B1 * | 4/2001 | White | F16H 7/06 | 474/148 |
| 6,932,037 B2 * | 8/2005 | Simpson | F01L 1/34409 | 123/90.17 |
| 7,044,875 B2 | 5/2006 | Gajewski | | |
| 7,125,356 B2 * | 10/2006 | Todd | F16H 55/30 | 474/152 |
| 7,232,391 B2 | 6/2007 | Gajewski | | |
| 7,654,925 B2 * | 2/2010 | Todd | F16H 55/30 | 474/152 |
| 7,691,020 B2 * | 4/2010 | Sakura | F16H 55/30 | 474/156 |
| 7,901,312 B2 | 3/2011 | Ogo et al. | | |
| 3,066,602 A1 | 11/2011 | Todd | | |
| 8,062,158 B2 * | 11/2011 | Nakano | F16H 55/30 | 474/141 |
| 8,066,601 B2 * | 11/2011 | Nakano | F02B 67/06 | 474/141 |
| 2002/0142873 A1 * | 10/2002 | Oser | B66D 3/18 | 474/141 |
| 2002/0169043 A1 * | 11/2002 | Liu | B62M 9/08 | 474/141 |
| 2003/0087714 A1 * | 5/2003 | Todd | F16H 55/30 | 474/156 |
| 2003/0104886 A1 * | 6/2003 | Gajewski | F01L 1/022 | 474/87 |
| 2006/0154766 A1 * | 7/2006 | Lacy | F16H 55/36 | 474/148 |
| 2008/0312019 A1 * | 12/2008 | Ogo | F16H 55/08 | 474/212 |
| 2010/0137085 A1 * | 6/2010 | Nakano | F16H 55/30 | 474/155 |
| 2010/0167857 A1 * | 7/2010 | Todd | F16H 55/14 | 474/156 |
| 2010/0203992 A1 * | 8/2010 | Botez | F16H 7/06 | 474/156 |
| 2010/0227720 A1 * | 9/2010 | Mehta | F16H 55/30 | 474/155 |

FOREIGN PATENT DOCUMENTS

| | | |
|---|---|---|
| DE | 3739336 | 11/1989 |
| DE | 4316877 | 11/1993 |
| DE | 4331482 | 3/1994 |
| DE | 4241231 | 11/1994 |
| DE | 19520508 | 12/1996 |
| DE | 19649397 | 6/1998 |
| DE | 19812939 | 1/1999 |
| DE | 20008042 | 9/2000 |
| EP | 0066294 | 12/1982 |
| EP | 1065408 A2 | 1/2001 |
| EP | 1277987 A2 | 1/2003 |
| EP | 1448916 | 8/2006 |
| EP | 1722131 A2 | 11/2006 |
| GB | 1175505 | 12/1969 |
| JP | 63067452 | 3/1988 |
| JP | 63088368 | 4/1988 |

(56) References Cited

FOREIGN PATENT DOCUMENTS

| | | |
|---|---|---|
| JP | 63097830 | 4/1988 |
| JP | 63106453 | 5/1988 |
| JP | 63145858 | 6/1988 |
| JP | HEI95538 | 6/1989 |
| JP | 1244116 | 9/1989 |
| JP | 1288657 | 11/1989 |
| JP | 3297792 | 12/1991 |
| JP | 4039444 | 2/1992 |
| JP | HEI4165148 | 6/1992 |
| JP | 5086892 | 4/1993 |
| JP | 5164191 | 6/1993 |
| JP | 6159037 | 6/1994 |
| JP | 6162635 | 6/1994 |
| JP | 6239284 | 8/1994 |
| JP | 8014058 | 1/1996 |
| JP | 10176506 | 6/1998 |
| JP | 10266814 | 10/1998 |
| JP | 10266868 | 10/1998 |
| JP | 10274052 | 10/1998 |
| JP | 2001032894 | 2/2001 |
| JP | 2001304374 | 10/2001 |
| JP | 2001348809 | 12/2001 |
| JP | 2001349416 | 12/2001 |
| JP | 2003184996 | 7/2003 |
| JP | 2005510677 A | 4/2005 |
| JP | 2008309171 A | 12/2008 |
| WO | 1998029673 | 7/1998 |
| WO | 030461413 A1 | 6/2003 |
| WO | 2008156483 A1 | 12/2008 |

OTHER PUBLICATIONS

A Study on Timing Belt Noise (How to Reduce Resonant Noise) Conference Tille: Proceedings of the 1989 International Power Transmission and Gearing Conference: New Technologies for Power Transmissions of the 90's; Chicago, Illinois, Apr. 25, 1989.
Analysis of Nonlinear Vibration of Timing Belt: (Under Meshing Impact and Varying Tension by Eccentric Pulley) Author. Shaochang Li; Hideyuki Otaki; Keiichi Watanuki; Conference Tille: Proceedings of the 1995 Joint ASME/JSME Pressure Vessels and Piping Conference.
Vibration and Control of Axially Moving Belt System. 1st Report, Experimental Analysis; Authors: Takano Koetsu ; Keiji Watanabe; Osami Matsushita; Masanori Kitano; Nippon Kikai Gakkai Ronbunshu. C ( Transactions of the Japan Sociey of Mechanical Engineers. C), 1998, vol. 64, No. 618, pp. 421-428, Fig. 20, Tbl. 6, Ref. 8 (w/ English translation).
Vibration and Control of Axially Moving Belt System, 3rd Report, Analysis by Parametric Excitation; Authors: Hiroki Okubo; Kouetsu Takano; osami Matusushita; Keiji Watanabe; Yoshi Hirase Nippon Kikai Gakkai Ronbunshu. C ( Transactions of the Japan Society of Mechanical Engineers. C), vol. 65, No. 635, pp. 2708-2712 (w/ English translation).
Life Analysis Of Water Pump Bearing For Cars Considering Shafi Rigidity ; Koyo Eng J, 1989, No. 136, p. 51-63, Fig. 9, Tbl. 1, Ref. 5 (English abstract only).
Analysis of Nonlinear Oscillations of the Timing Belt (1st Report, Regions of Resonance Of the Timing Bell); Author-Li, Shao-chang; Otaki, Hideyuki; Ishikawa, Yoshio; Watanuki, Keiichi; Nippon Kikai Gakkai Ronbunshu, C Hen/ Transactions of the Japan Society of Mechanical Engineers, Pare C v 59 n 568 Dec. 1993. P. 3902-3906 (English abstract only).
Parametric Excitation of Timing Belt; Author: Osaki Eiki; Nippon Hakuyo Kikan Gakkaishi (Journal of the Marine Engineering Society in Japan); 1993, vol. 28, No. 5, pp. 320-325 (English abstract only).
Audible Noise Produced by the Sporadic Changes of Tensile Forces in a Belt Driven System; Author: C. Ozturk; (Journal of Low Frequency Noise & Vibration); 1995, V14, N4, pp. 193-211 (English abstract only).
Vibration of Timing Belt Subjected to Fluctuations of Tension; Authors: Osaki Eiki, Miyoshi Yoshihiro; Koga Katsuyuki (Journal of National Fisheries University) 1996, vol. 45, No. 2; p. 79-85 (English abstract only).
Vibration and Control of Axially Moving Belt System. Effect of Inclined Angle; Authors: Hirase Yoshi, Takano Kouetsu; Okubo Hiroki; Matsushita Osami; Watanabe Keiji. Nippon Kikai Gakkai Kikai Rikigaku, Keisoku Seigyo Koen Ronbunshu, 1998, vol. 1998, No. B, pp. 317-320 (English abstract only).
Vibration and Control of Axially Moving Belt System. Effect of Inclined Angle; Authors: Hirase Yoshi, Takano Kouetsu; Okubo Hiroki; Matsushita Osami; Watanabe Keiji. Nippon Kikai Gakkai Kikai Rikigaku, Keisoku Seigyo Koen Ronbunshu, 1999, vol. 1999, No. A, pp. 443-446 (English abstract only).
Study on a Servo Control System Using Timing Belt Drives; Authors: Lee H. Masutomi Tatsuaki, Takesue Naoyki; Sakaguchi Masamichi; Furusho Junji; Tanaka Hideaki; (Proceedings of the Annual Conference of the Institute of Systems Control and Informaton Engineers), 200, vol. 44th pp. 625-626 (English abstract only).
Vibration and Control Axially Moving Belt System, 4th Report, Effect of Inclined Angle by Experiment; Authors: Takano Koetsu; Hirase Yoshi; Okubo Hiroki; Matsushita Osami; Watanabe, Keiji, (Nippon Kikai Gakkai Ronbunshu. C) (Transactions of the Japan Society of Mechanical engineers. C), 2000, vol. 66 No. 645, pp. 1439-1444 (English abstract only).
Vibration Induced in Driving Mechanism of Photoconductor Drum in Color Laser Printer; Author: Kawamoto Hiroyuki; Watanabe Yosuke; Nippon Kikai Gakkai Kikai Rikigaku, Keisoku Seigyo Koen Ronbunshu, 2000, vol. 2000, No. Pl. 4, pp. 1028-1031(English abstract only).
Vibration and Control of Axially Moving Belt System: Analysis and Experiment by Parametric Excitation; Authors: H. Okubo; K. Takano; 0. Matsushita; K. Watanabe; Y. Hirase (Journal of Vibration and Control), 2000, v6, N4 (May) pp. 589-605.
Primary and Parametric Non-Linear Resonances of a Power Transmission Belt: Experimental and Theorectical Analysis; Author: F. Pellicano; A. Freglent; A. Bertuzzi; F. Verstroni (Journal of Sound and Vibration) v. 244 n. 4 pp. 669-684, Jul. 19, 2001 (English abstract only).
Nonlinear Vibration Analysis of Running Viscoelastic Belts; Author: YS Choi; 5th Internet Conference on Vibration Engineering; Proc., Nanjing, CN, Sep. 18-20, 2002 (English abstract only).
Base and Application of Timing Bell, Primary Part 5. Rotation Transmitting Error (Case of No Load); Author: Koyama Tomio; Kagotani Masanori; Kikai no Kenkyu (Science of Machine), 2003, vol. 55, No. 2, pp. 269-278 (English abstract only).
Parametric Instability of Belts: Theory and Experiments; Authors: F. Pellicano (Reprint); G. Catellani; A. Freglent (Computers & Structures) 2004, v82, N1 (Jan.), pp. 81-91; ISSN: 0045-7949; Jan. 2004 (English abstract only).
Vibration and Control of Axially Moving Belt System: Analysis and Experiment by Parametric Excitation; Authors: H. Okubo (Reprint); K. Takano; 0. Matsushita; K. Watanabe; Y. Hirase (Journal of Vibration and Control), Sage Publications, Inc. May 2000 (English abstract only).
EPO search report from EP Patent Application No. 02257611, dated Dec. 6, 2004.
U.S. Pat. No. 515,449, Feb. 27, 1894, Scovell.
U.S. Pat. No. 530,058, Nov. 27, 1984, Schaum et al.
U.S. Pat. No. 596,289, Dec. 28, 1987, Smith.
U.S. Pat. No. 611,170, Sep. 20, 1898, Howard.
U.S. Pat. No. 571,086, Nov. 10, 1896, Fulton et al.
U.S. Pat. No. 613,756, Nov. 8, 1898, Buddle.

* cited by examiner

Fig. 3a

NON-PREVALENT ORDER RANDOM SPROCKET

BACKGROUND OF THE INVENTION

Field of the Invention

The invention pertains to the field of sprockets. More particularly, the invention pertains to sprocket and chain systems having reduced engagement noise.

Description of Related Art

FIG. 1 shows an example of a chain drive system for a typical engine—for example, this arrangement might be used in an inline four-cylinder diesel engine. There are five sprockets—sprocket 30 is on the crankshaft, sprocket 31 is an idler which is driven by the crankshaft sprocket 30 and drives the exhaust camshaft sprocket 33 and intake camshaft sprocket 34. Sprocket 32 drives a fuel pump. There are two chains—fuel pump chain 10, made up of strands 1-3, is driven by the crankshaft sprocket 30 and drives idler sprocket 31 and fuel pump sprocket 32, and cam timing chain 20, made up of strands 4-6, is driven by idler sprocket 31 and drives intake camshaft sprocket 34 and exhaust sprocket 33.

A chain or toothed belt drive is subjected to oscillating excitations. For example, a chain or toothed belt drive can be used between an engine crank shaft and cam shaft. The oscillating excitation could be the torsional vibrations of the crank shaft and/or fluctuating torque loads from the valve train and/or a fuel pump.

Random sprockets are sometimes used on chain drives to reduce chain engagement noise. Traditional random sprockets use a fixed "random" pattern of pitch radius variation to vary the timing of engagement. This breaks up the engagement noise so it is not an objectionable pure tone. With a nonrandom sprocket, engagement noise is all concentrated at engagement frequency or engagement order. With a random sprocket the engagement noise is spread out over many orders—predominantly at low orders and orders around engagement order. While it reduces objectionable noise, the radial variation of the random sprocket creates oscillating tensions in the chain drive—mostly at low orders (several times per sprocket revolution).

Most chain drives have one or more torsional resonance frequencies. If the tension fluctuations caused by the random sprocket are at an order that has a frequency at, or near, a chain drive torsional resonance frequency, the tension fluctuations will be amplified—possibly causing substantial variation in the chain tensions.

If the chain drive has no external causes of tension variation (such as crank TVs, cam torque, fuel pump torque), the oscillating tensions caused by the random sprocket will add to the mean tension to increase the overall maximum tension. In this case a random sprocket will always increase maximum chain tensions. If the maximum tension remains within the acceptable range for the chain, this may not be a problem.

If the chain drive has external causes of tension variation, it is likely that the random sprocket will create tension variations at orders where tension variations already exist from the external sources. In many cases this will create tensions that will add and increase the overall maximum tensions. Using existing random sprocket methods almost always results in an increase in the overall maximum chain tension. In many cases the tension is increased beyond the acceptable tension level for the chain. For this reason, it is not possible to use traditional random sprockets on many chain drives with external sources of tension variation such as engine cam or balance shaft drives.

Tension reducing random sprockets were developed by defining the random sprocket radial variation pattern to create tensions at one or two specific orders. The tensions created by the tension reducing random sprocket are phased to be opposite tensions caused by external sources of tension variation. This results in a cancellation of tensions and a reduction in overall maximum tension levels. Because tension reducing random sprockets use uniform repeating patterns, and amplitudes must be selected to generate the correct tension levels, tension reducing random sprockets often do not have much effect on engagement noise.

A tension reducing sprocket uses orders prominent in the chain tensions to create tension fluctuations that are phased opposite the tensions caused by the oscillating excitations so that the tensions at those orders cancel or partially cancel at the chain or belt drive resonance (when the overall maximum tensions are dominated by one of these orders) The problem is how to design a random sprocket for sufficient noise reduction while limiting the increase in overall chain tensions.

SUMMARY OF THE INVENTION

The invention discloses a random sprocket or pulley with varying pitch radius intended to reduce the engagement noise of the drive. The random sprocket or pulley uses a radial variation pattern made of orders that are not already prominent in the chain tension, which are caused by the oscillating excitations.

The chain or toothed belt drive with oscillating excitations and torsional resonance creates oscillating tensions at specific orders. These orders should be avoided in the random sprocket radial variation pattern to minimize the increase in chain tension caused by the random pattern.

Using a random sprocket with radial variation made up of orders not prominent in the chain tension reduces tensions caused by the random sprocket exciting the drive resonance at the same time as tensions caused by the oscillating excitations, minimizing the increase in chain tension caused by the random sprocket.

BRIEF DESCRIPTION OF THE DRAWING

Figure 3A:
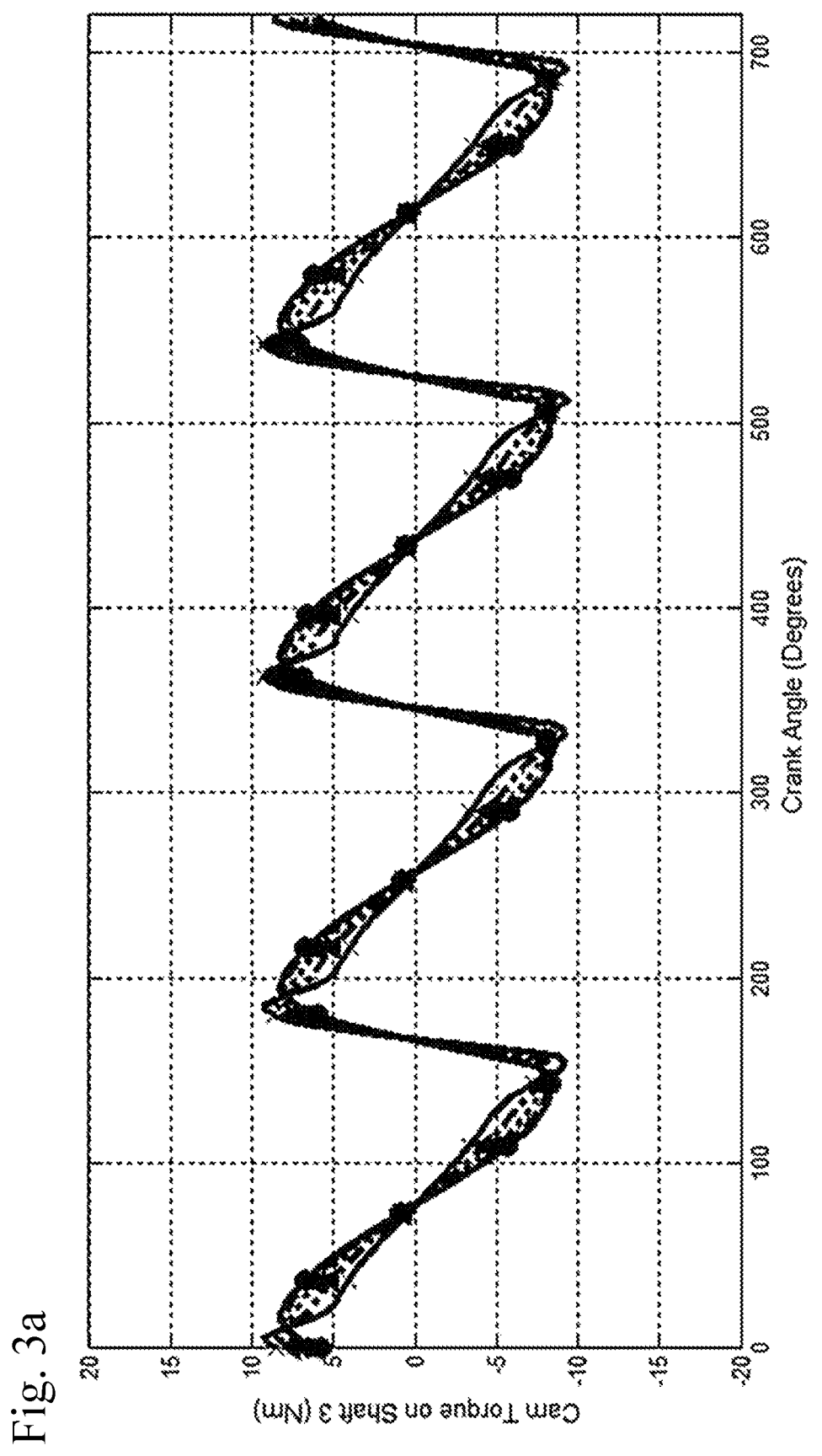

FIGS. 3a-3c show graphs of excitations from exhaust cam torques in the drive of FIG. 1.

FIG. 26 shows the legend for FIGS. 2a, 5a, 7a, 8a, 9a, 10a, 11a, and 12a.

FIG. 29 shows the legend for FIGS. 6a, 13a, 14a, 15a, 16a, 17a, 19a, 20a, 21a, and 22a.

FIG. 31 shows the legend for FIGS. 3a and 4a.

DETAILED DESCRIPTION OF THE INVENTION

This invention addresses the problem of increasing chain tensions by creating the random pattern using only orders that are not prevalent in the chain tensions. By doing this the interaction between tensions caused by the random sprocket and tensions caused by external sources is minimized. In addition, the tensions caused by the random sprocket will not excite resonances at the same time as tensions caused by external sources. Furthermore, the orientation of the radial variation on the random sprocket is no longer very important (because it does not add or cancel orders caused by external sources). It is possible to combine this method with a tension reducing random sprocket. This can be done by first defining the orders, amplitudes and phasing for a tension reducing random sprocket. Then other orders not already prominent in the chain tension can be added to further improve engagement noise reduction with minimal increase in overall maximum tensions.

The chain or belt drive could have many configurations and a variety of oscillating excitations. What is important is that the drive is subject to oscillating excitations and the drive has a torsional resonance that can be excited by these excitations. There are many possible radial variation patterns that could be used. What is important is that the pattern does not contain orders that are prominent in the chain tensions. Or, if it does contain orders that are prominent in the chain tensions, they are selected with proper amplitude and orientation to cancel tensions caused by the oscillating excitations.

This concept could be combined with the radial variation of a tension reducing sprocket to reduce both noise and maximum overall chain tensions.

Figure 3B:
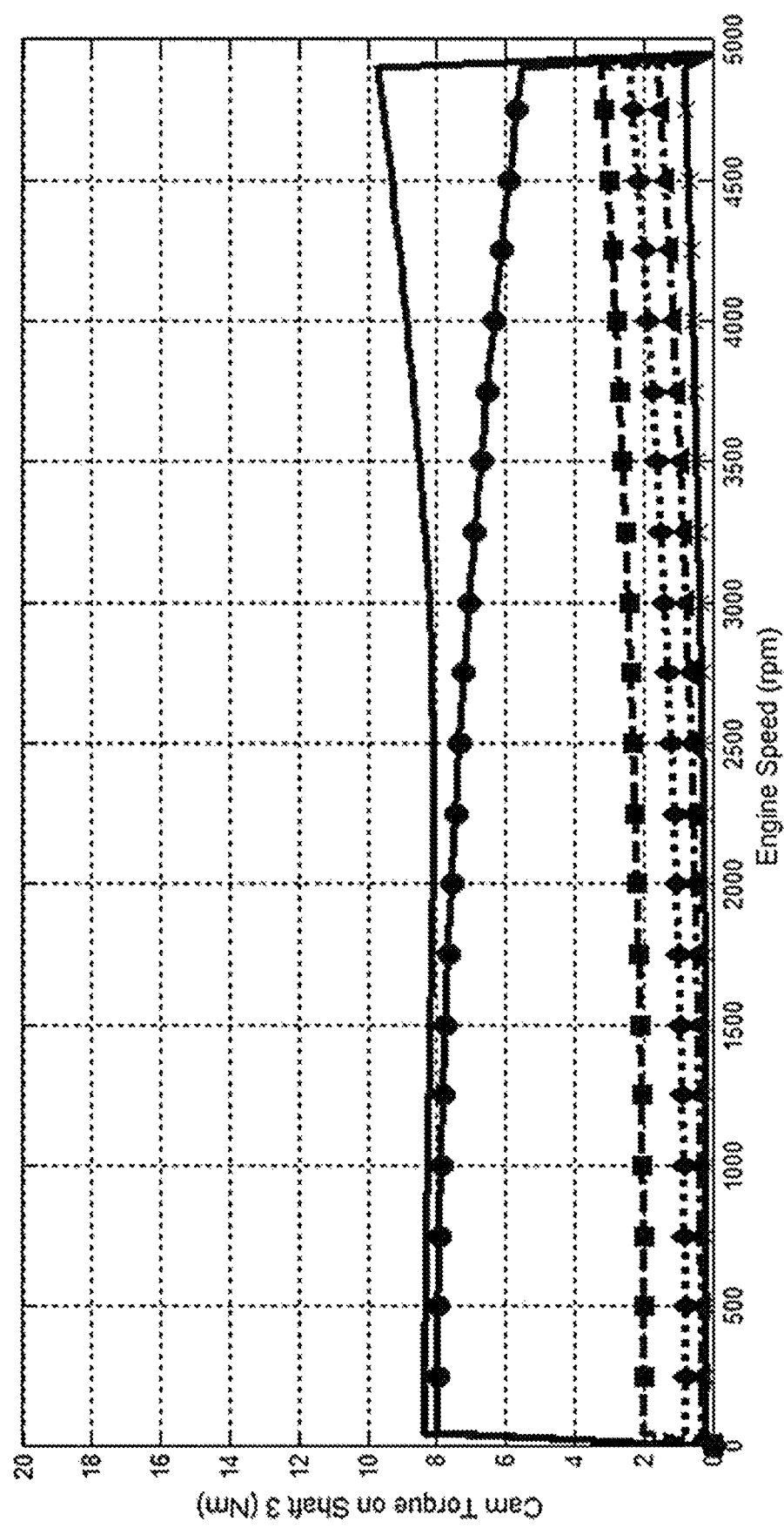
Figure 3C:
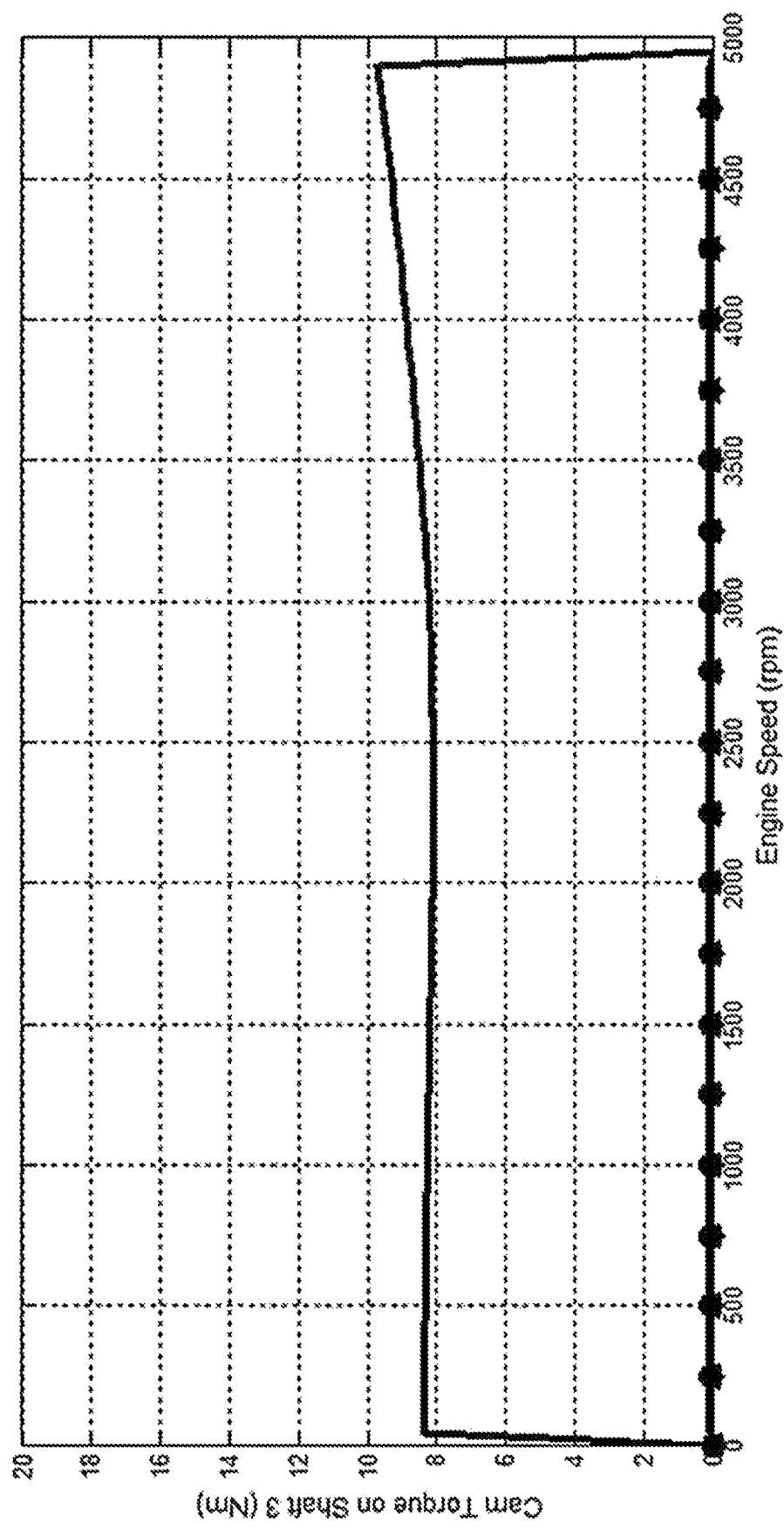
Figure 4A:
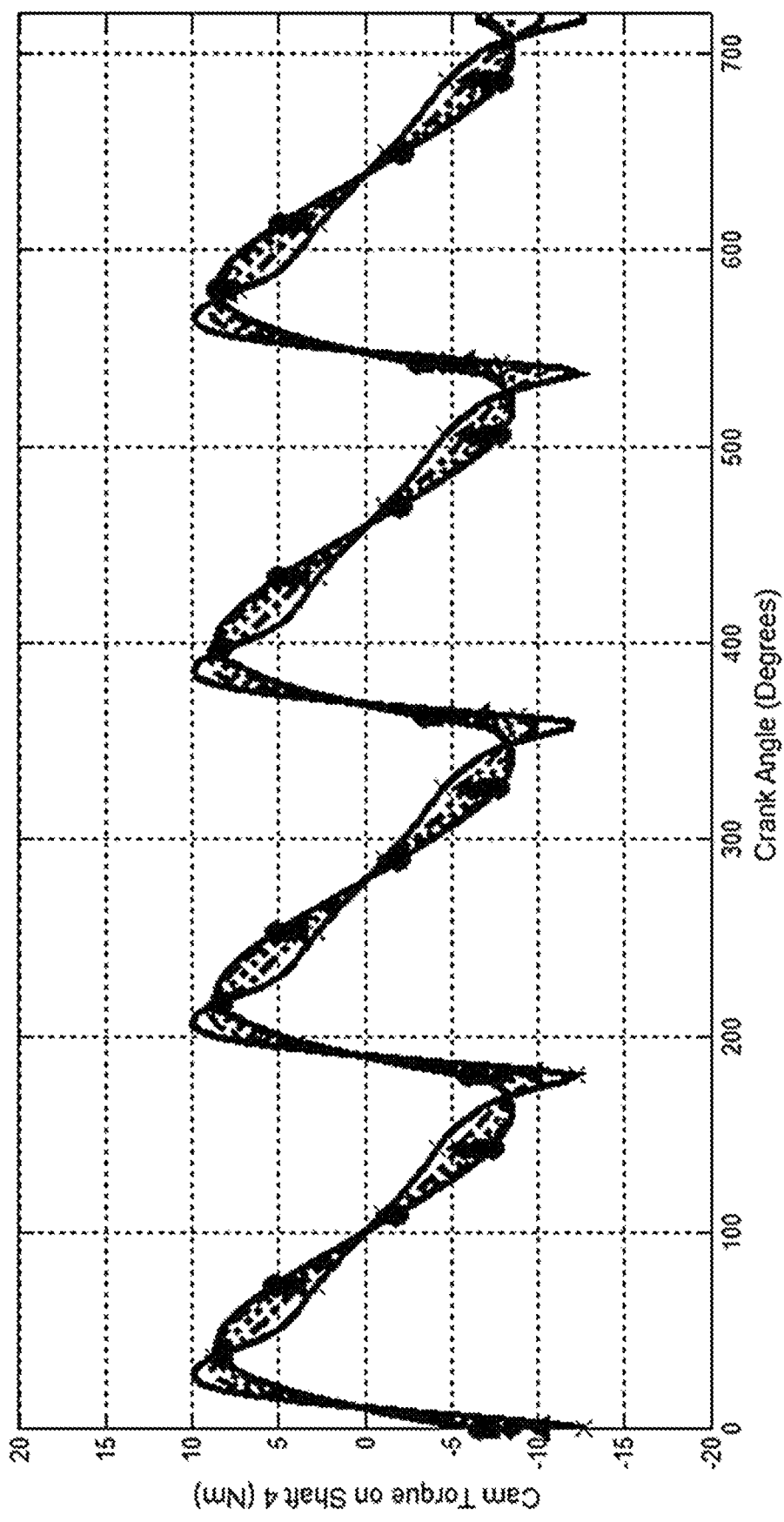
FIGS. 4a-4c show graphs of excitations from intake cam torques in the drive of FIG. 1.
Figure 4B:
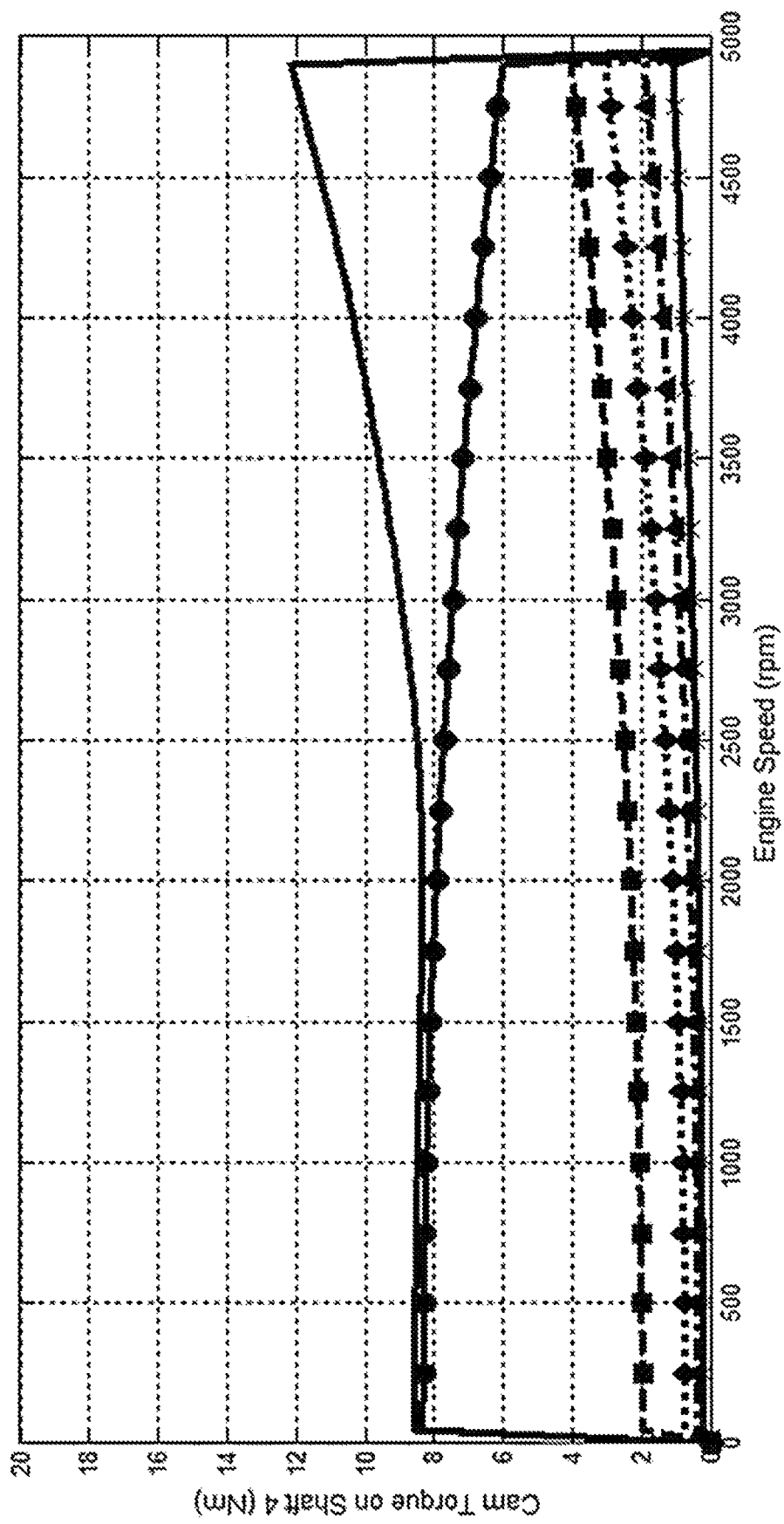
Figure 4C:
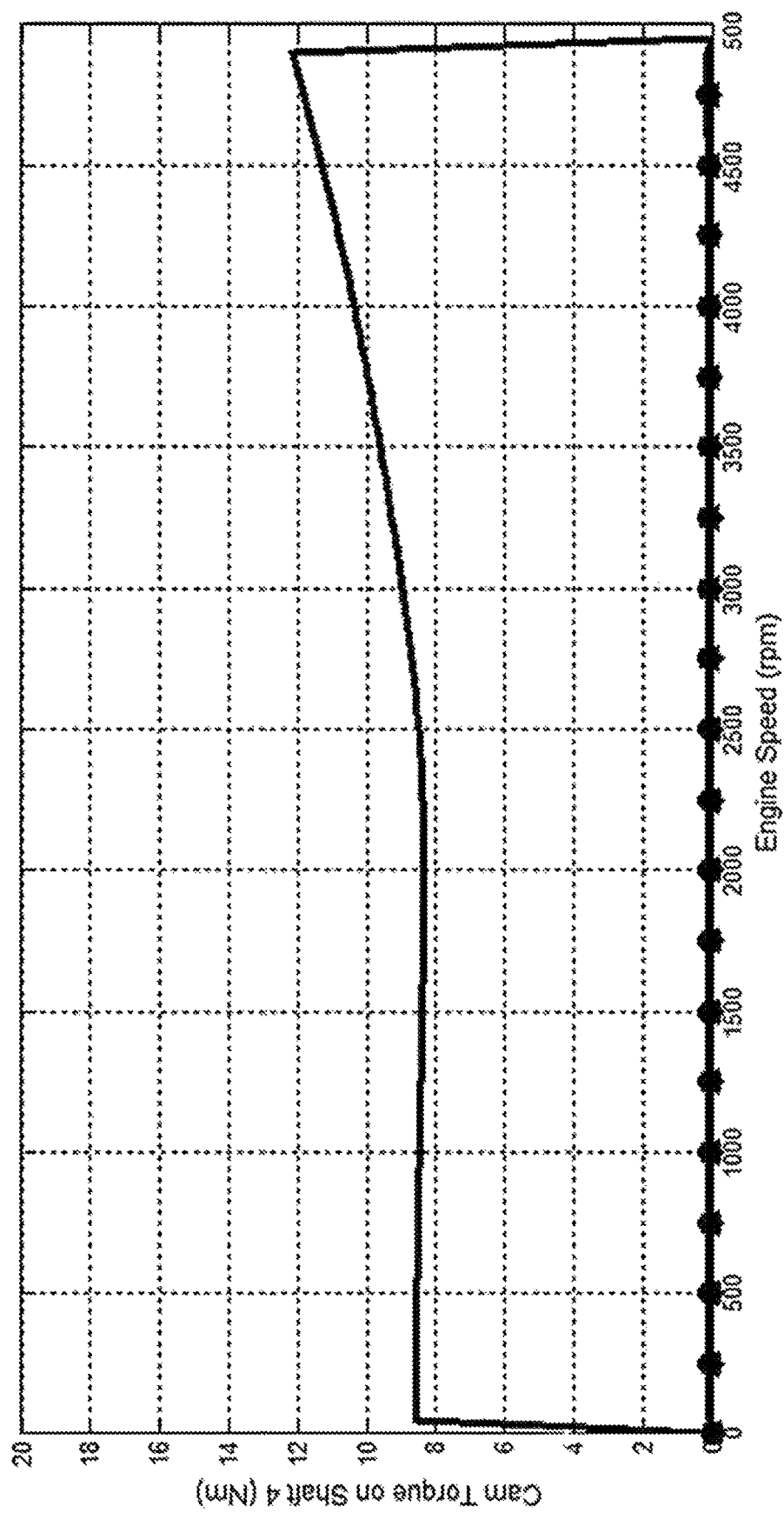
Figure 26:
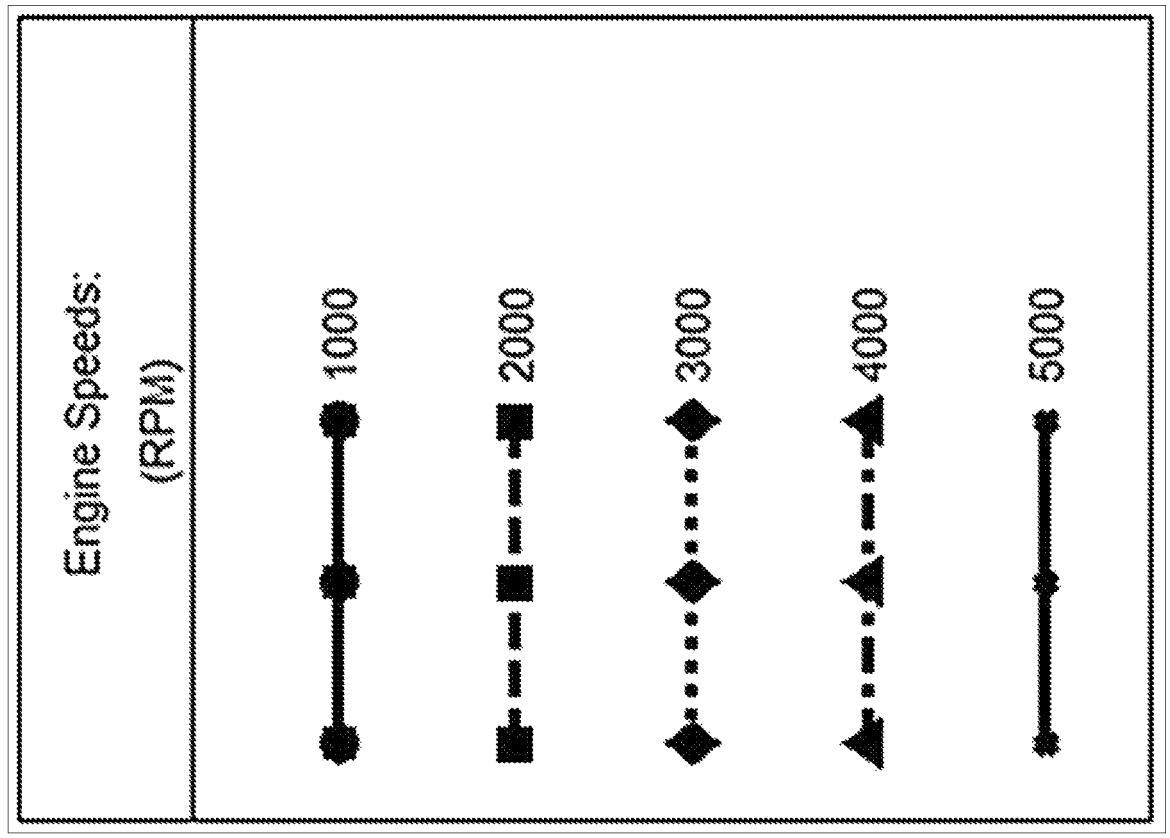
Figure 27:
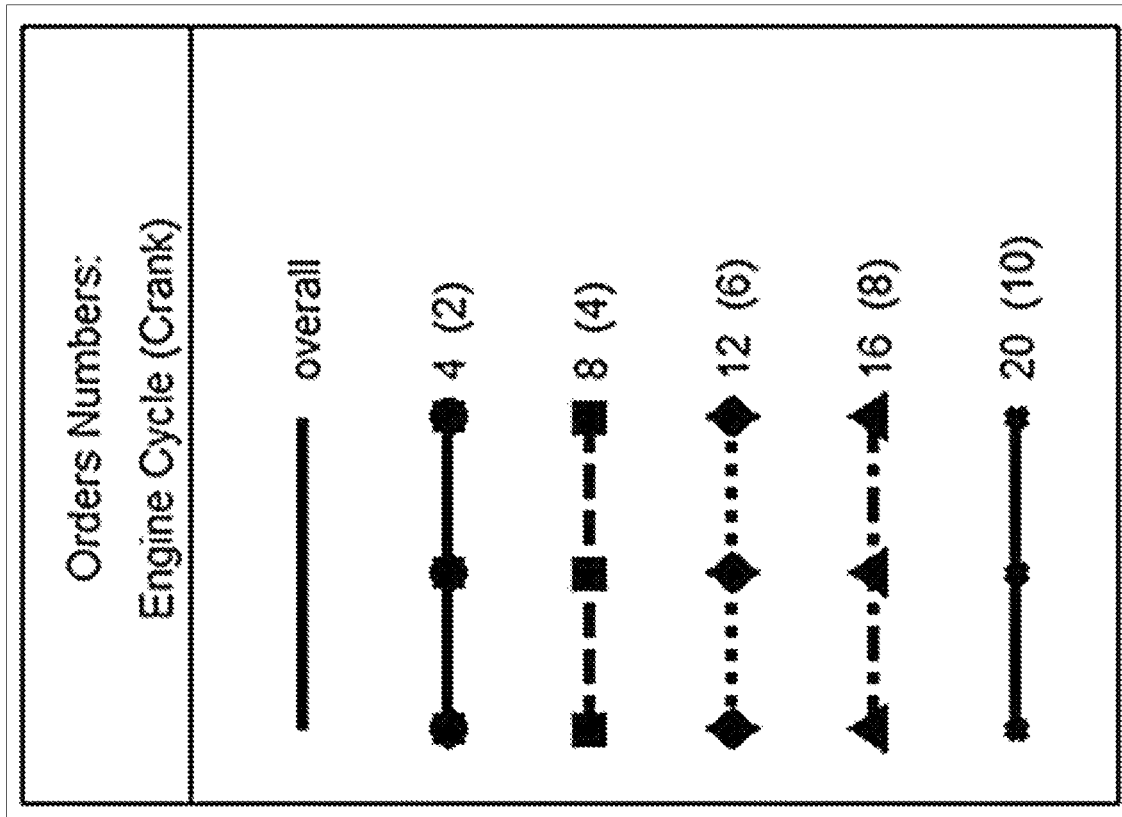
FIG. 27 shows the legend for FIGS. 2b, 3b, 4b, 5b, 7b, 8b, 9b, 10b, 11b, 12b, 13c, 13d, 14c, 14d, 15c, 15d, 16c, 16d, 17c, 17d, 19c, 19d, 20c, 20d, 21c, 21d, 22c and 22d.
Figure 28:
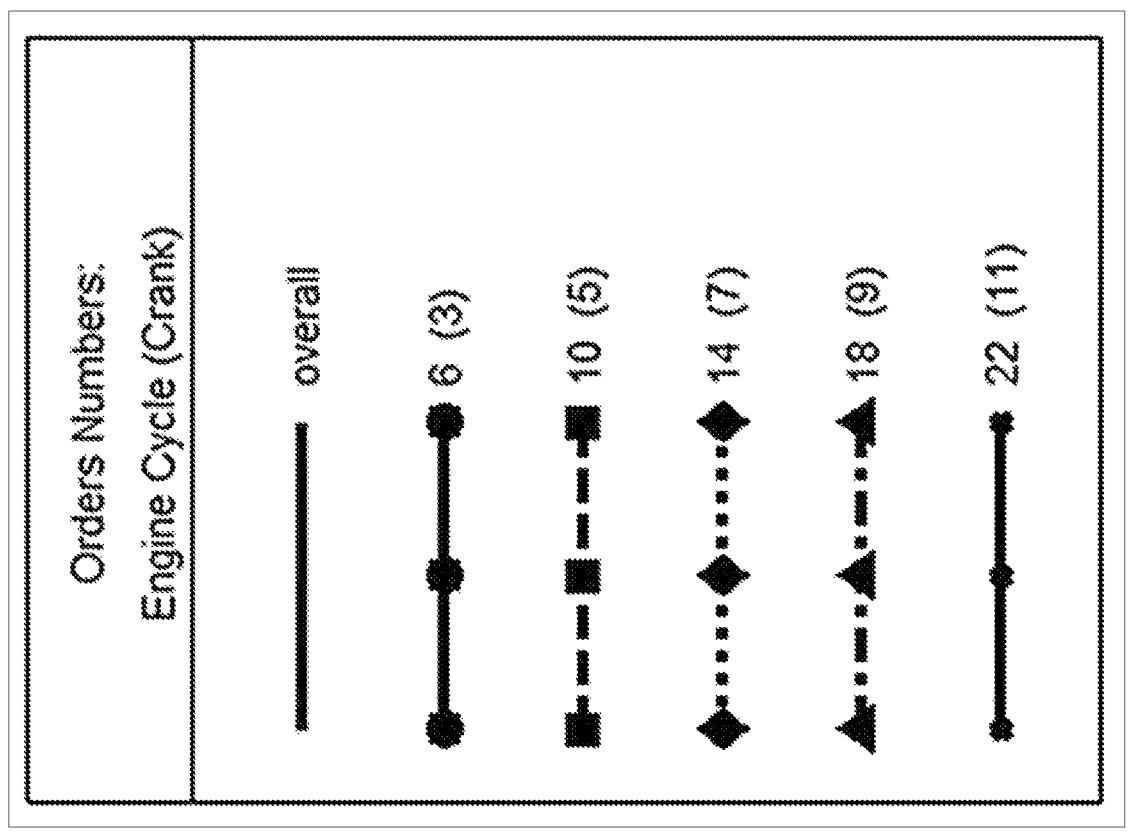
FIG. 28 shows the legend for FIGS. 2c, 3c, 4c, 5c, 7c, 8c, 9c, 10c, 11c, 12c, 13e, 13f, 14e, 14f, 15e, 15f, 16e, 16f, 17e, 17f, 19e, 19f, 20e, 20f, 21e, 21f, 22e, and 22f.
Figure 29:
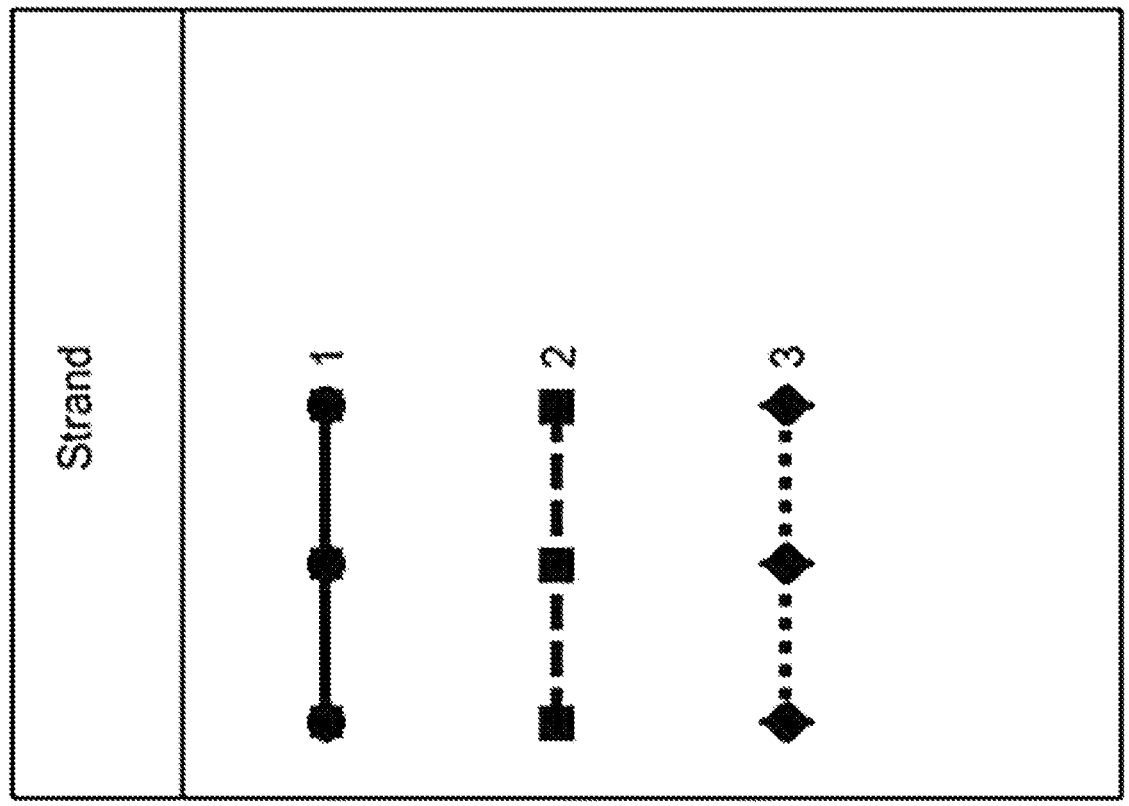
Figure 30:
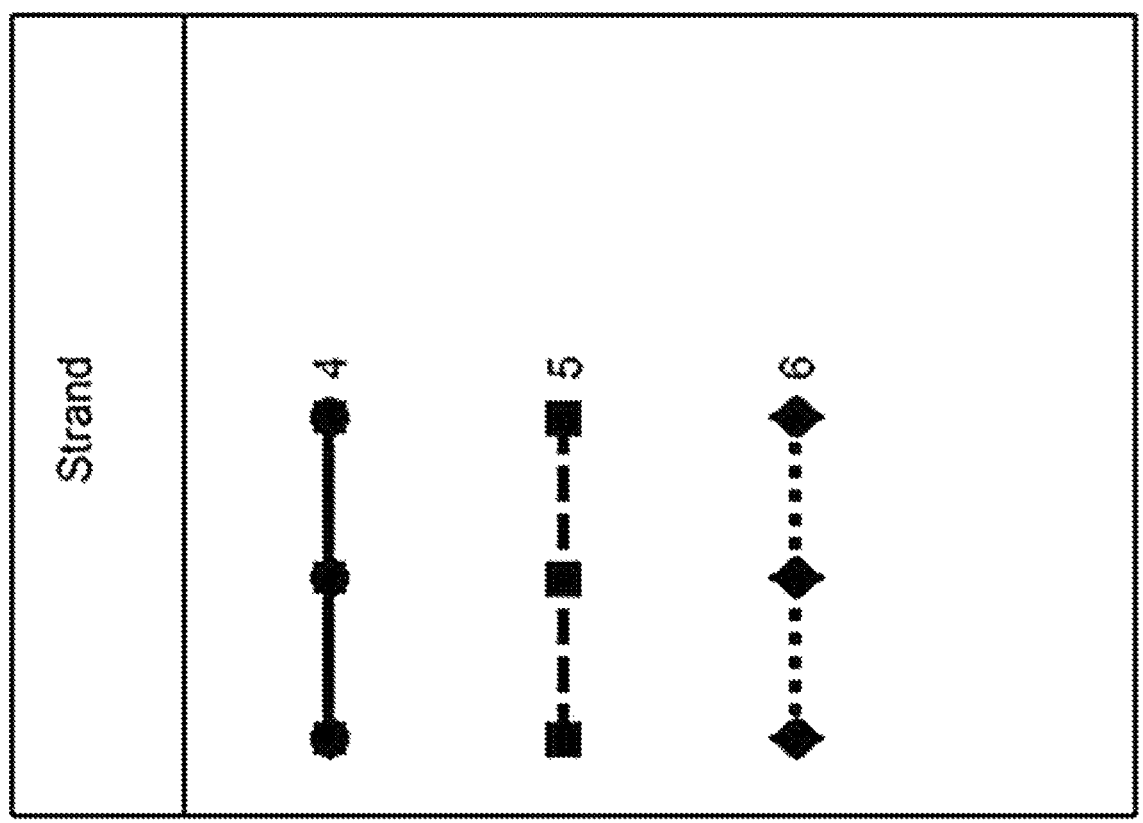
FIG. 30 shows the legend for FIGS. 6b, 13b, 14b, 15b, 16b, 17b, 19b, 20b, 21b, and 22b.
Figure 31:
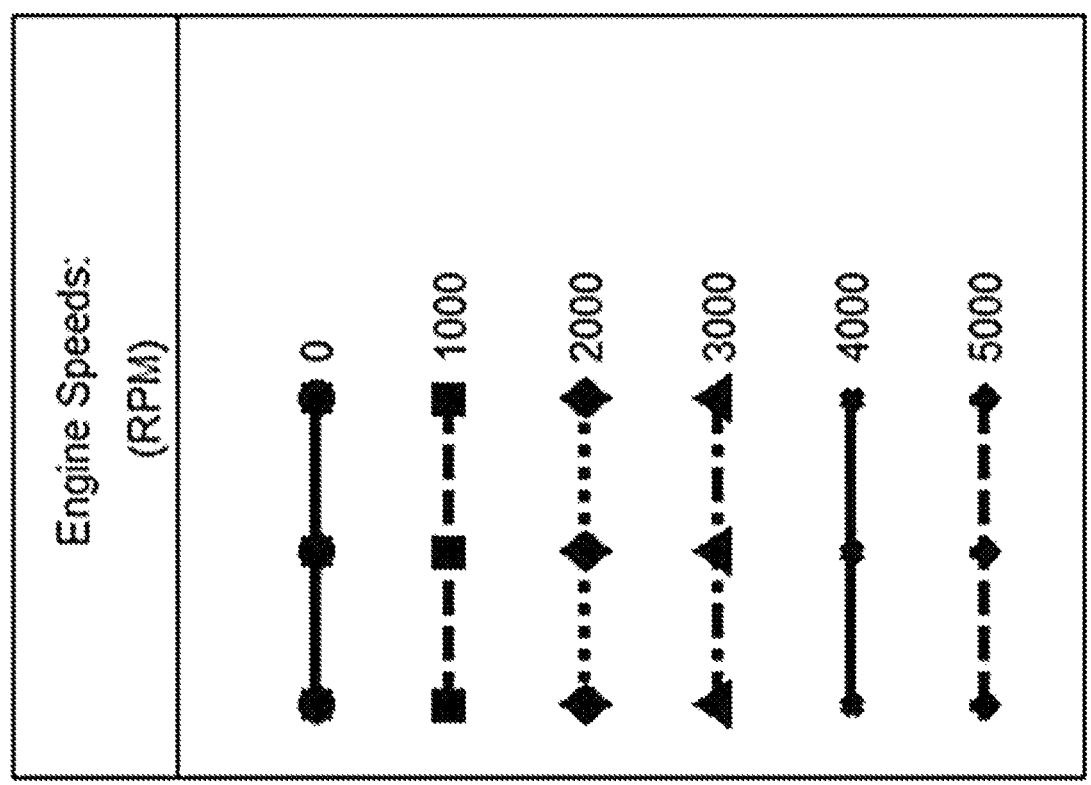

It should be noted that the legends for FIGS. 2a, 5a, 7a, 8a, 9a, 10a, 11a, and 12a is found in FIG. 26. The legend for FIGS. 2b, 3b, 4b, 5b, 7b, 8b, 9b, 10b, 11b, 12b, 13c, 13d, 14c, 14d, 15c, 15d, 16c, 16d, 17c, 17d, 19c, 19d, 20c, 20d, 21c, 21d, 22c and 22d is found in FIG. 27. The legend for FIGS. 2c, 3c, 4c, 5c, 7c, 8c, 9c, 10c, 11c, 12c, 13e, 13f, 14e, 14f, 15e, 15f, 16e, 16f, 17e, 17f, 19e, 19f, 20e, 20f, 21e, 21f, 22e, and 22f is found in FIG. 28. The legend for FIGS. 6a, 13a, 14a, 15a, 16a, 17a, 19a, 20a, 21a, and 22a is found in FIG. 29 and the legend for FIGS. 6b, 13b, 14b, 15b, 16b, 17b, 19b, 20b, 21b, and 22b is found in FIG. 30. The legend for FIGS. 3a and 4a is found in FIG. 31.

Figure 1:
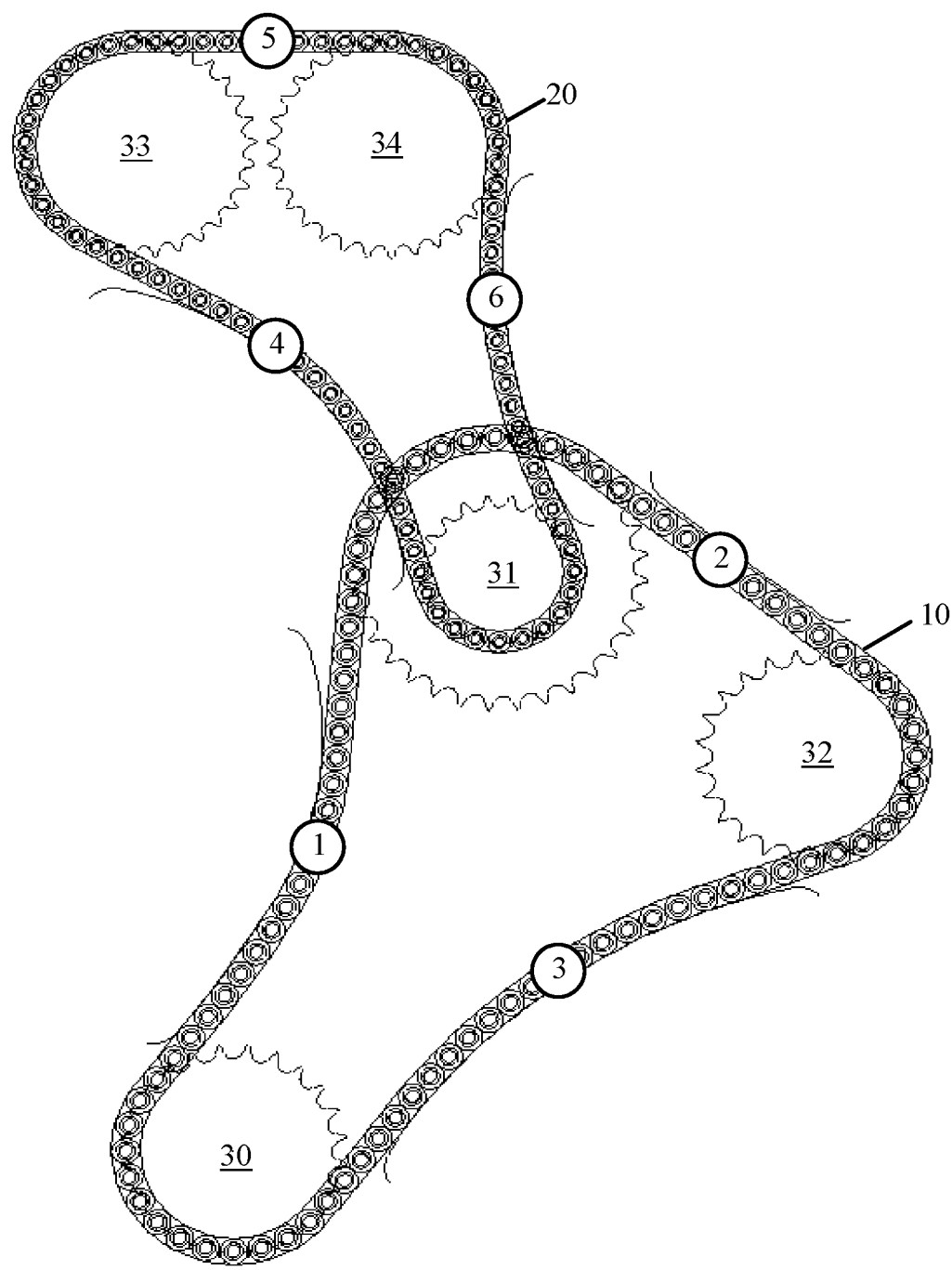
FIG. 1 shows a prior art two stage chain drive for an 1-4 Diesel application.
Figure 2A:
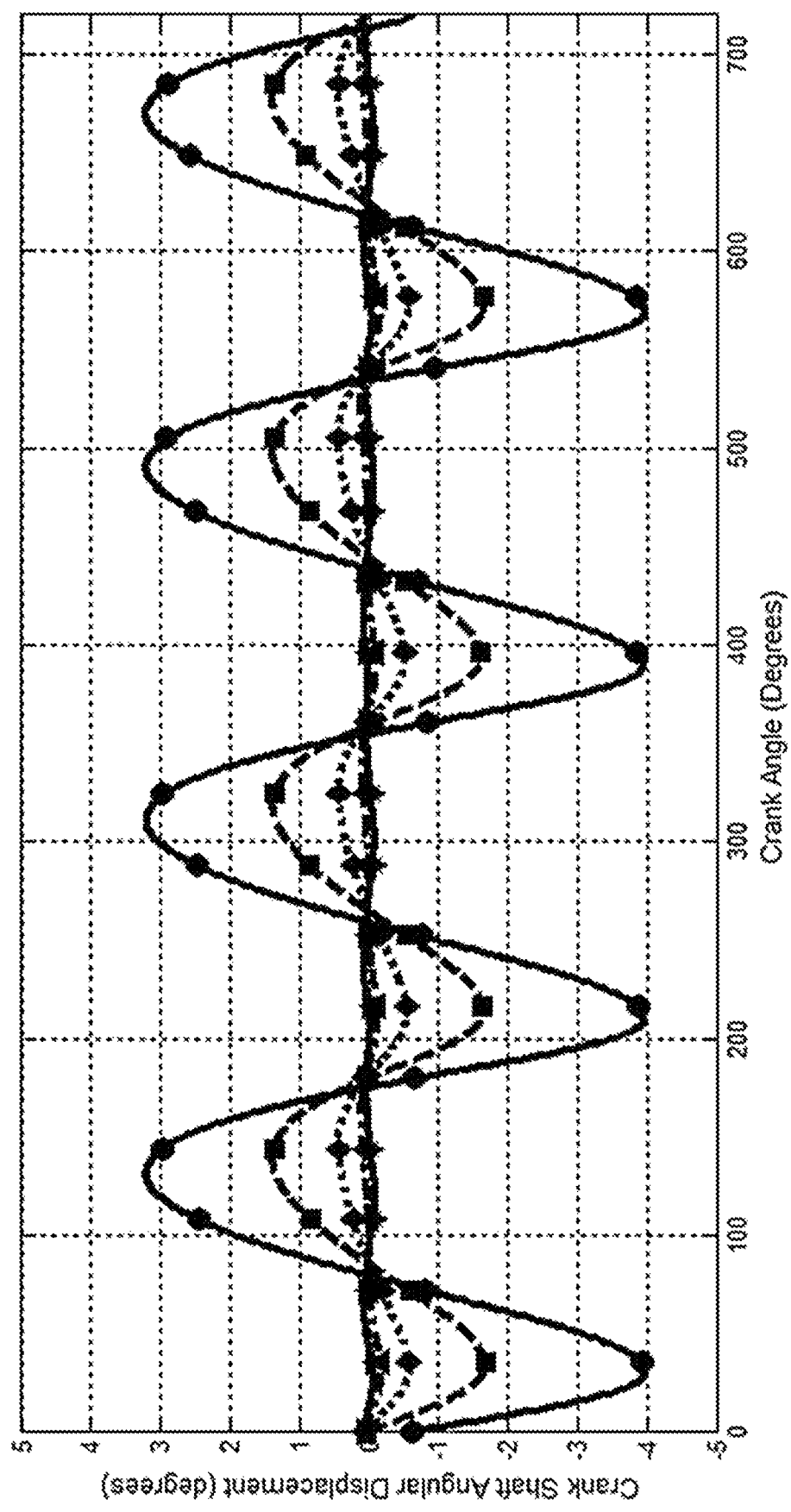
FIGS. 2a-2c show graphs of excitations from crank torsional vibrations in the drive of FIG. 1.
Figure 2B:
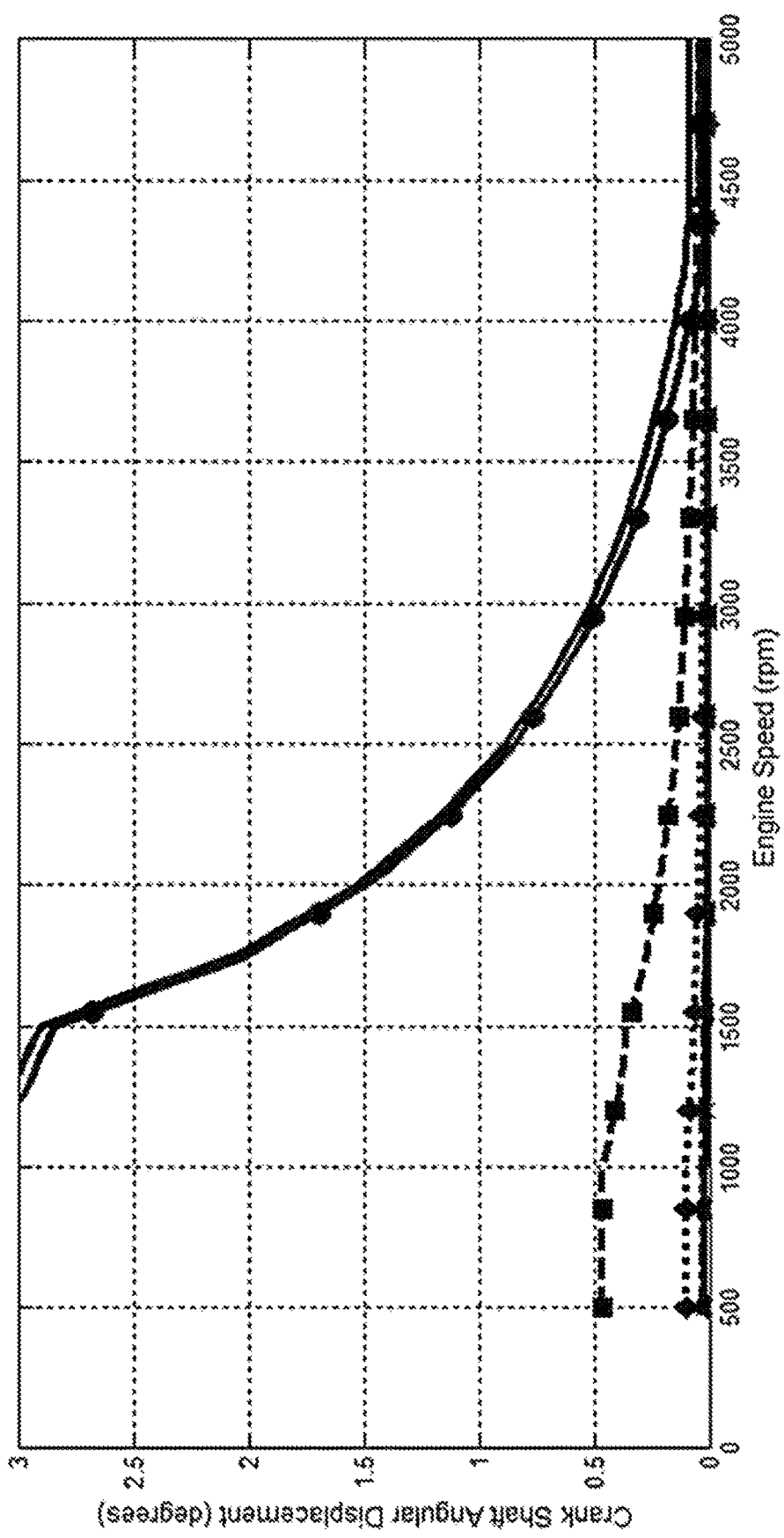
Figure 2C:
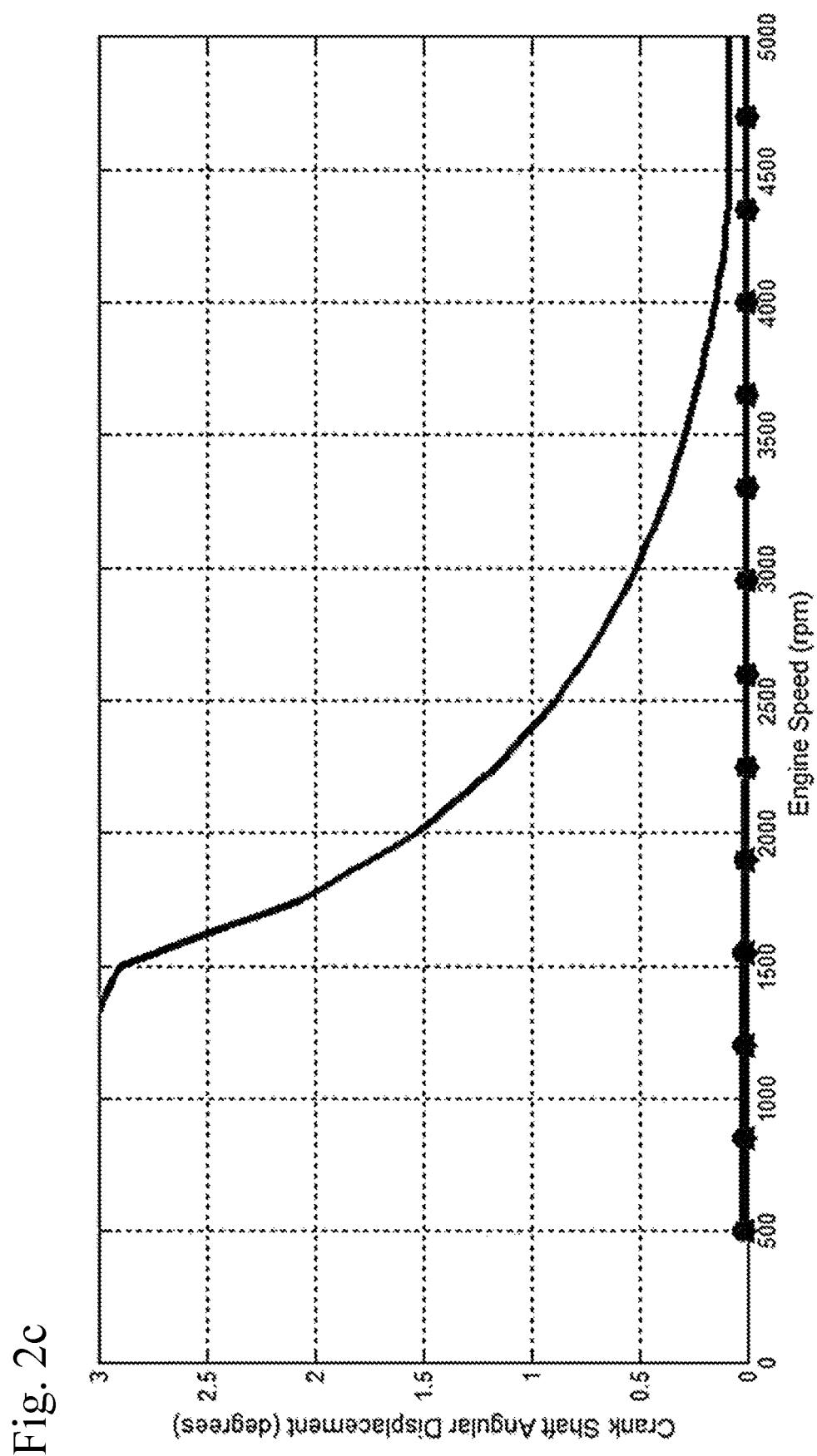
Figure 5A:
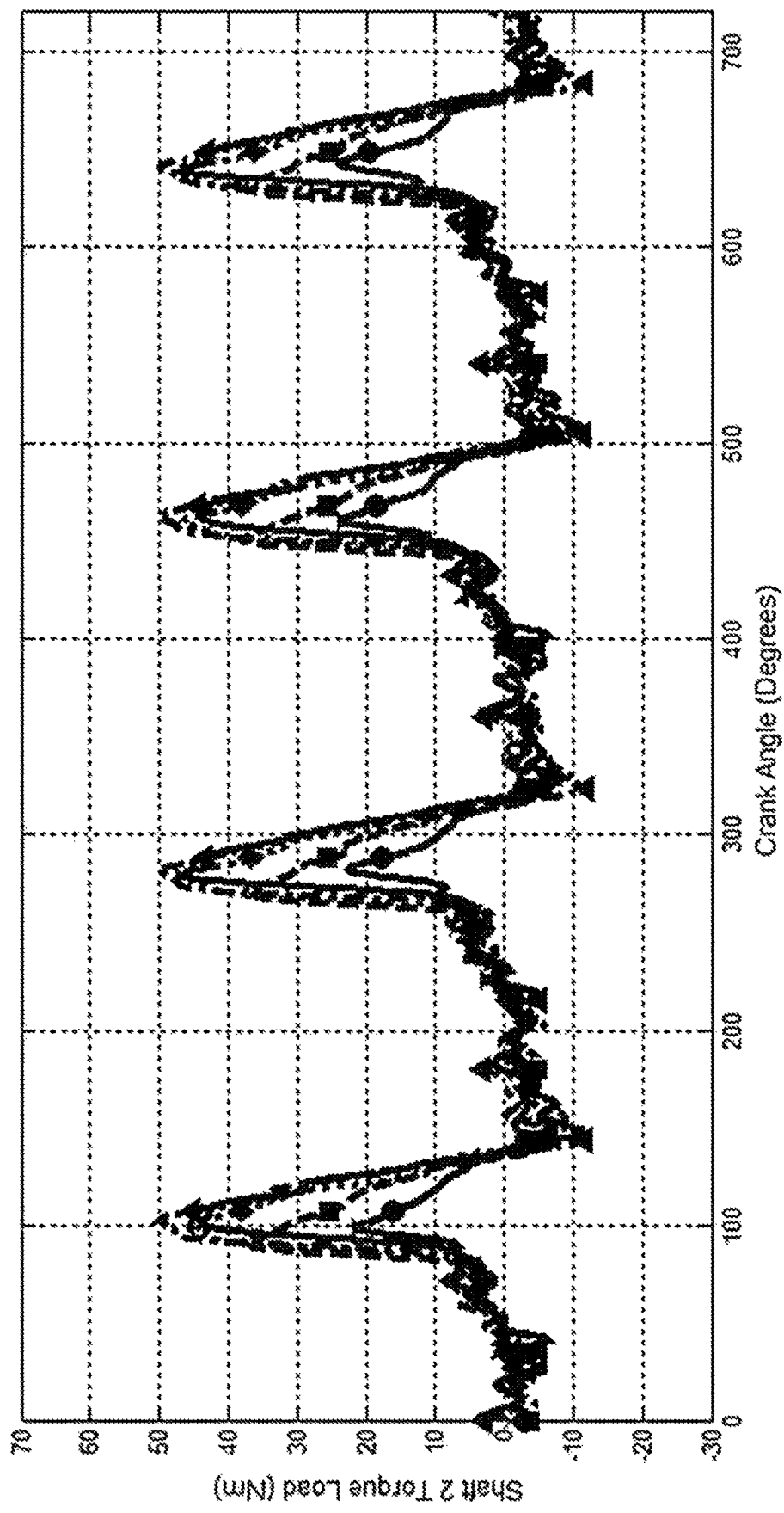
FIGS. 5a-5c show graphs of excitations from fuel pump torques in the drive of FIG. 1.
Figure 5B:
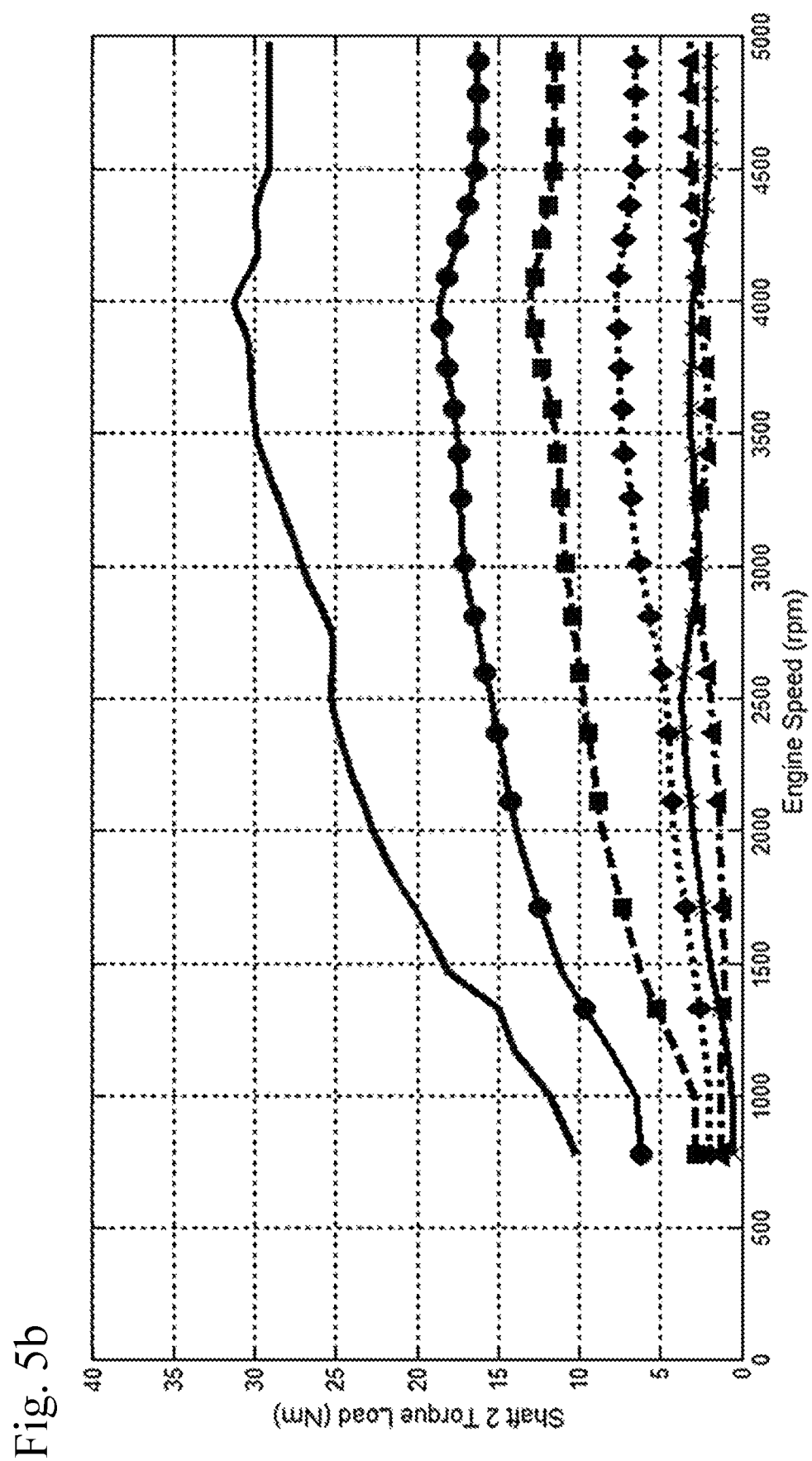
Figure 5C:
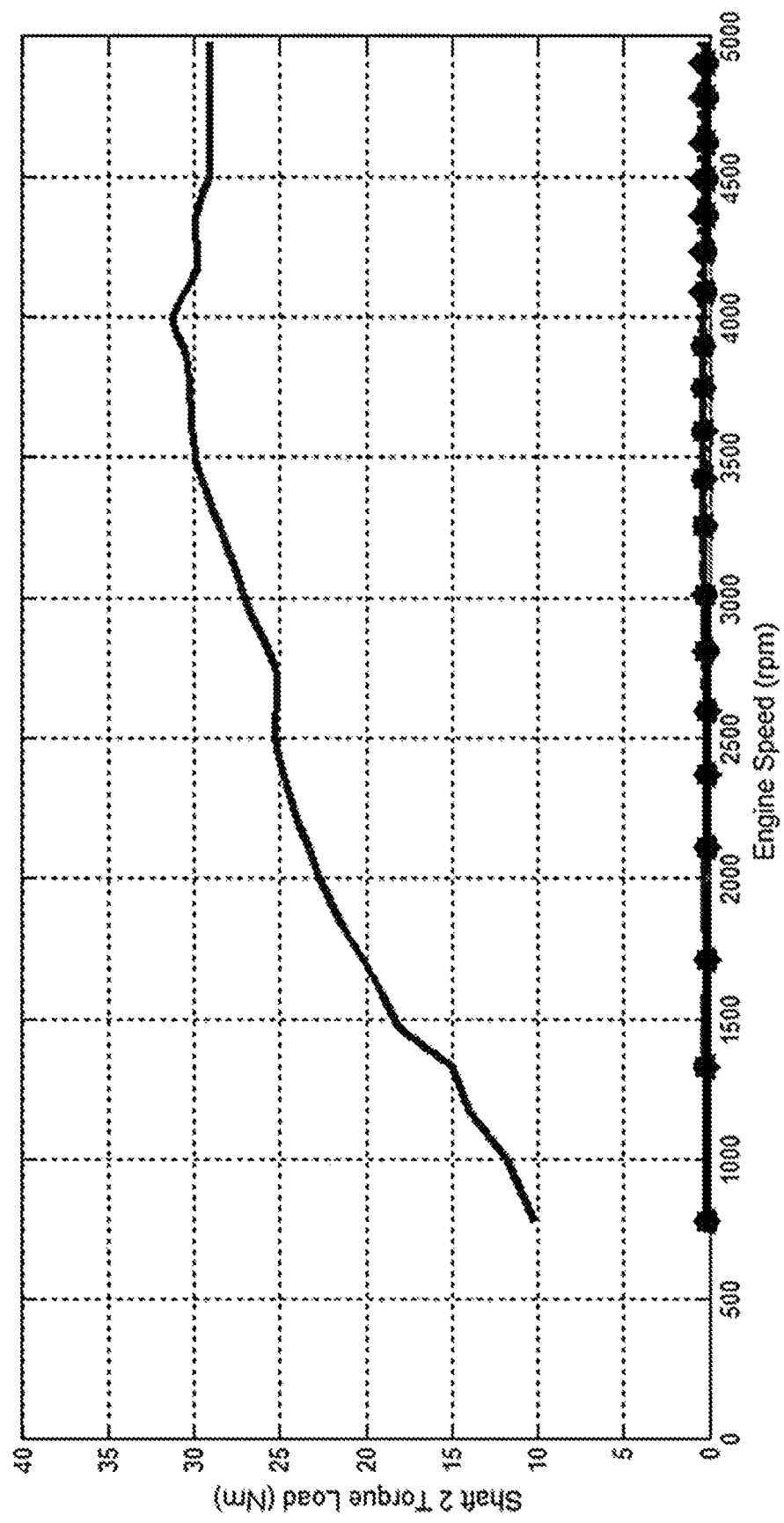

The chain drive arrangement in FIG. 1 has high oscillating excitations from crank torsional vibrations. This can be seen in the graphs in FIGS. 2a-2c. Similarly, FIGS. 3a-3c and 4a-4c show graphs of cam torques in the exhaust camshaft and intake camshaft, respectively, and FIGS. 5a-5c show fuel pump torques.

FIGS. 2a, 3a, 4a and 5a show time traces of the oscillating excitation for one engine cycle at different speeds. These time traces repeat every engine cycle (2 crank revolutions). Because this is a four cylinder engine, the oscillating excitations have a pattern that repeats four times in the engine cycle. This creates a dominant fourth engine cycle order (the excitations increase and decrease four times per engine cycle). Because the time traces are not sinusoidal, there are harmonics—or orders—that are multiples of the fourth engine cycle order (8, 12, 16, . . . ).

It will be understood that the word "engine cycle order" or just "order" as used herein to apply to a four-cycle engine will refer to the "engine cycle" order. The graphs also note a "crank sprocket order" in parenthesis. The engine cycle order is twice the crank sprocket order for a four-cycle engine, because the crank rotates twice per engine cycle.

For this application the time traces can be represented by the order amplitudes and phases using the equation:

$$X = A_4 \times \sin(4 \times \Theta + \phi_4) + A_8 \times \sin(8 \times \Theta + \phi_8) + A_{12} \times \sin(12 \times \Theta + \phi_{12}) +$$

Where: $A_n$=amplitude for order 4, 8, 12, . . . .
$\phi_n$=phase for order 4, 8, 12, . . . .
$\Theta$=engine cycle or cam angle (0-360 over one engine cycle)

The amplitude and phase of each order varies with engine speed. The variation of amplitude with speed for orders 4, 8, 12, 16 and 20 is shown in FIGS. 2b, 3b, 4b and 5b, and the same plot is shown for orders 6, 10, 14, 18 and 22 in FIGS. 2c, 3c, 4c and 5c.

Figure 6A:
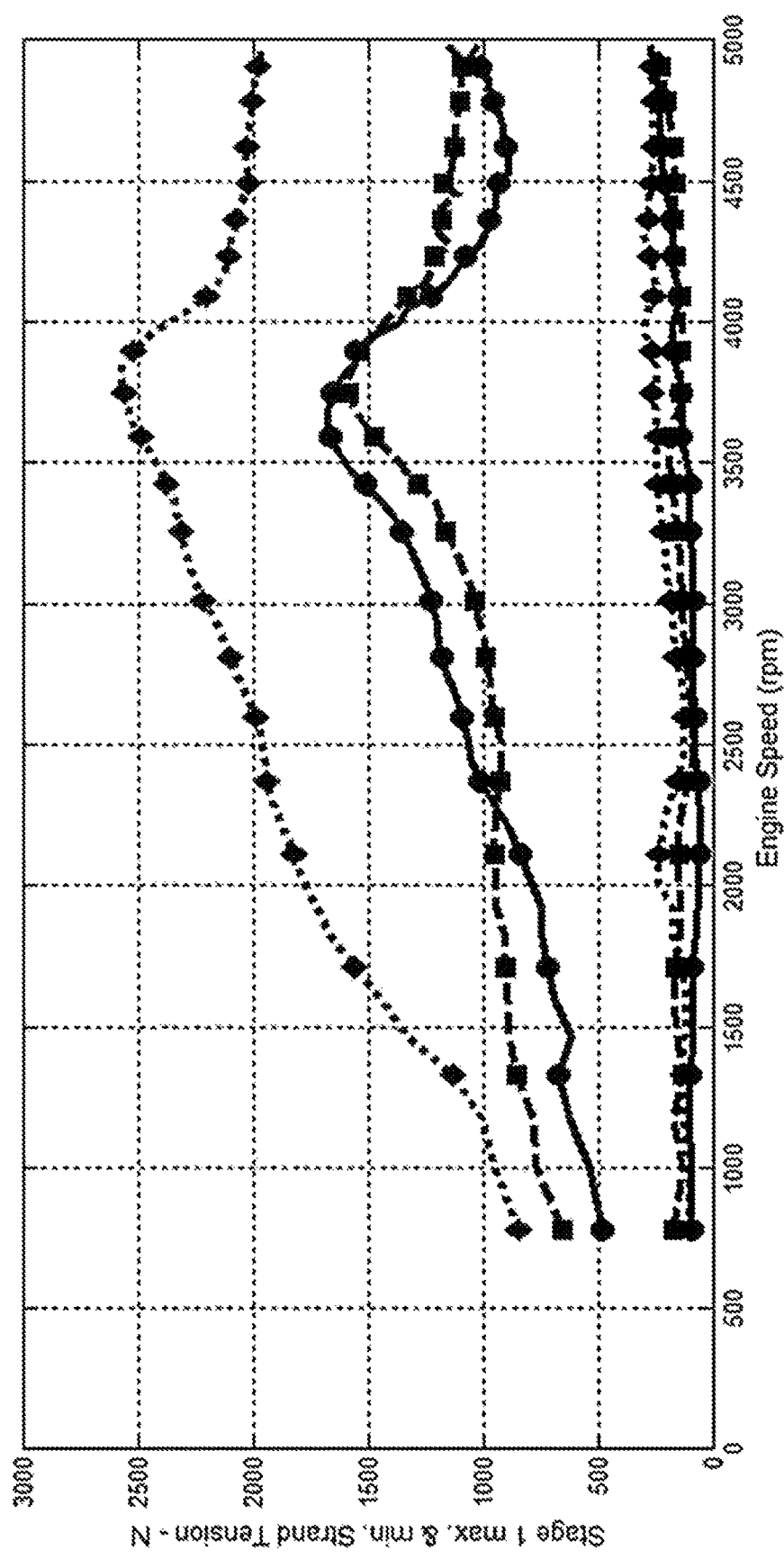
FIG. 6a shows engine speed vs strand tension for the fuel pump chain (strands 1-3) in FIG. 1.
Figure 6B:
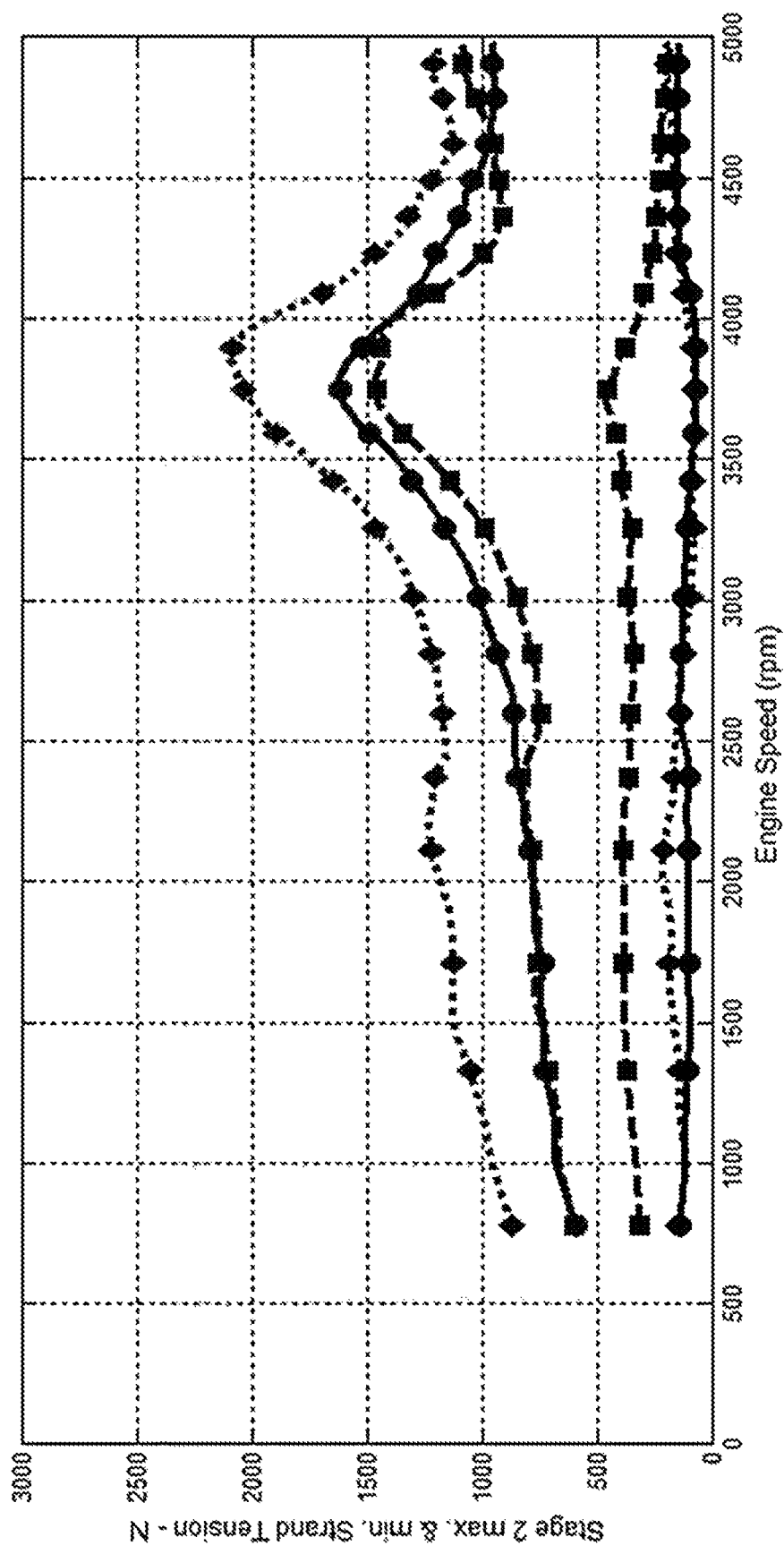
FIG. 6b shows engine speed vs strand tension for the cam timing chain (strands 4-6) in FIG. 1.
Figure 7A:
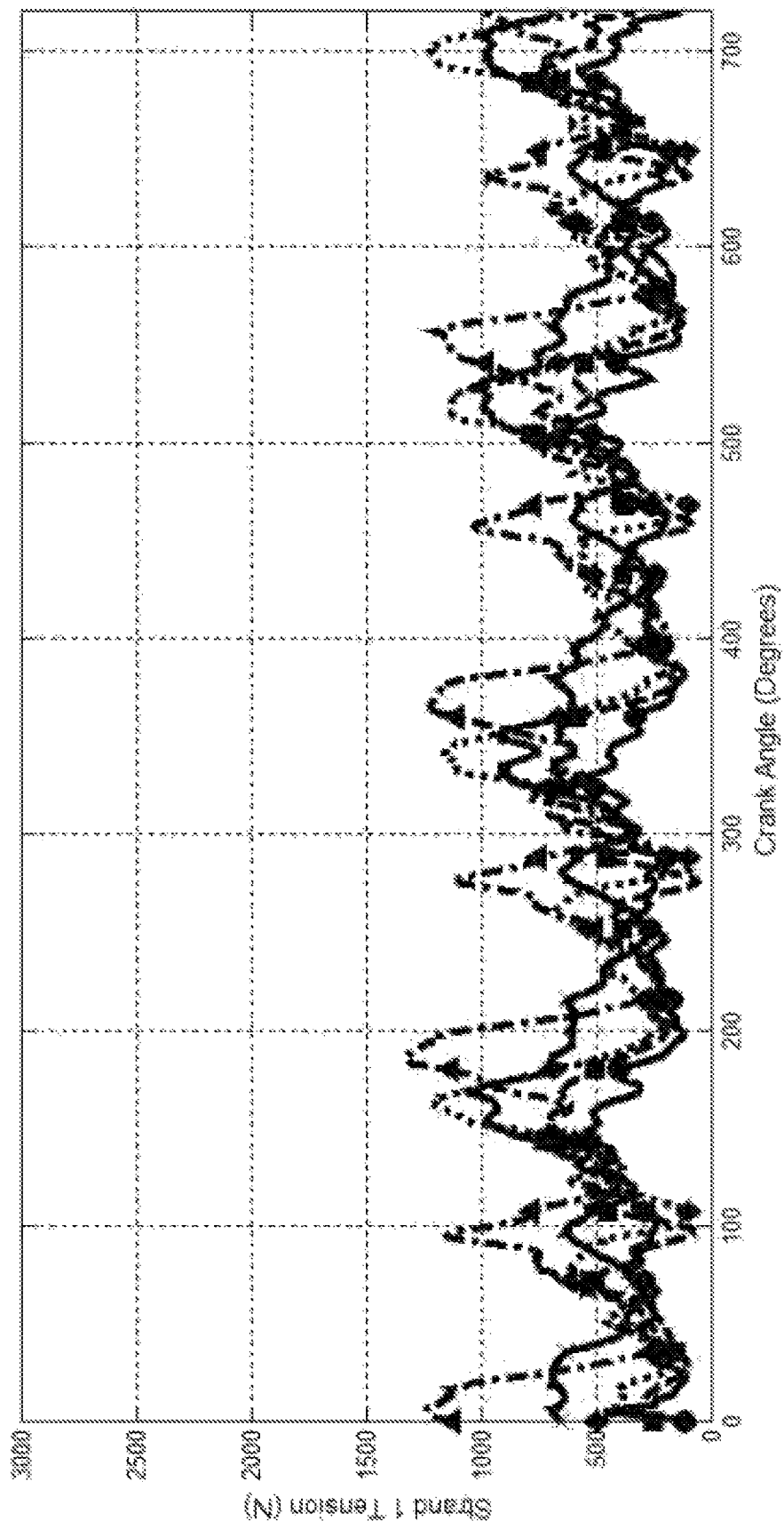
FIGS. 7a-7c show strand tensions in strand 1 of FIG. 1.
Figure 7B:
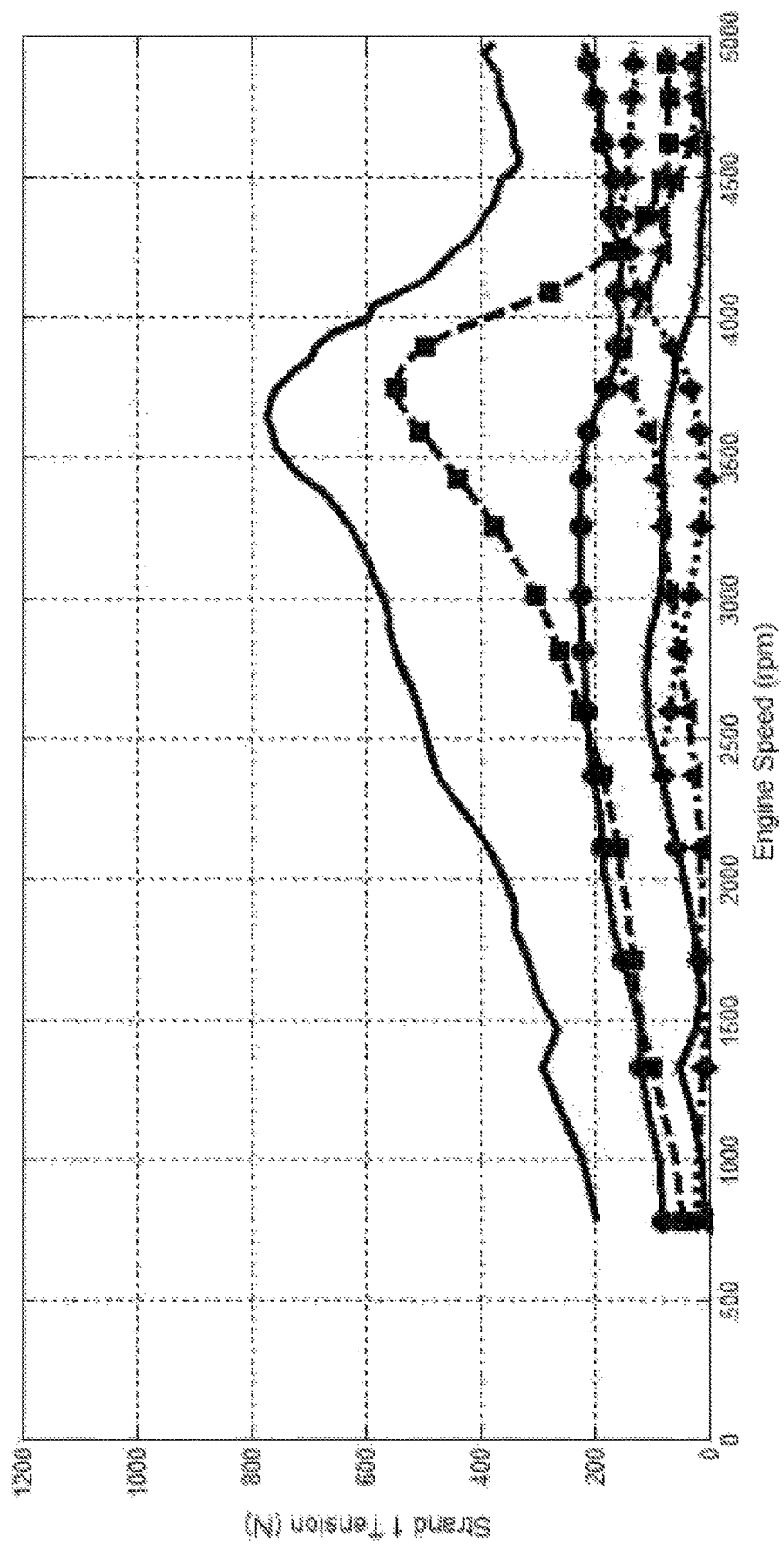
Figure 7C:
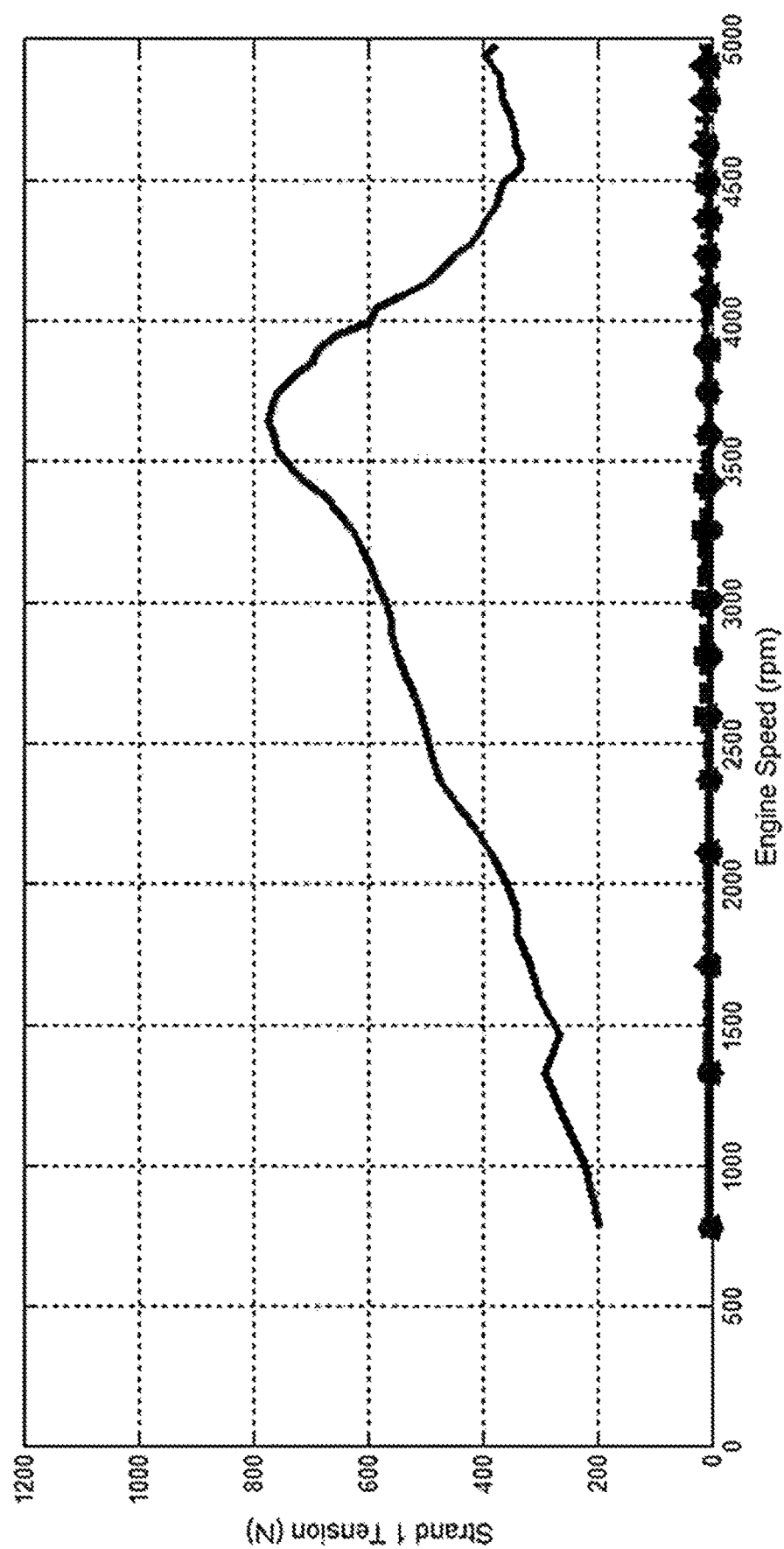
Figure 8A:
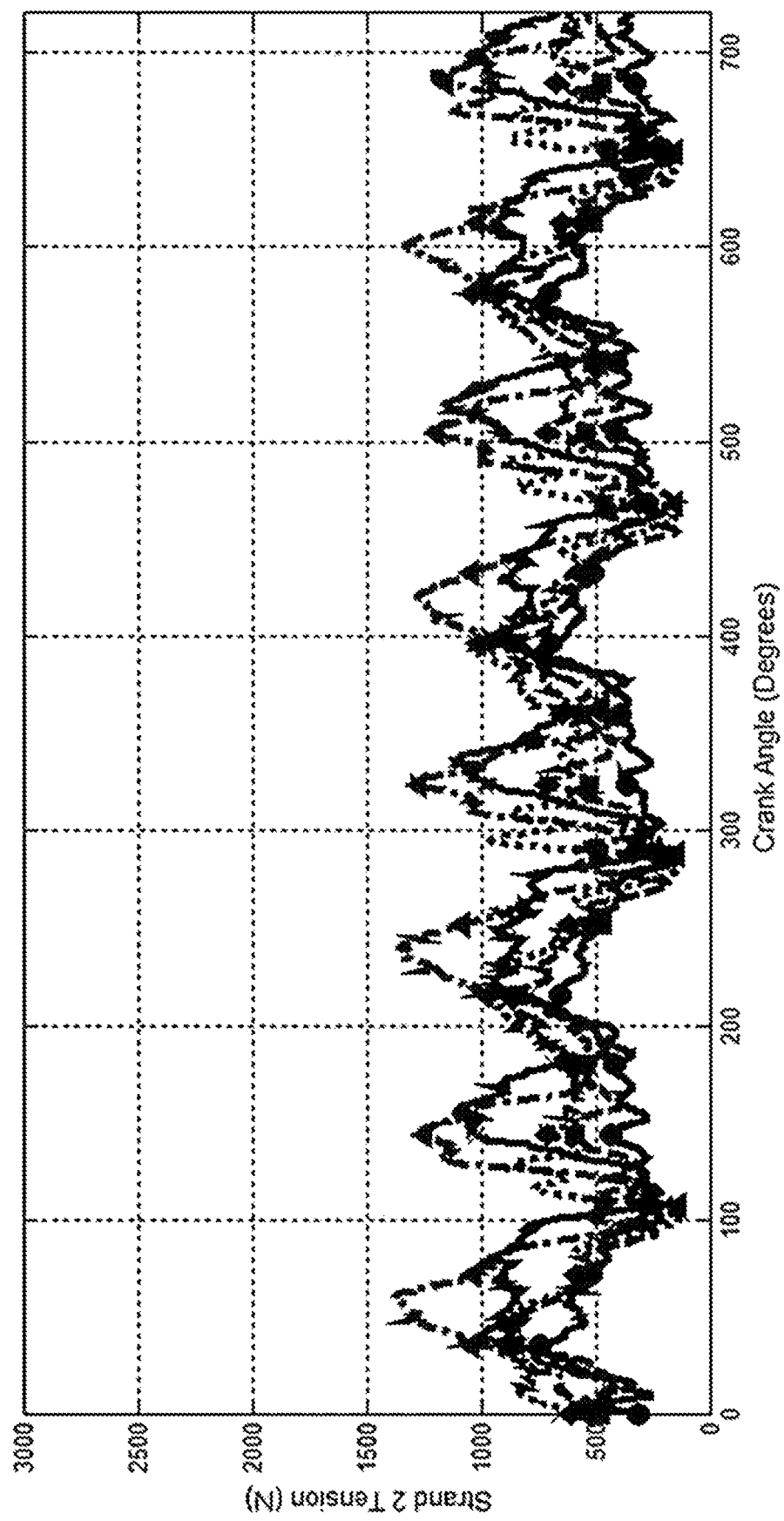
FIGS. 8a-8c show strand tensions in strand 2 of FIG. 1.
Figure 8B:
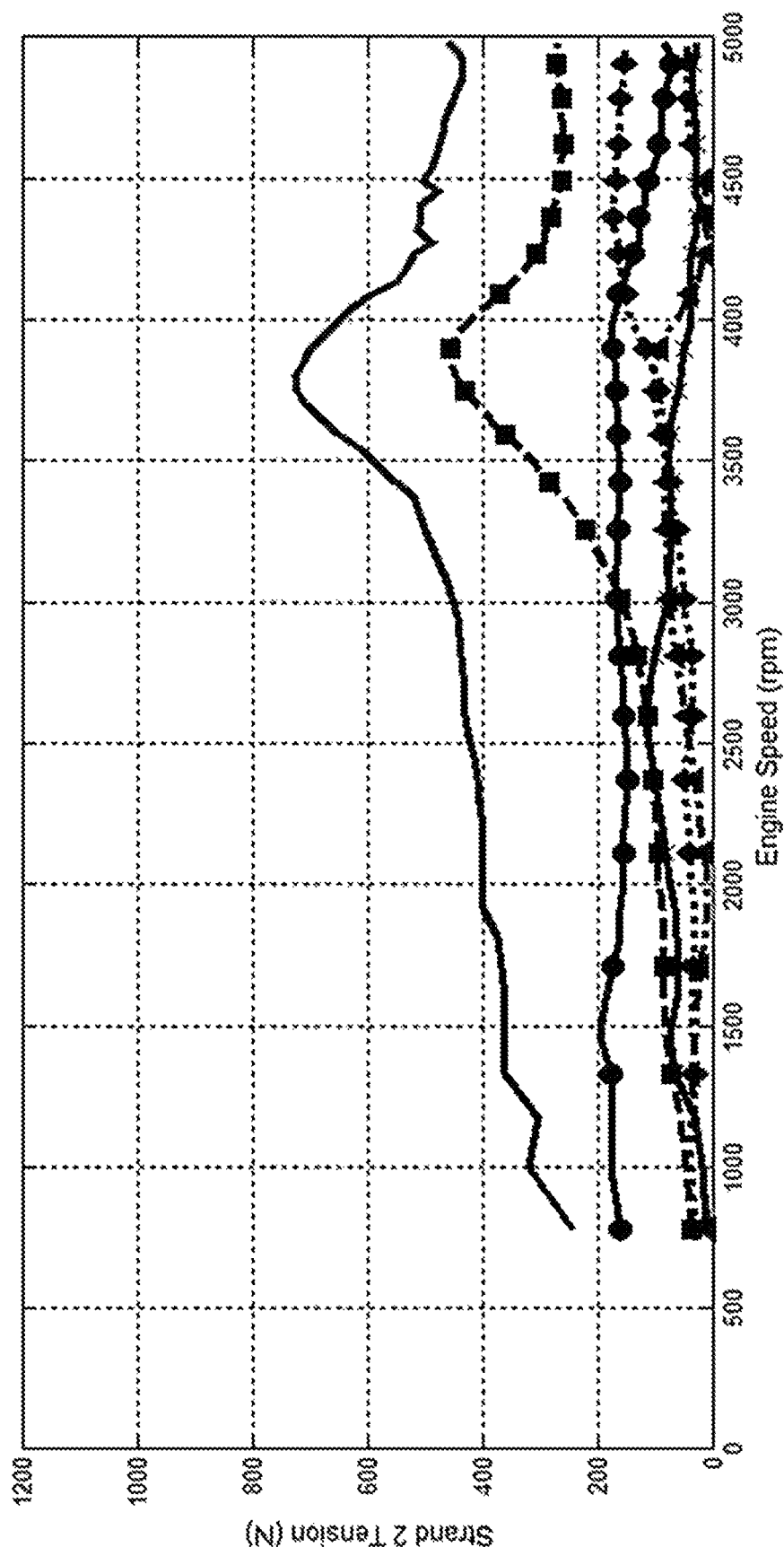
Figure 8C:
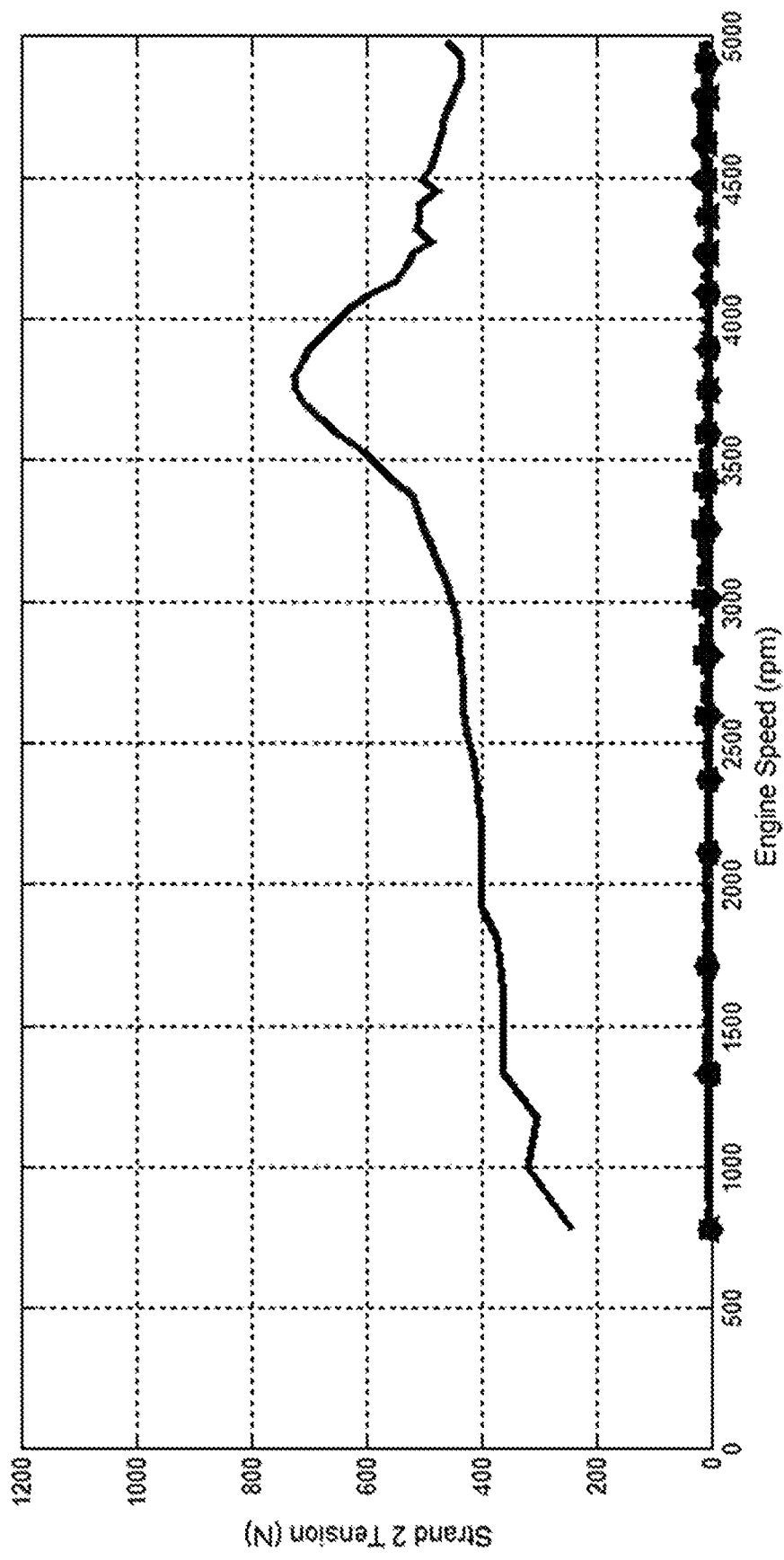
Figure 9A:
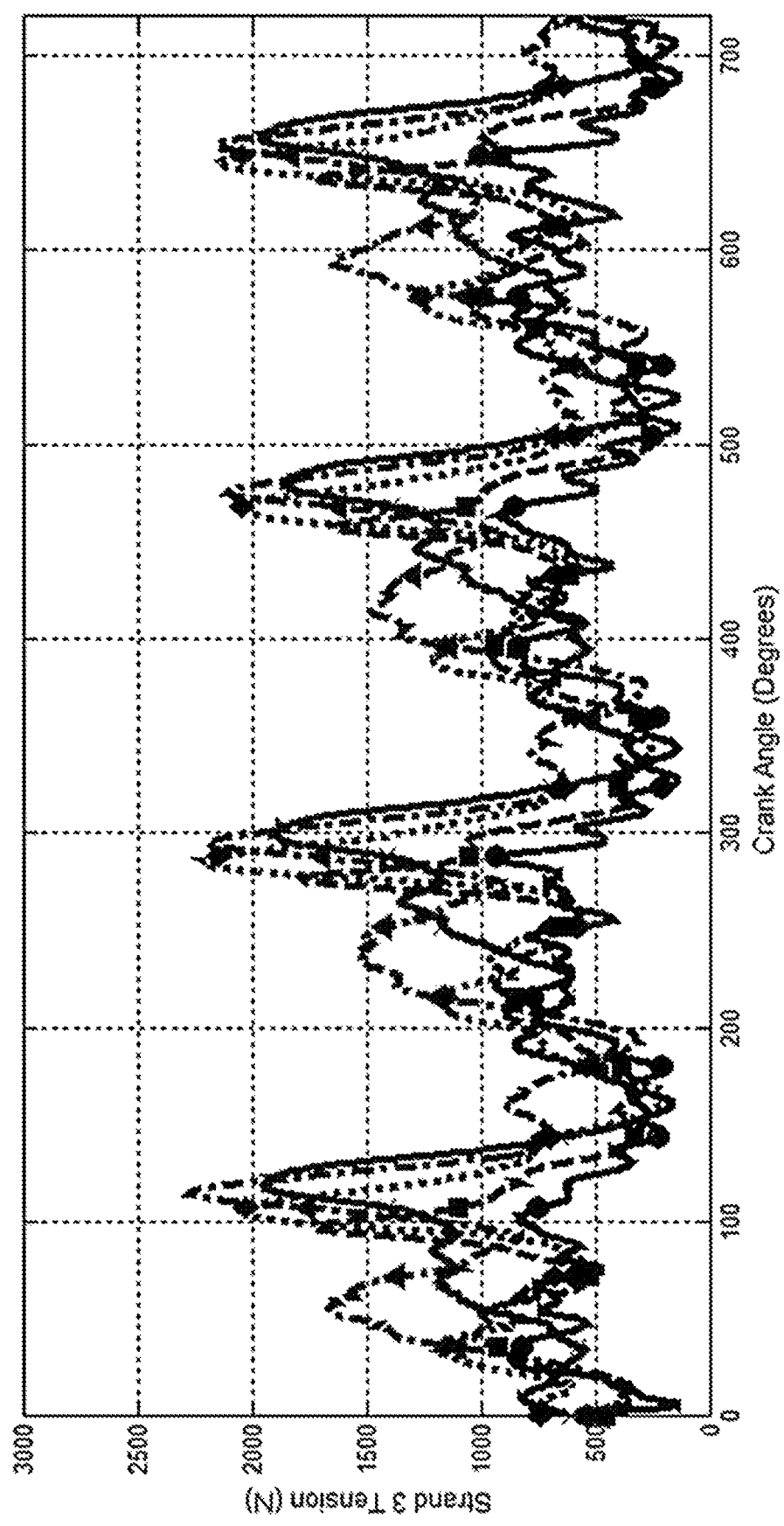
FIGS. 9a-9c show strand tensions in strand 3 of FIG. 1.
Figure 9B:
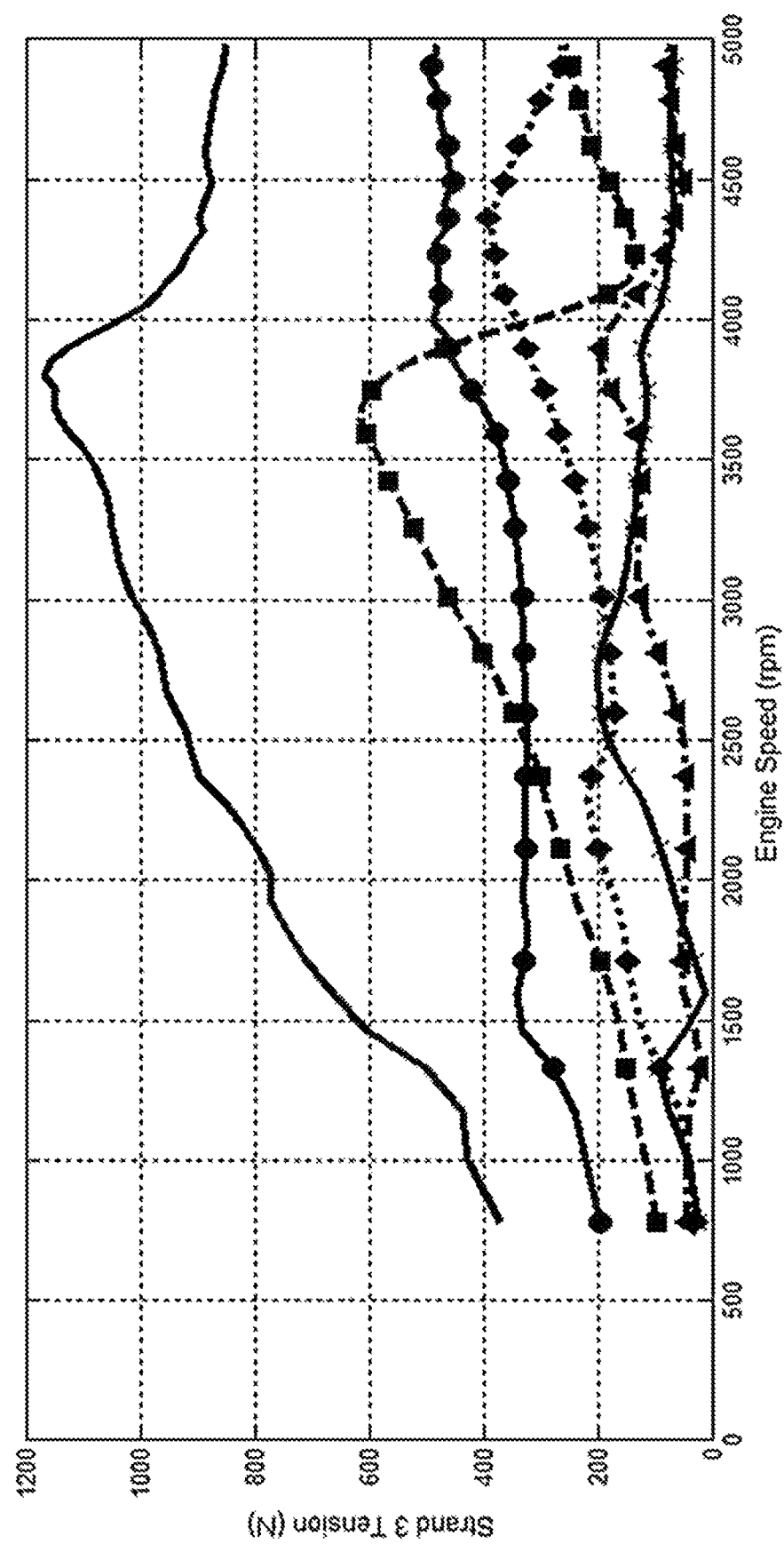
Figure 9C:
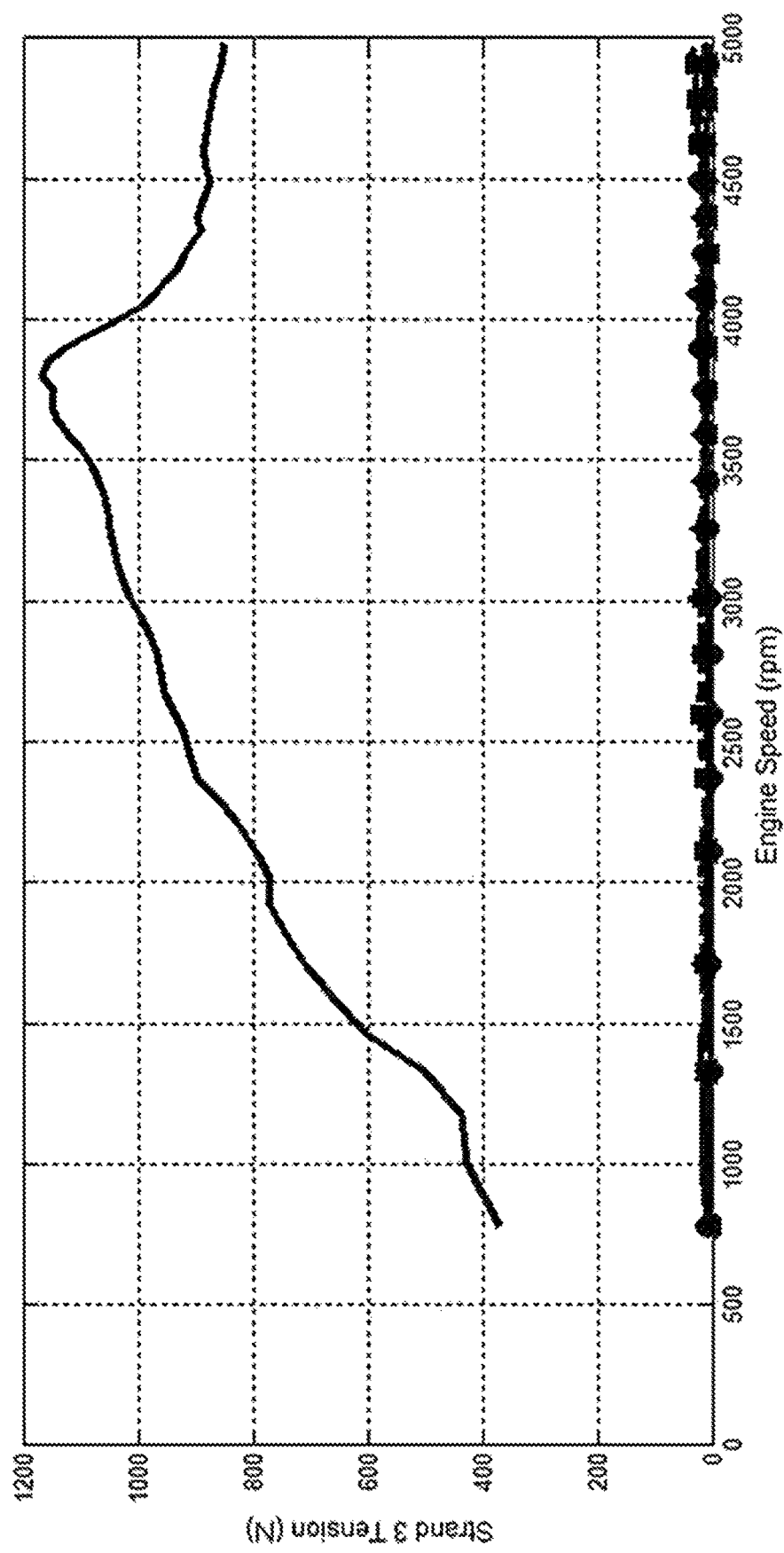
Figure 10A:
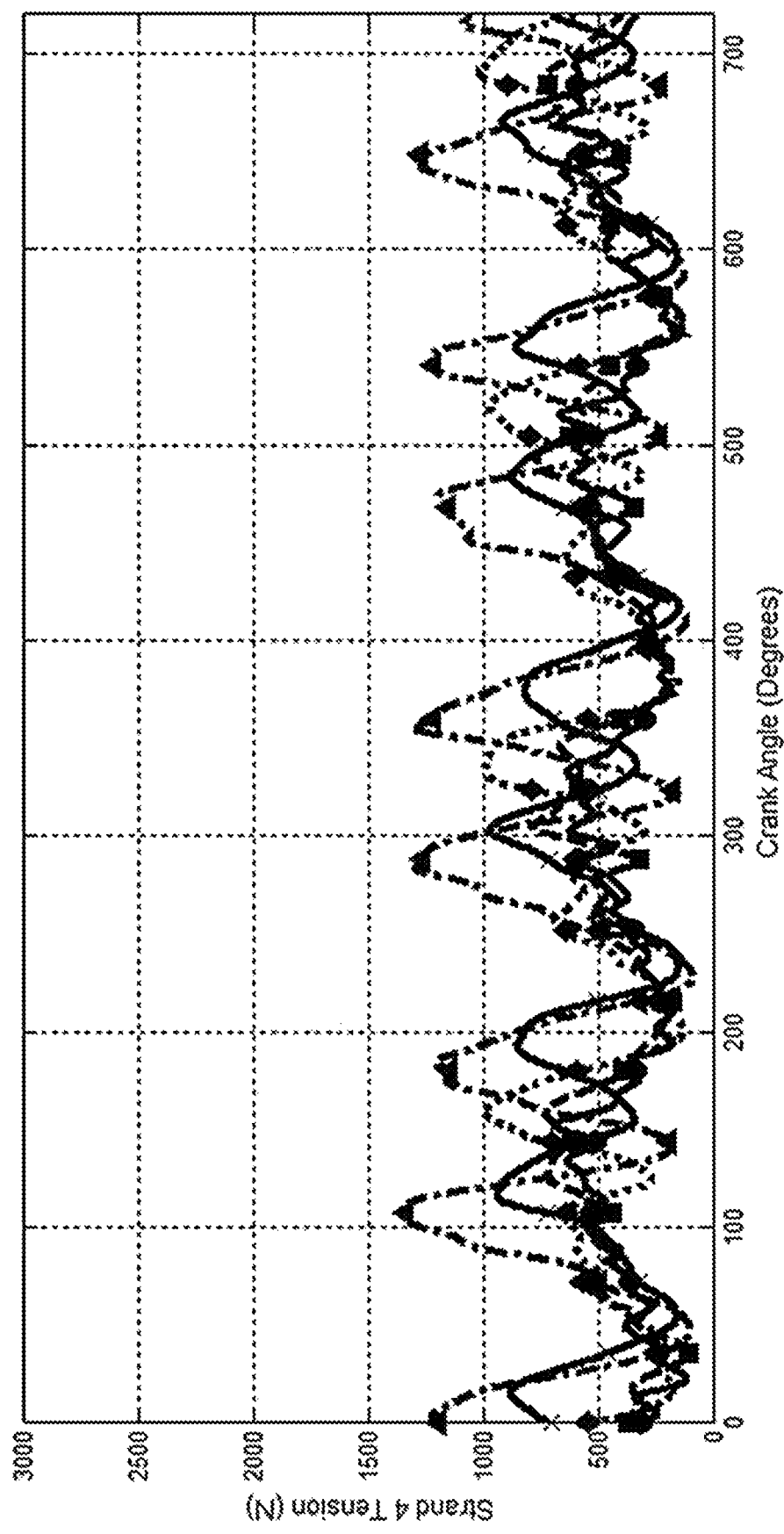
FIGS. 10a-10c show strand tensions in strand 4 of FIG. 1.
Figure 10B:
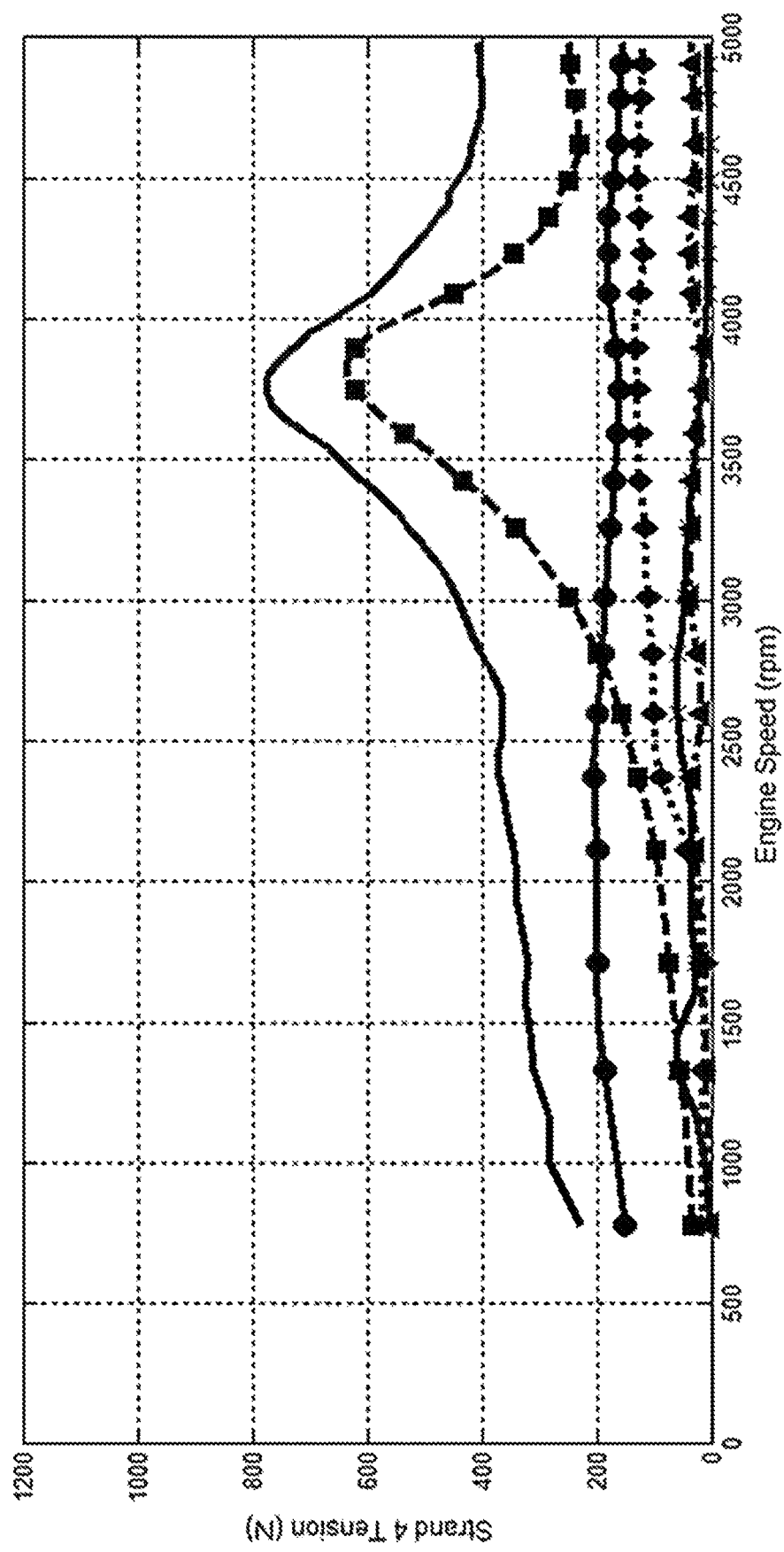
Figure 10C:
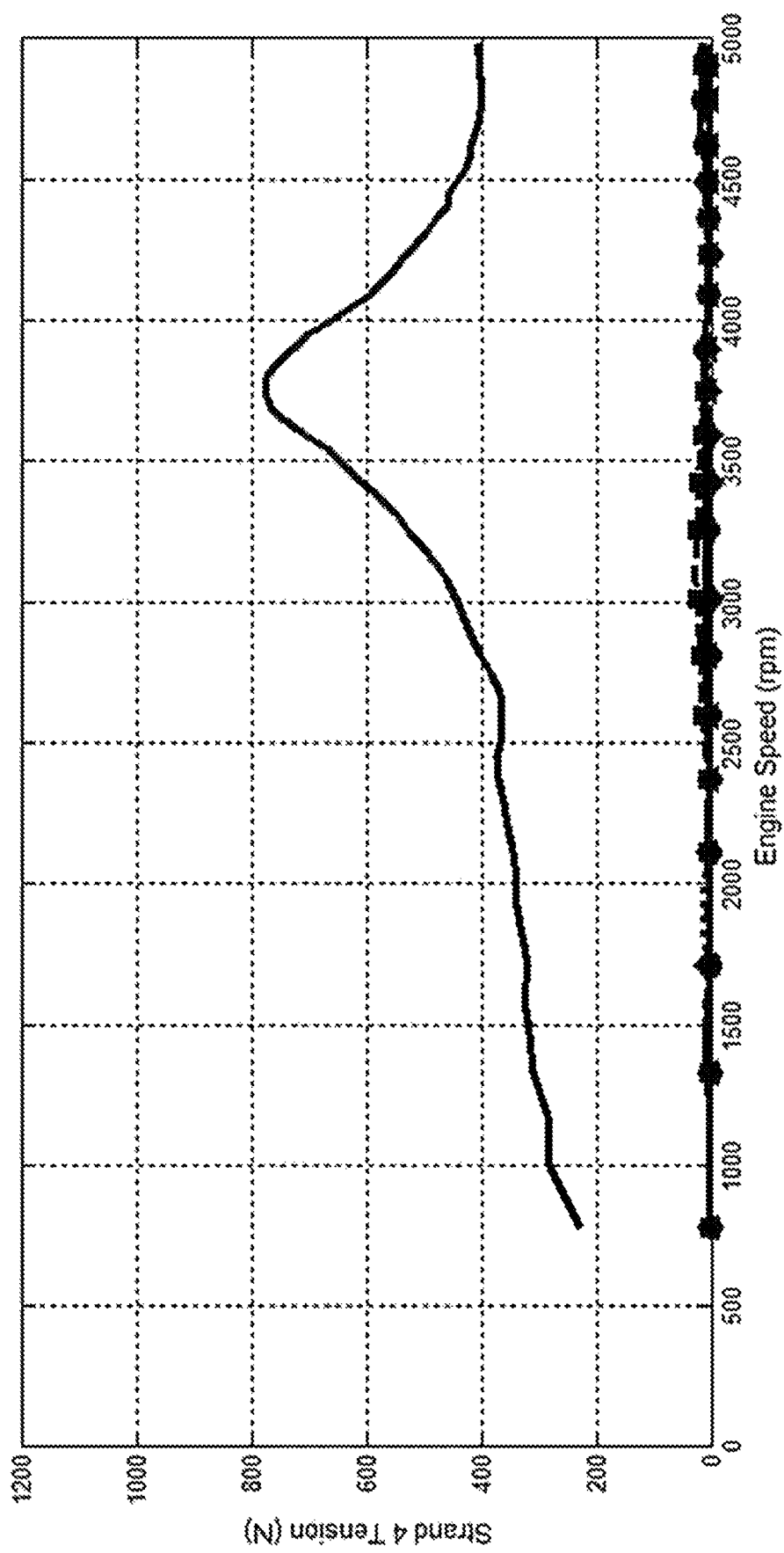
Figure 11A:
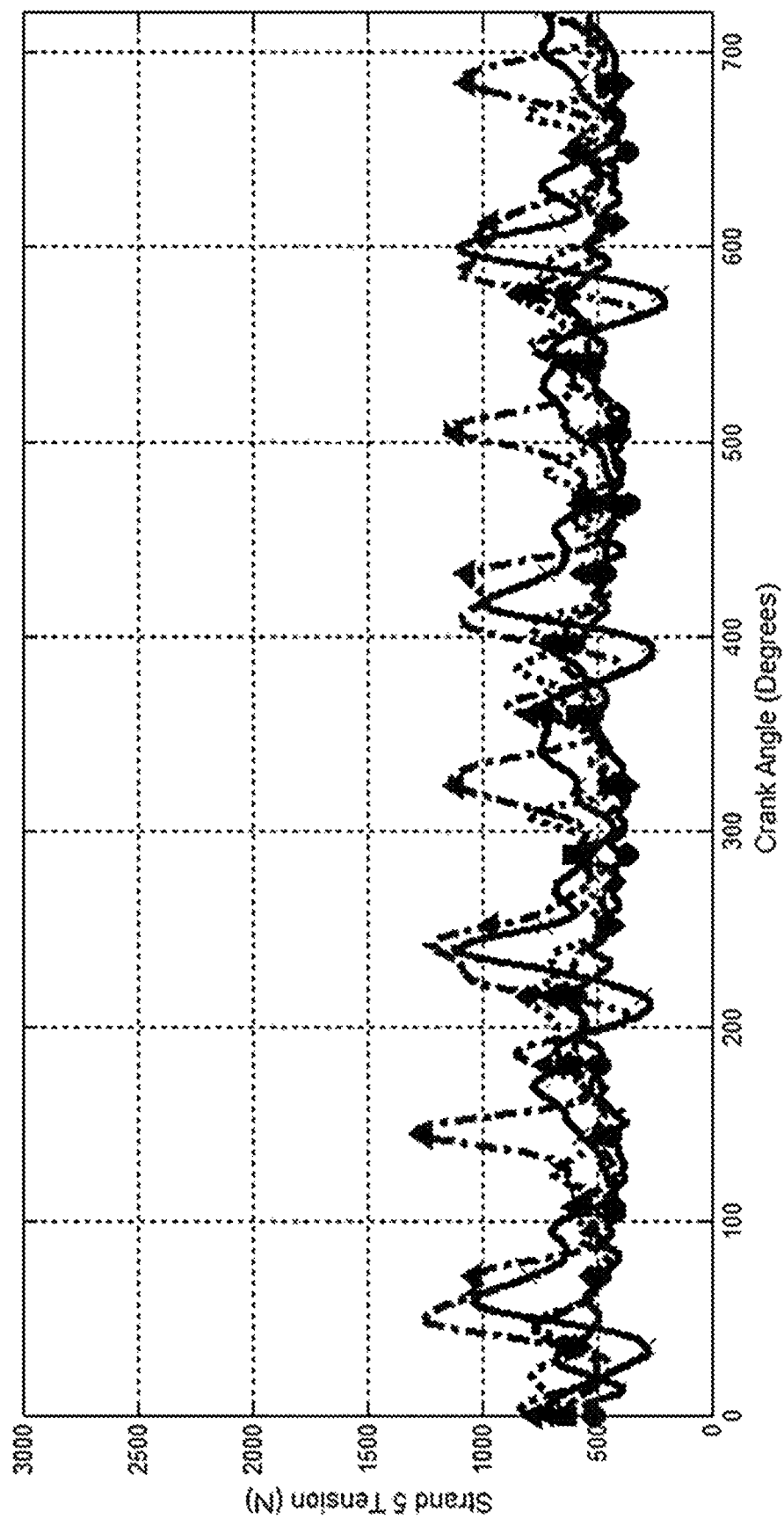
FIGS. 11a-11c show strand tensions in strand 5 of FIG. 1.
Figure 11B:
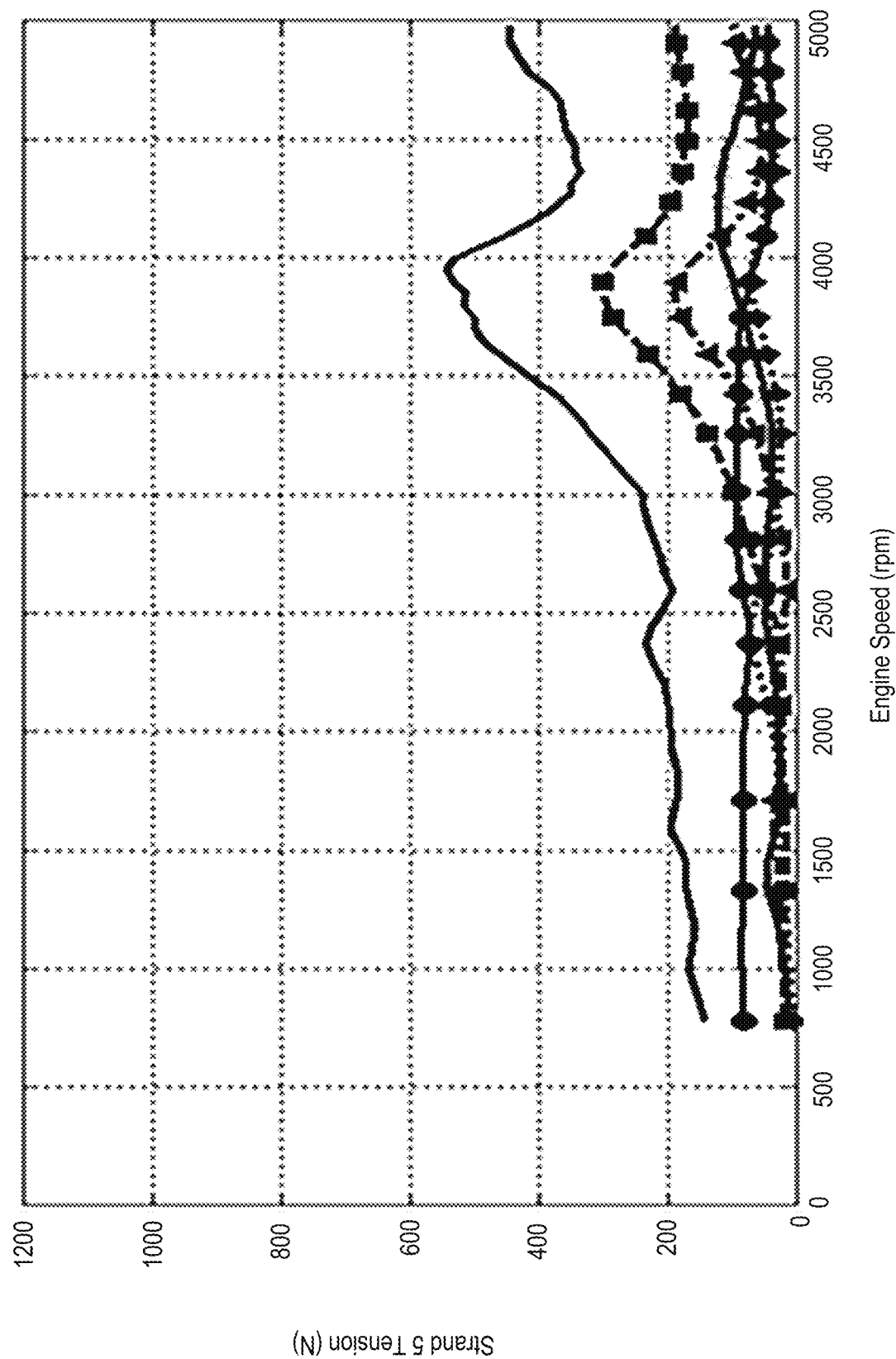
Figure 11C:
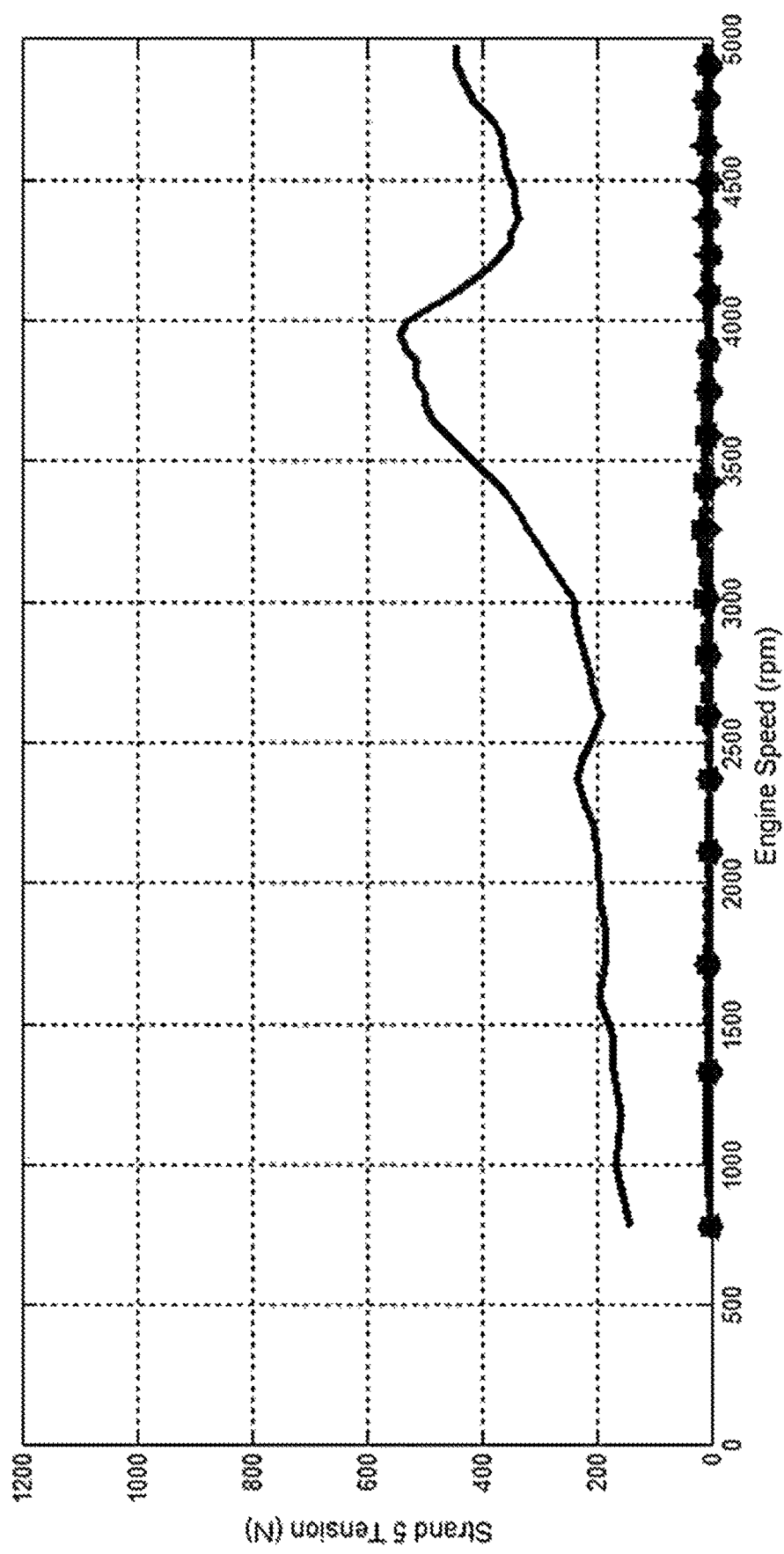
Figure 12A:
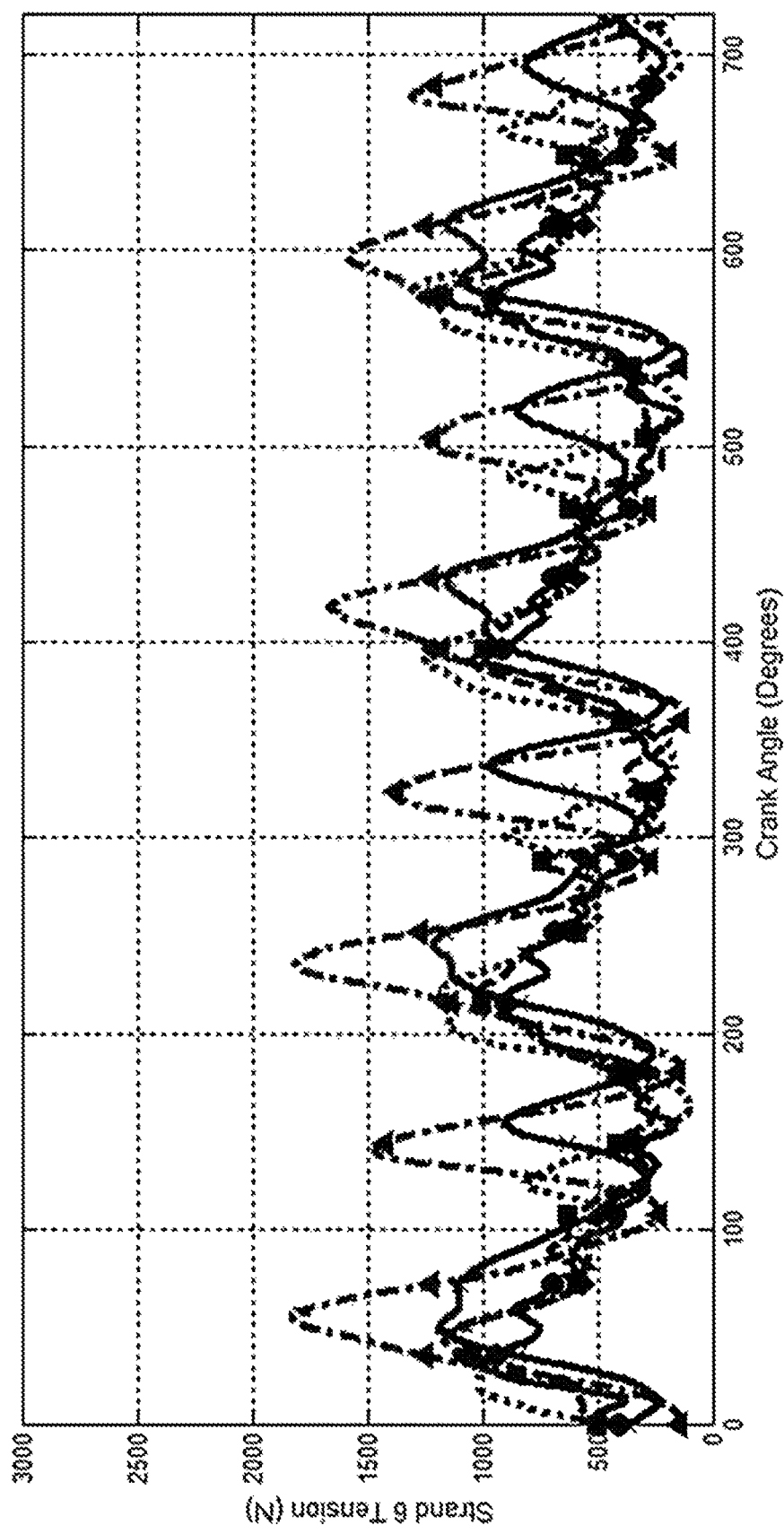
FIGS. 12a-12c show strand tensions in strand 6 of FIG. 1.
Figure 12B:
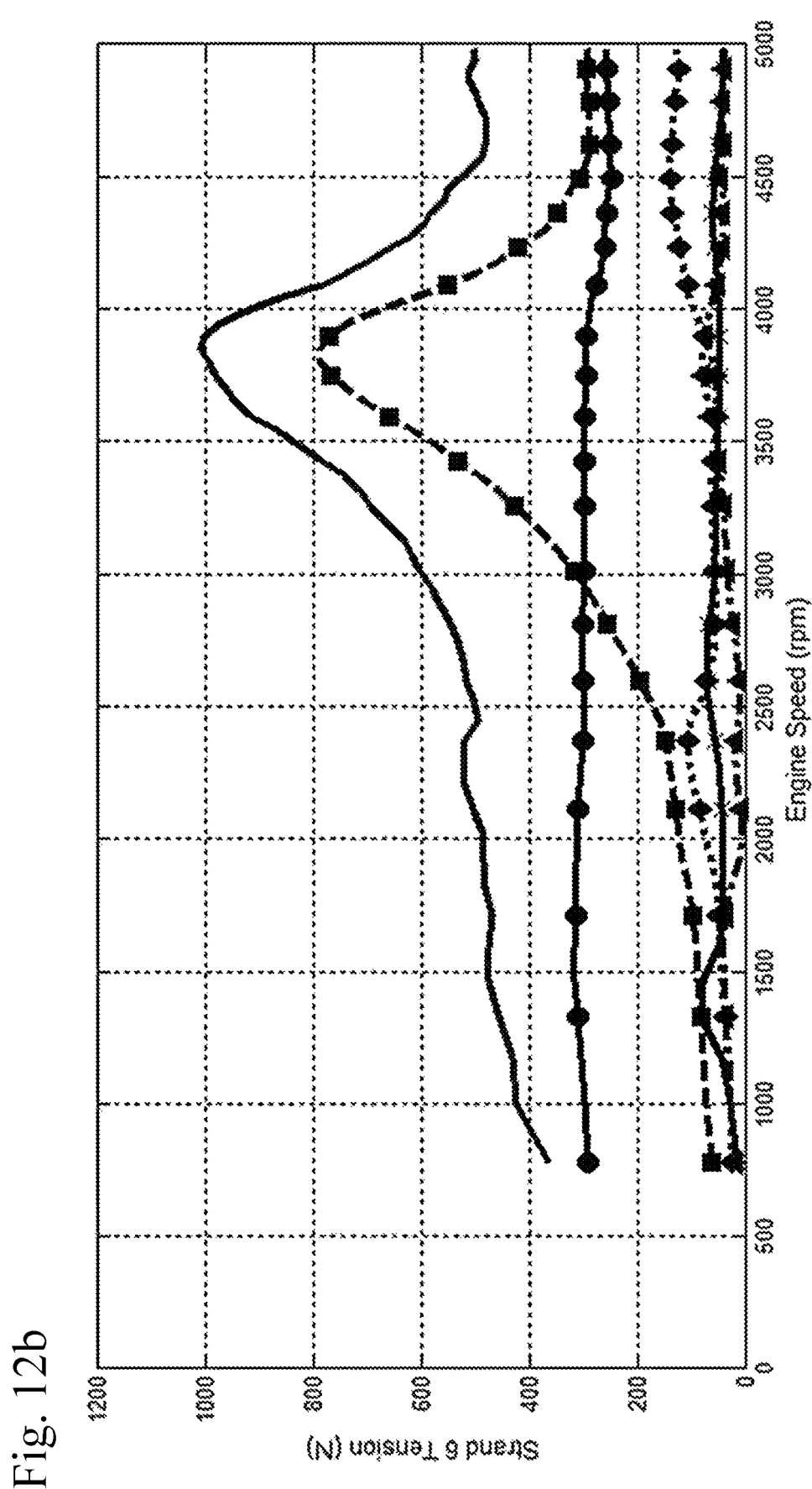
Figure 12C:
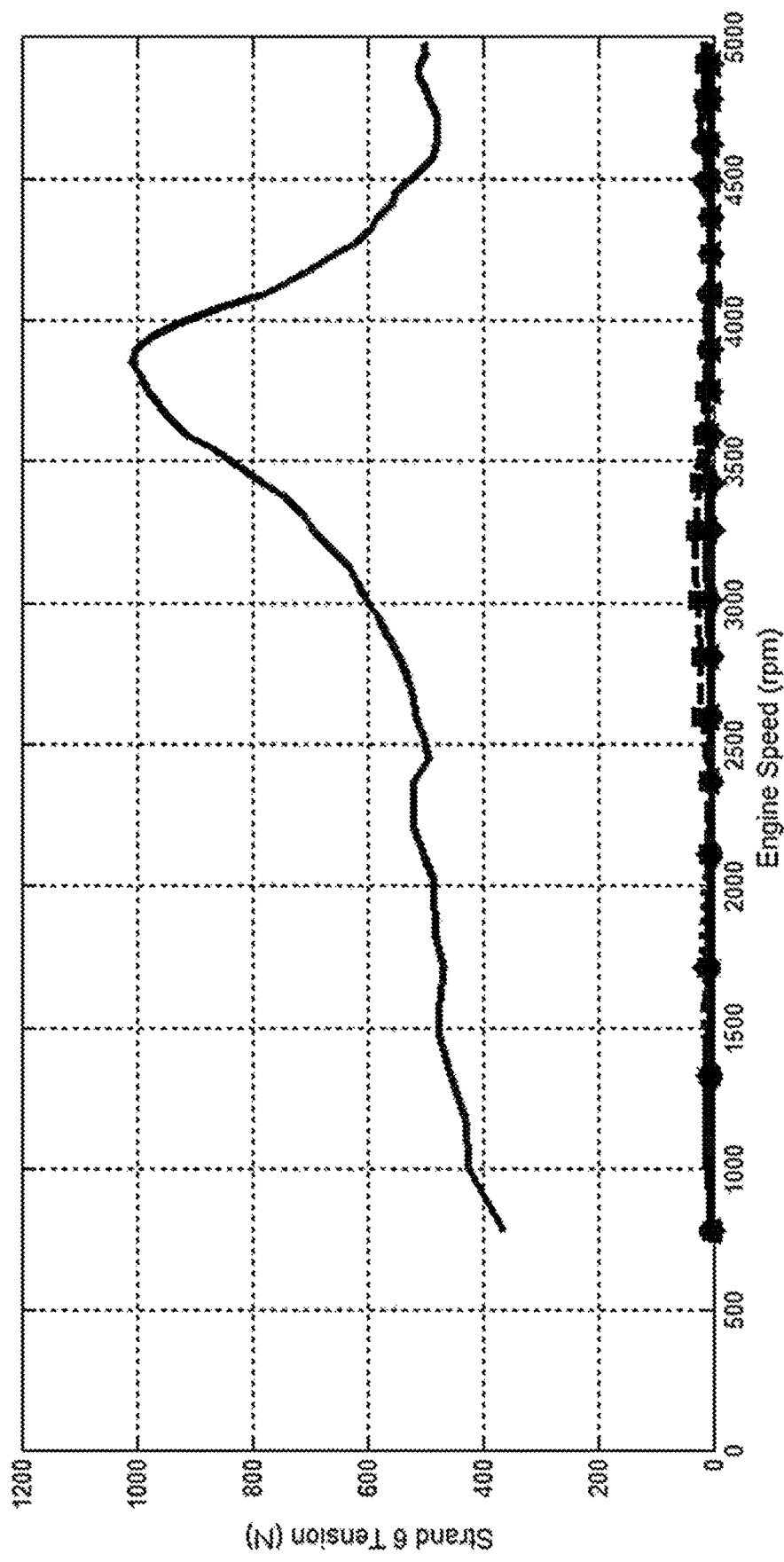

FIGS. 6a and 6b shows the maximum and minimum tensions in each strand of the fuel pump chain 10 and cam timing chain 20 vs engine speed (calculated using a chain drive dynamic simulation computer program). These tensions are the result of the external oscillating excitations. The maximum tensions are very close to the endurance limits of the chains (for example, 2800 Newtons for the primary chain and 2300 Newtons for the secondary chain).

The time traces and order amplitudes for each strand tension are shown in FIGS. 7a-12c, in which FIGS. 7a, 8a, 9a, 10a, 11a and 12a show strand tension vs crank angle at various engine speeds for strands 1-6, respectively; FIGS. 7b, 8b, 9b, 10b, 11b and 12b show strand tensions vs engine speed for orders 4, 8, 12, 16 and 20; and FIGS. 7c, 8c, 9c, 10c, 11c and 12c show strand tensions vs engine speed for orders 6, 10, 14, 18 and 22.

Note from FIGS. 7a-12c that there is a major peak in tension at around 3500-4000 RPM engine speed due to the first torsional resonance of the chain drive. This is most noticeable in the 8th engine cycle order. The amplification of the 8th engine cycle order causes the highest chain tensions.

FIGS. 13a-13f show summary views of a baseline system as shown in FIG. 1, in which the sprockets 30-34 are "straight" sprockets—that is, sprockets without randomization or other modifications for noise or torque or tension adjustment.

Figure 13A:
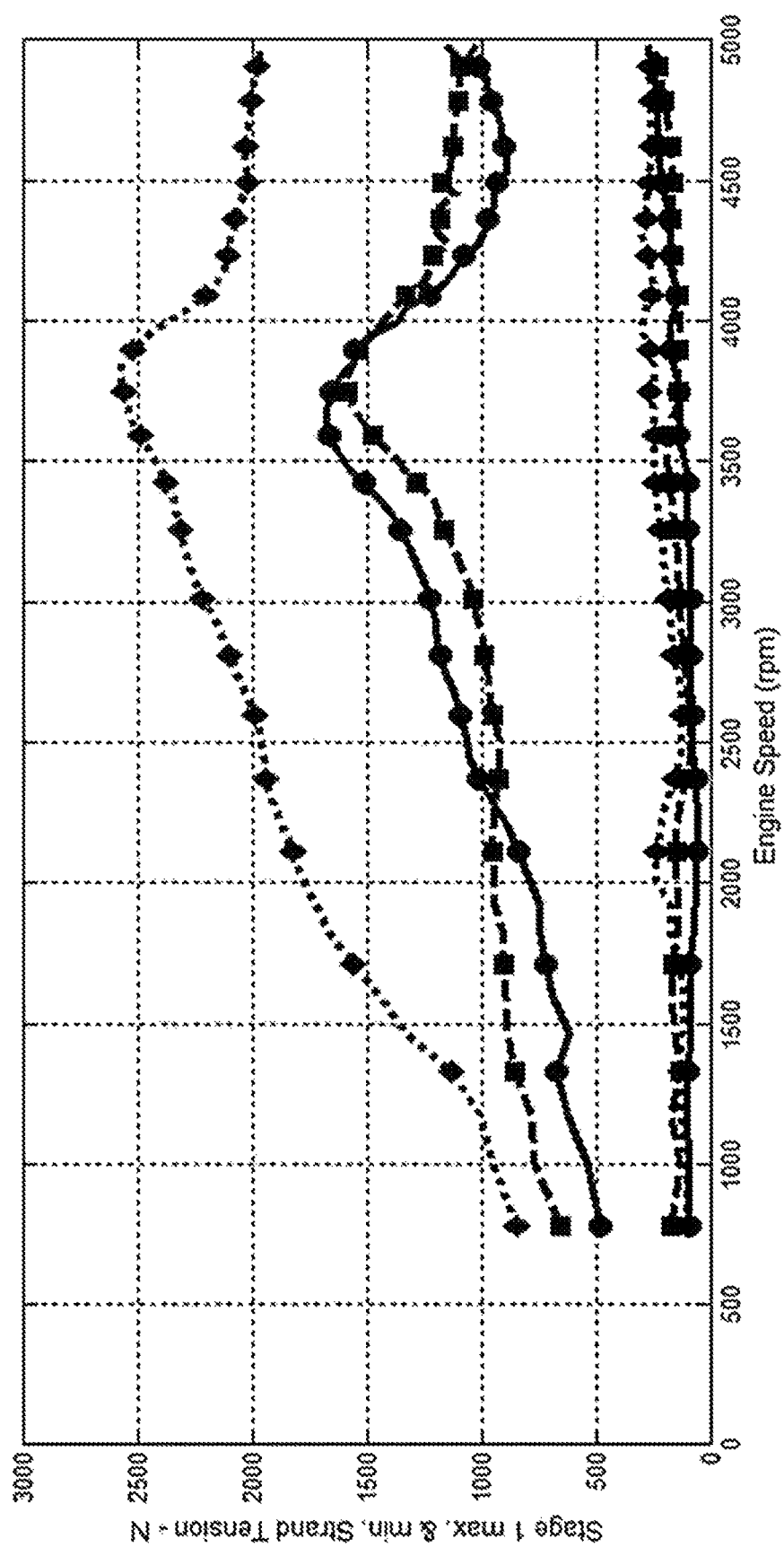
FIGS. 13a-13f show summary graphs for a baseline system as shown in FIG. 1, with "straight" sprockets.
Figure 13B:
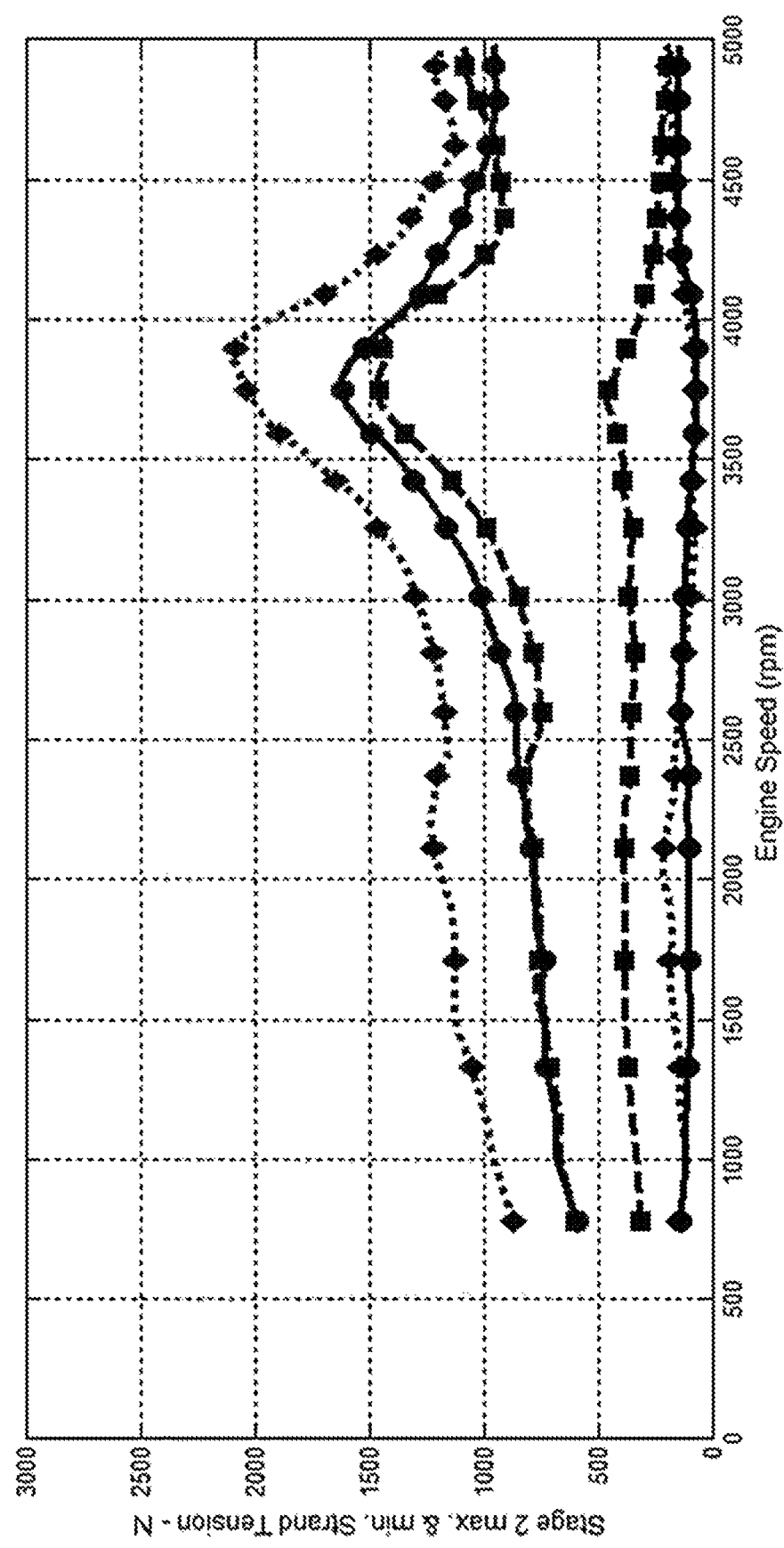
Figure 13C:
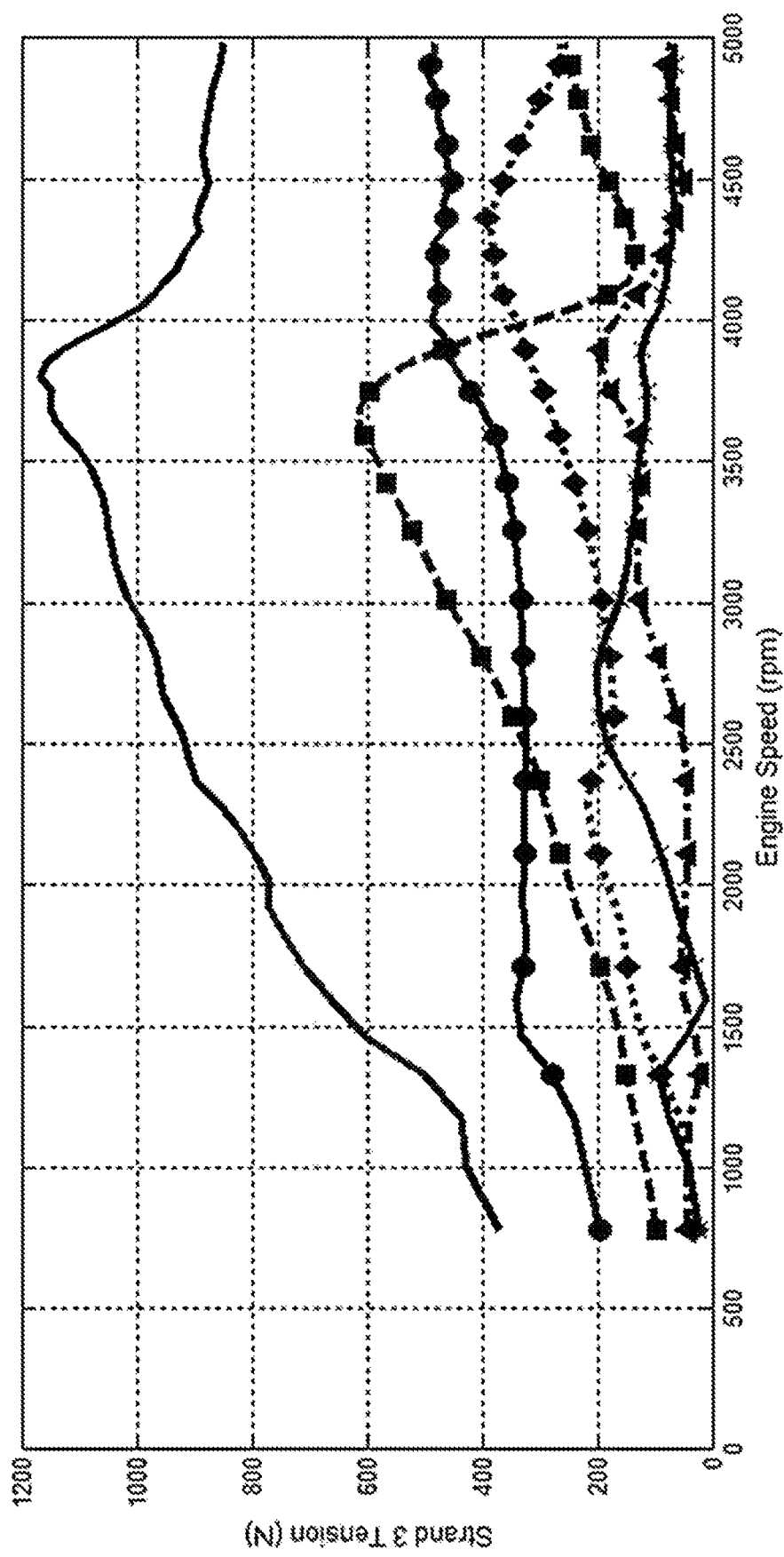
Figure 13D:
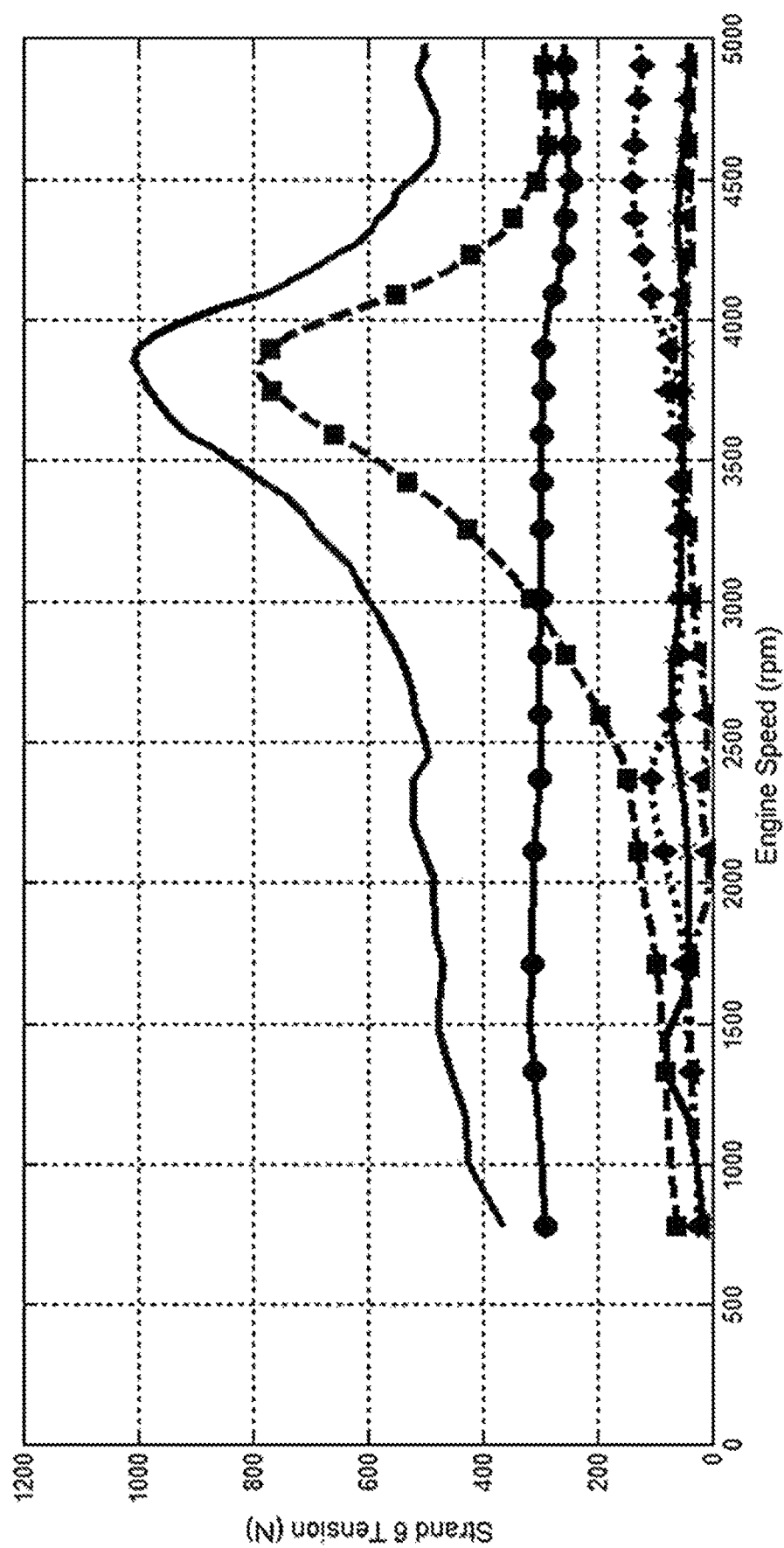
Figure 13E:
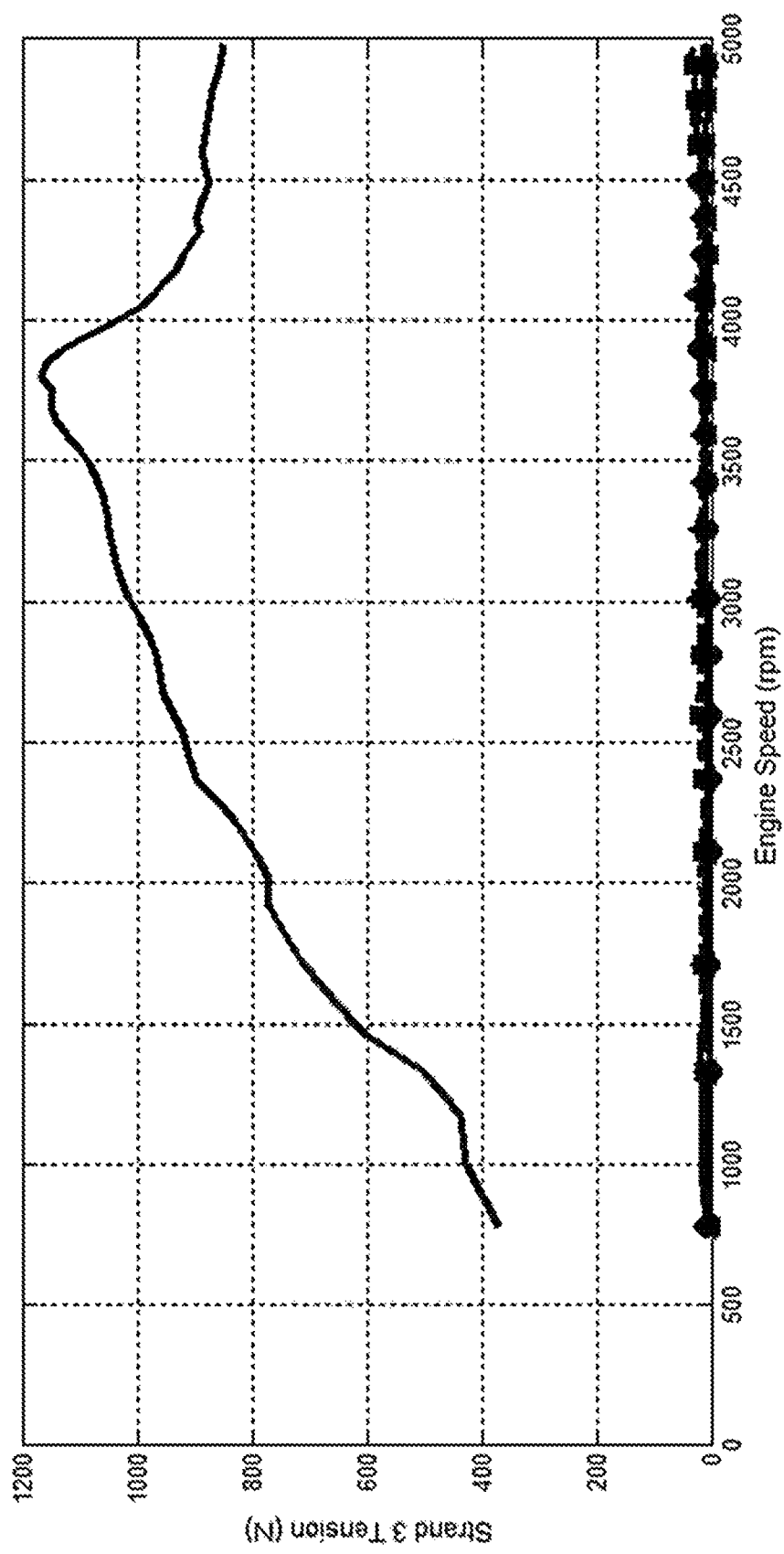
Figure 13F:
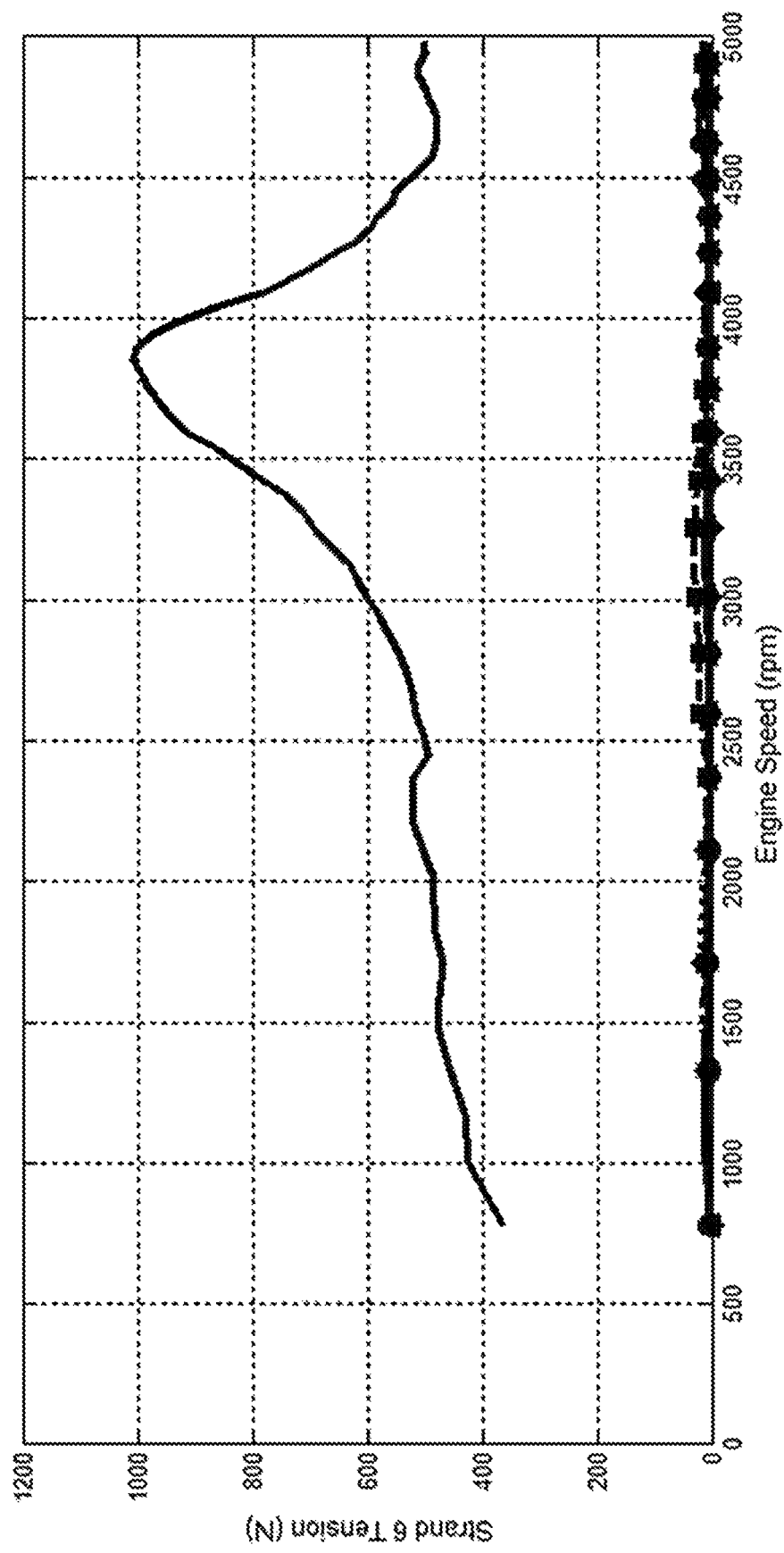
Figure 14A:
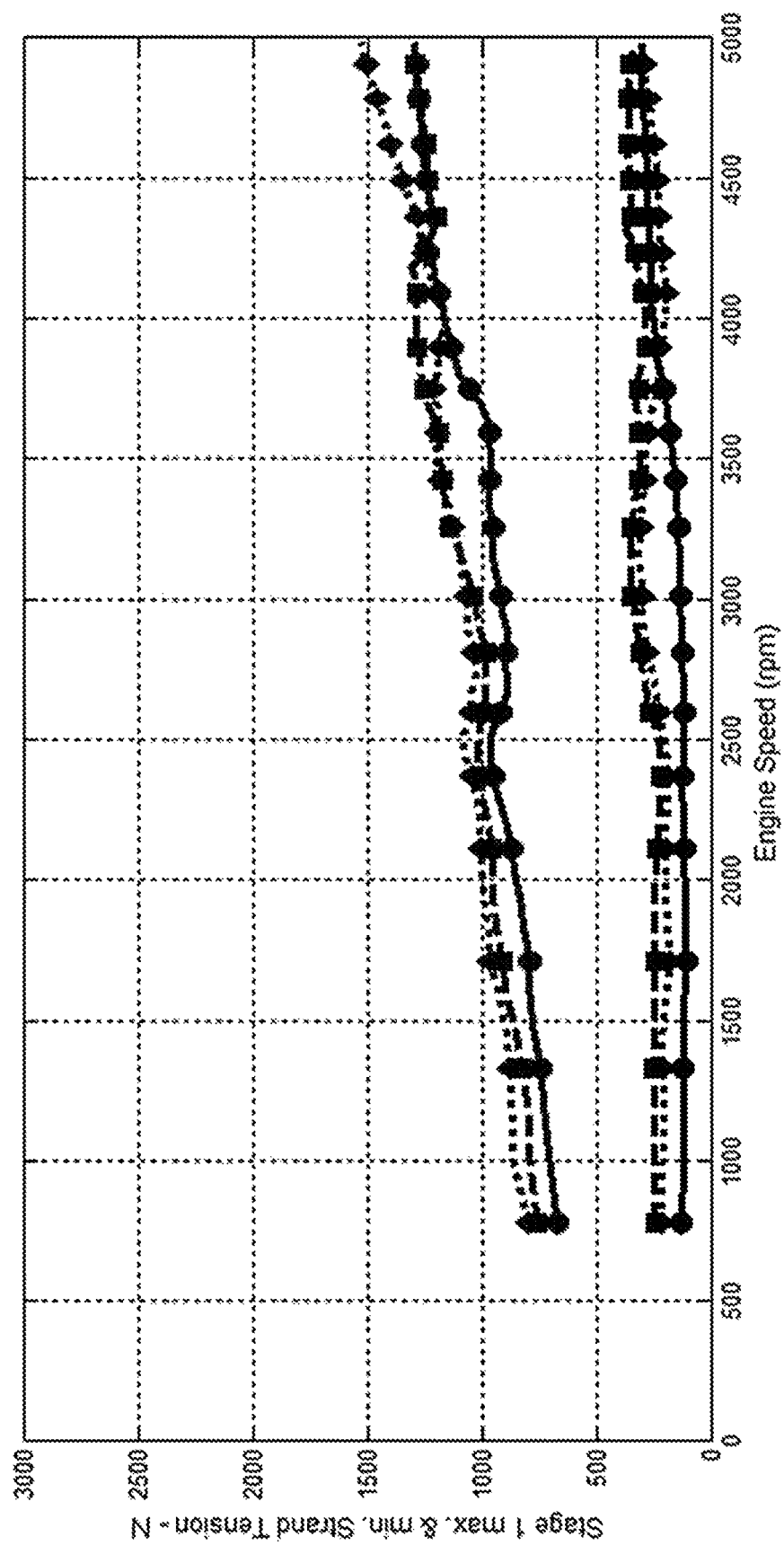
FIGS. 14a-14f show graphs for a system as shown in FIG. 1, with traditional random sprockets and no external excitations.
Figure 14B:
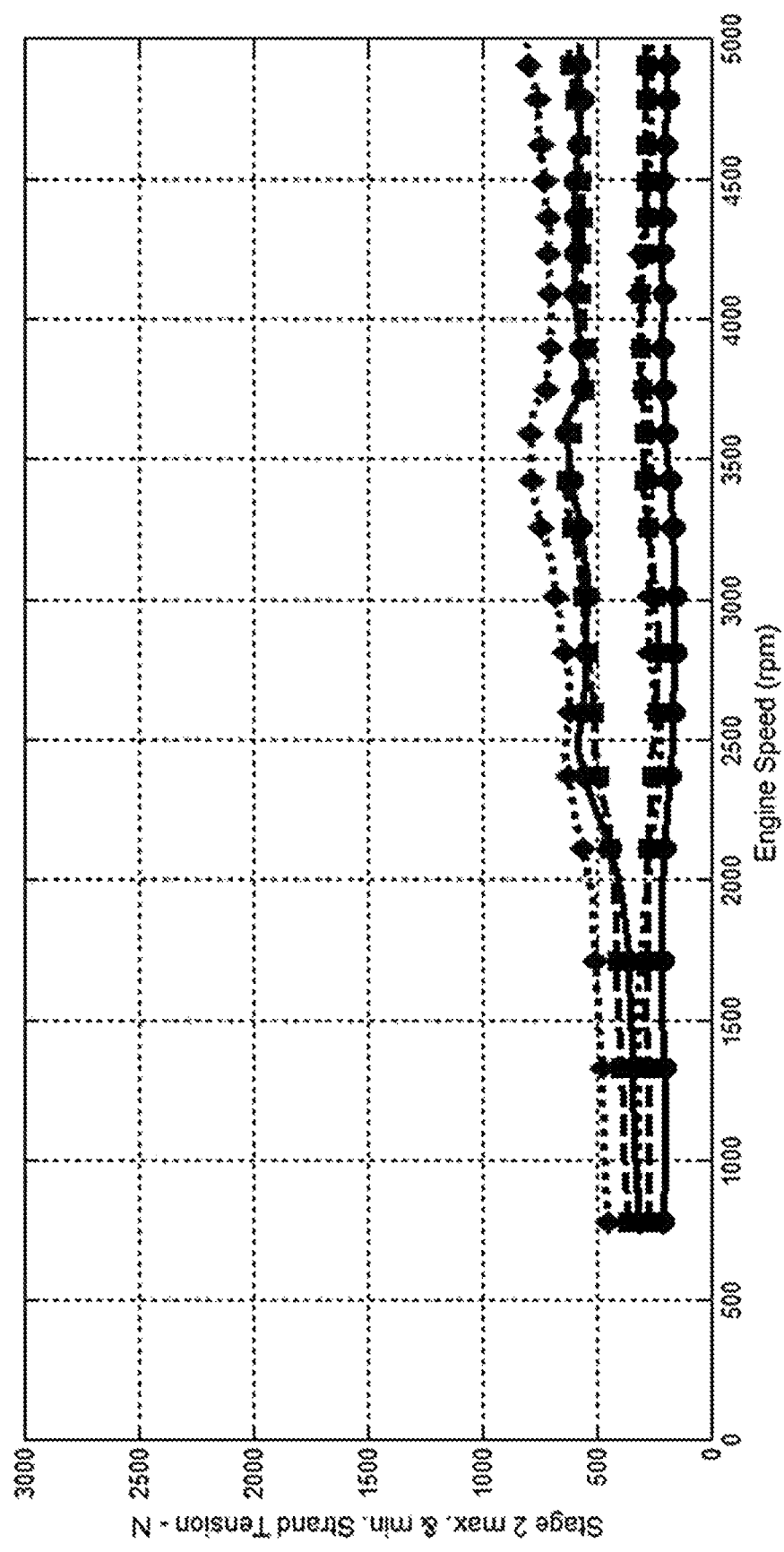
Figure 14C:
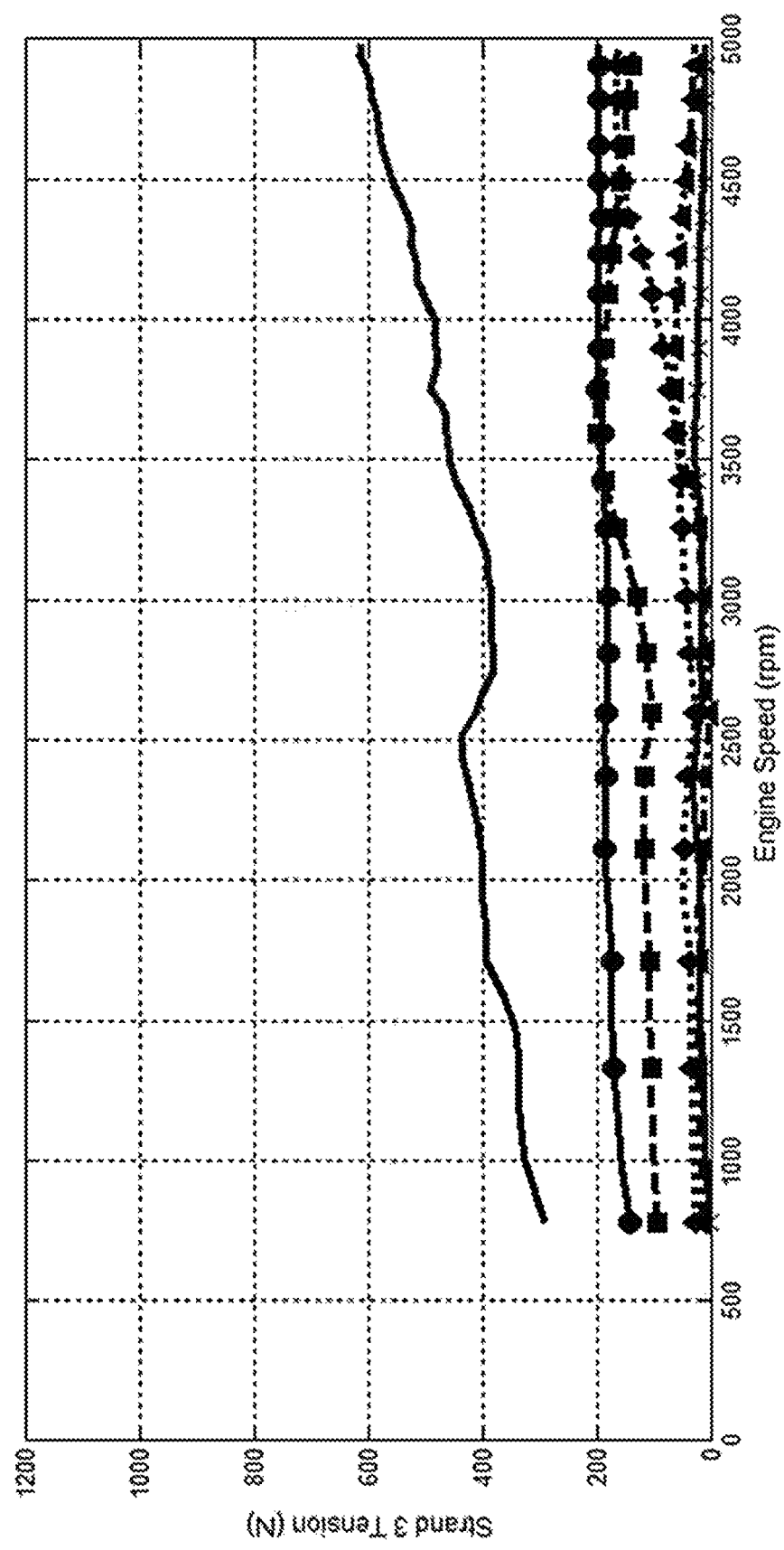
Figure 14D:
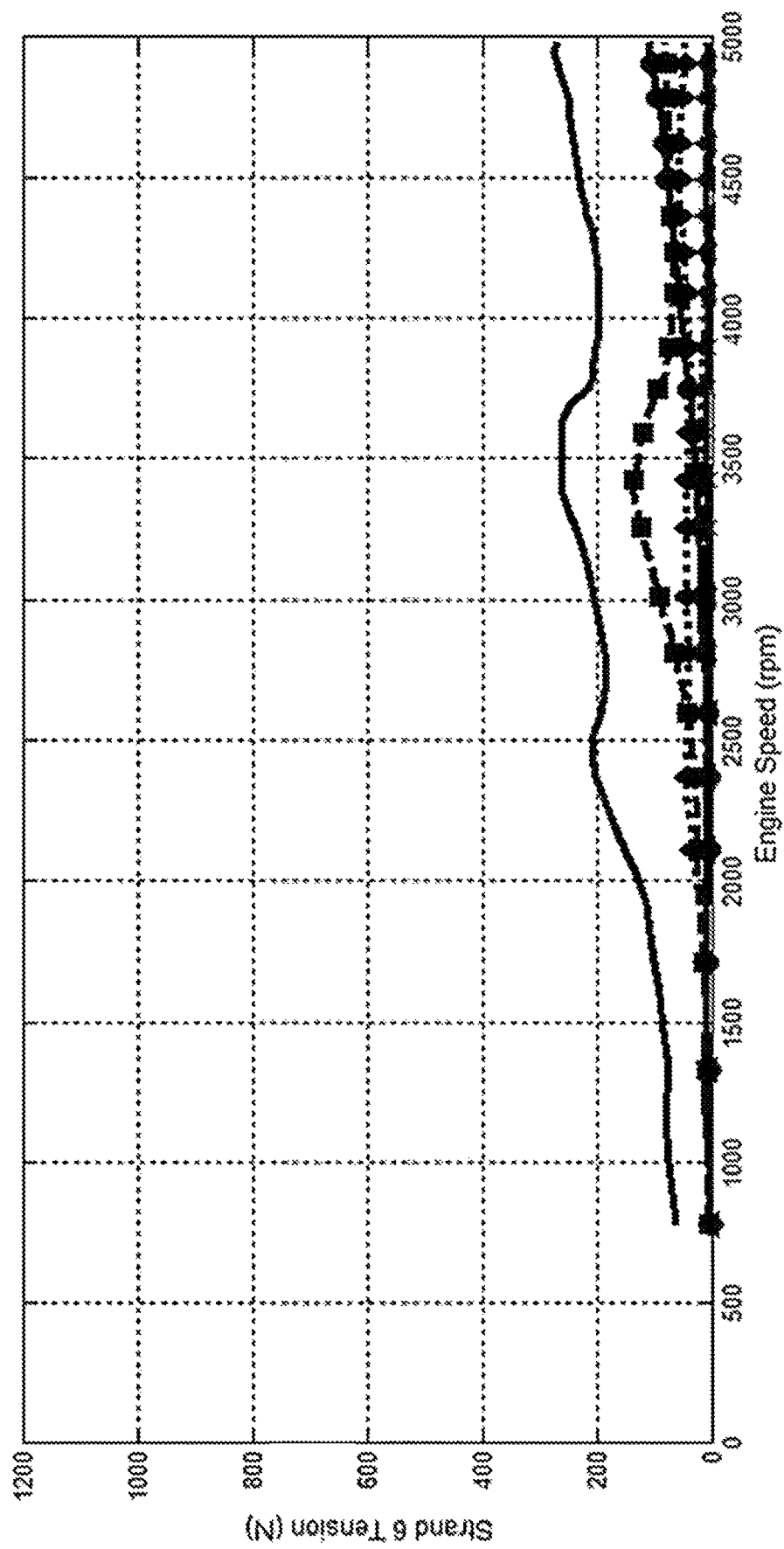
Figure 14E:
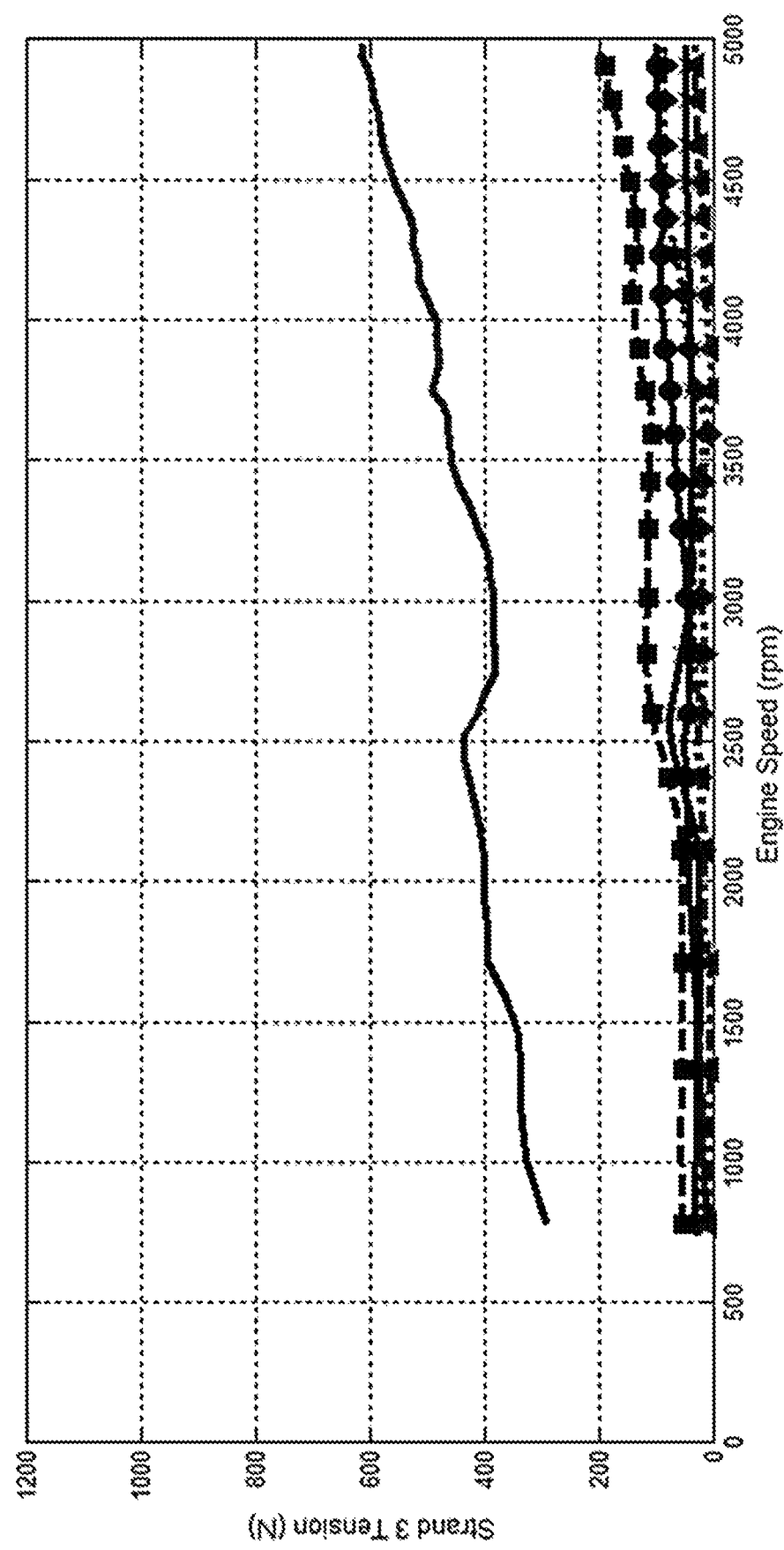
Figure 14F:
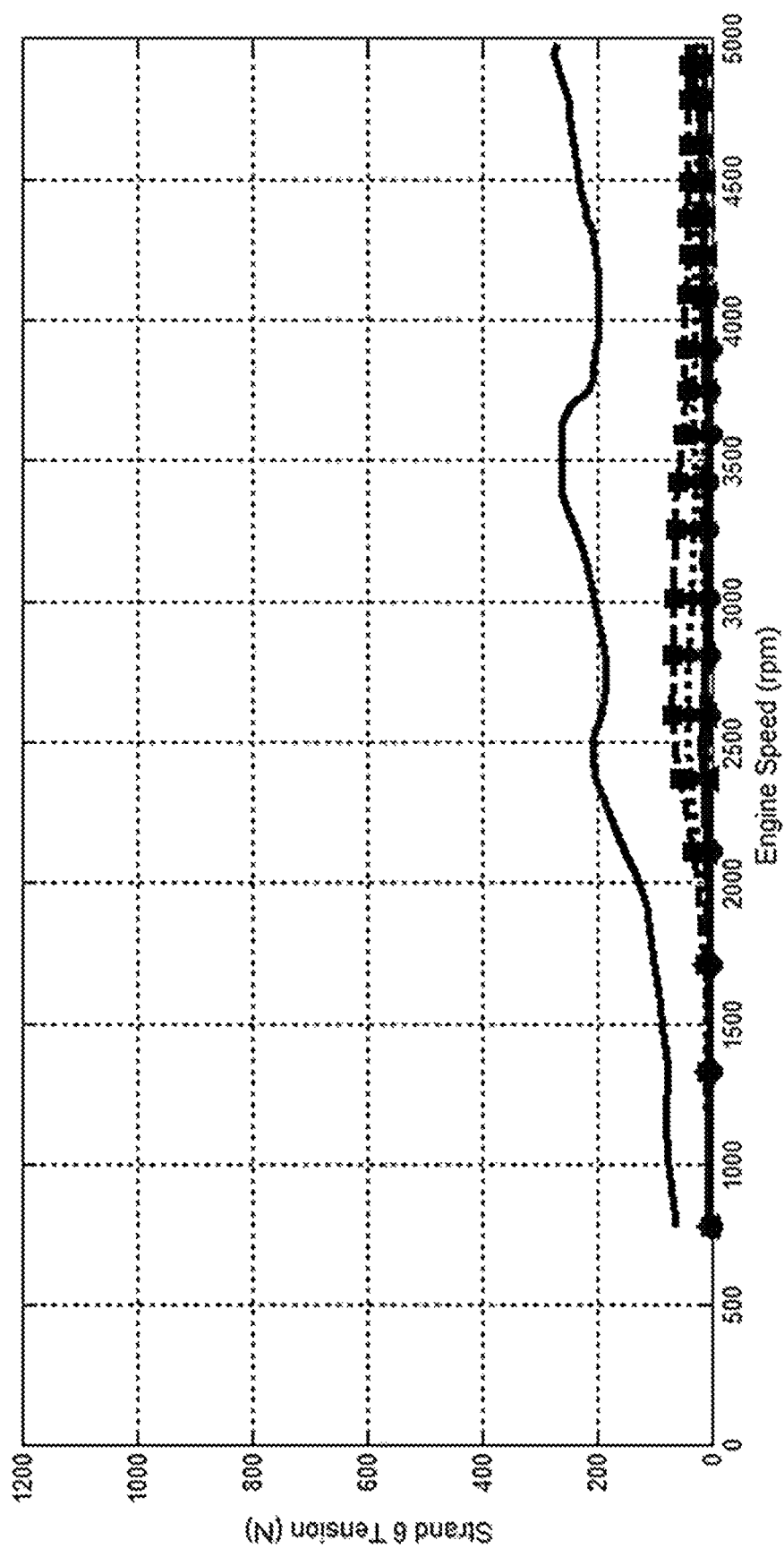
Figure 15A:
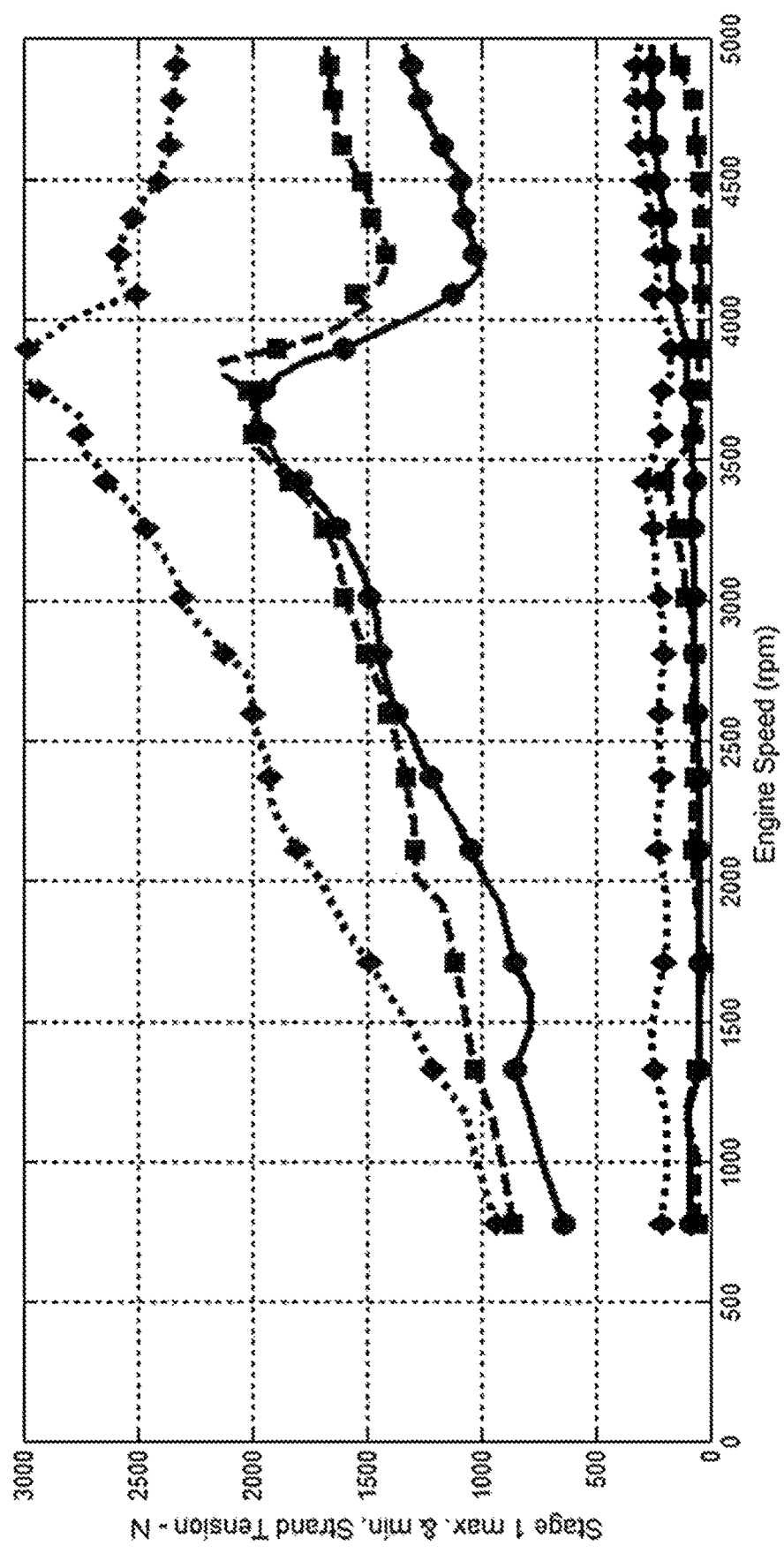
FIGS. 15a-15f show graphs for a system as shown in FIG. 1, with traditional random sprockets and with external excitations.
Figure 15B:
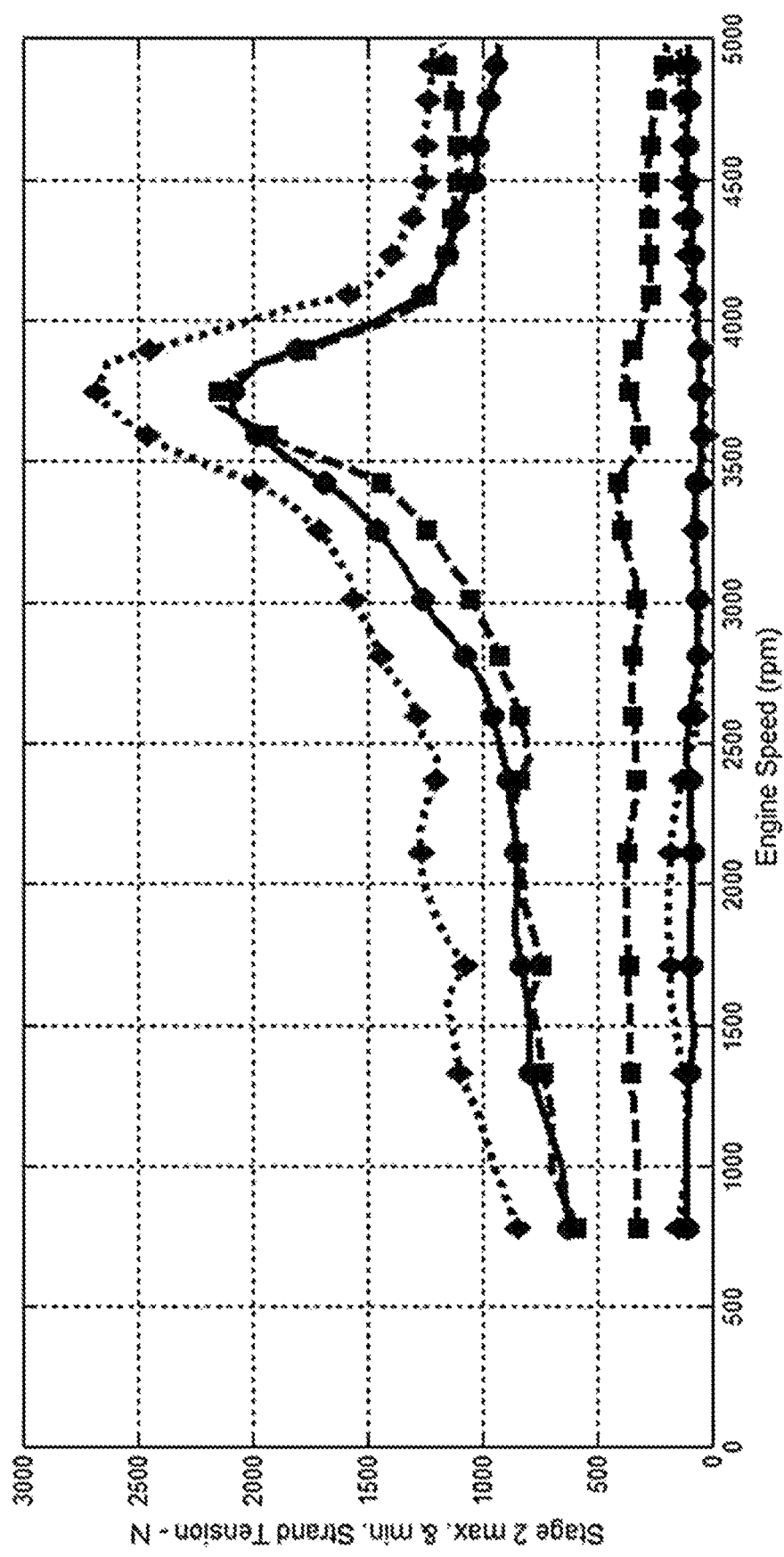
Figure 15C:
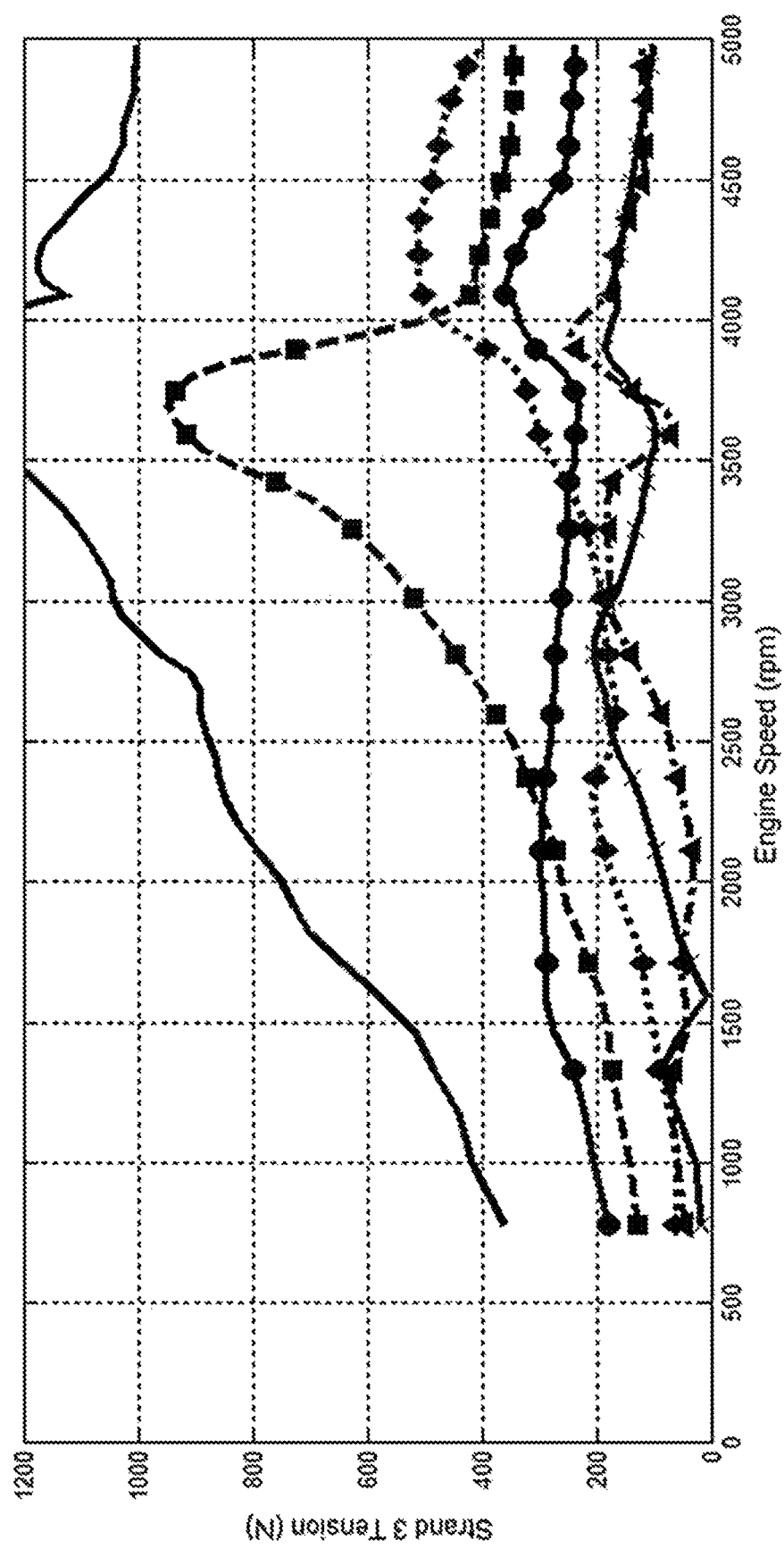
Figure 15D:
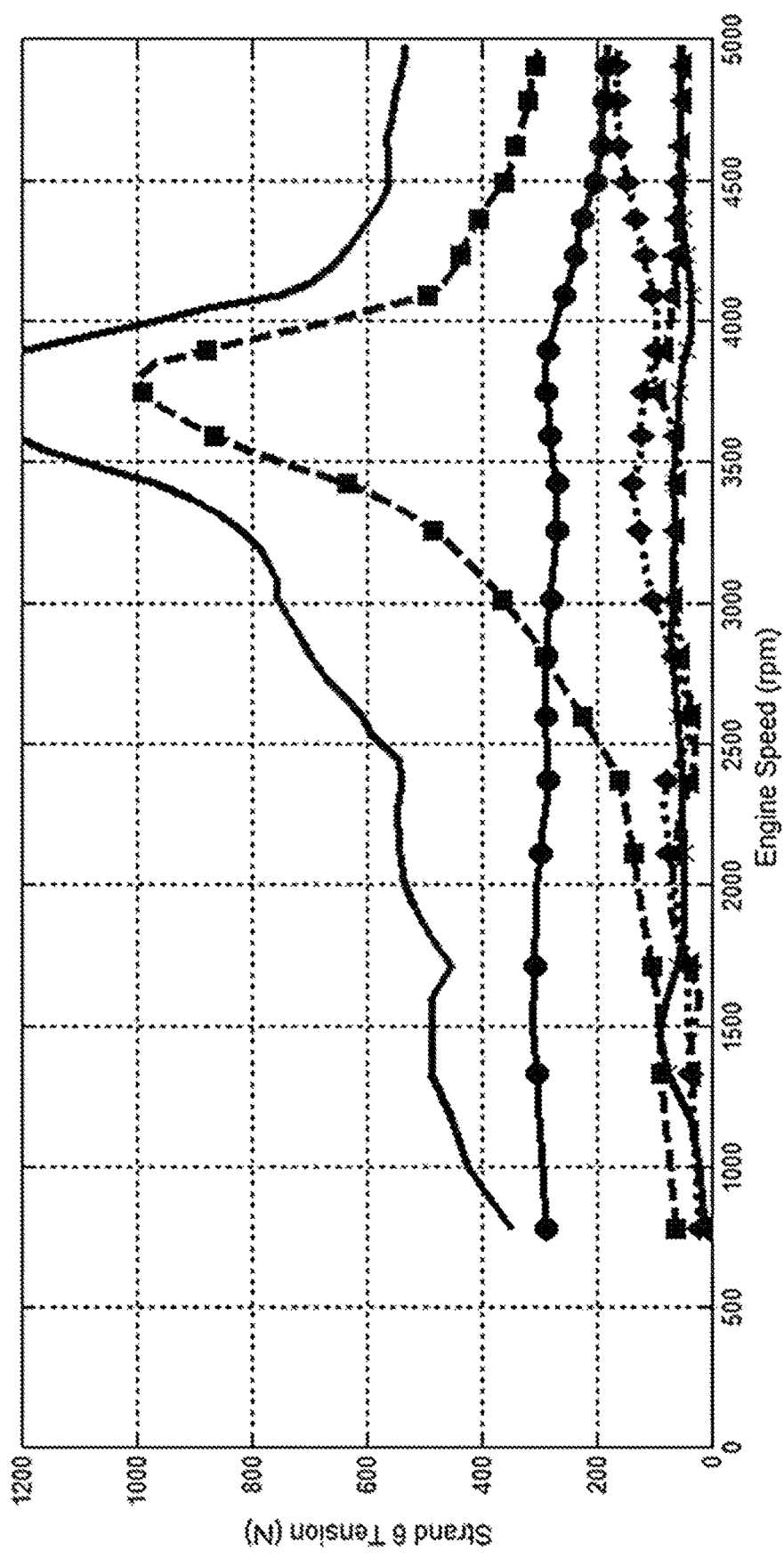
Figure 15E:
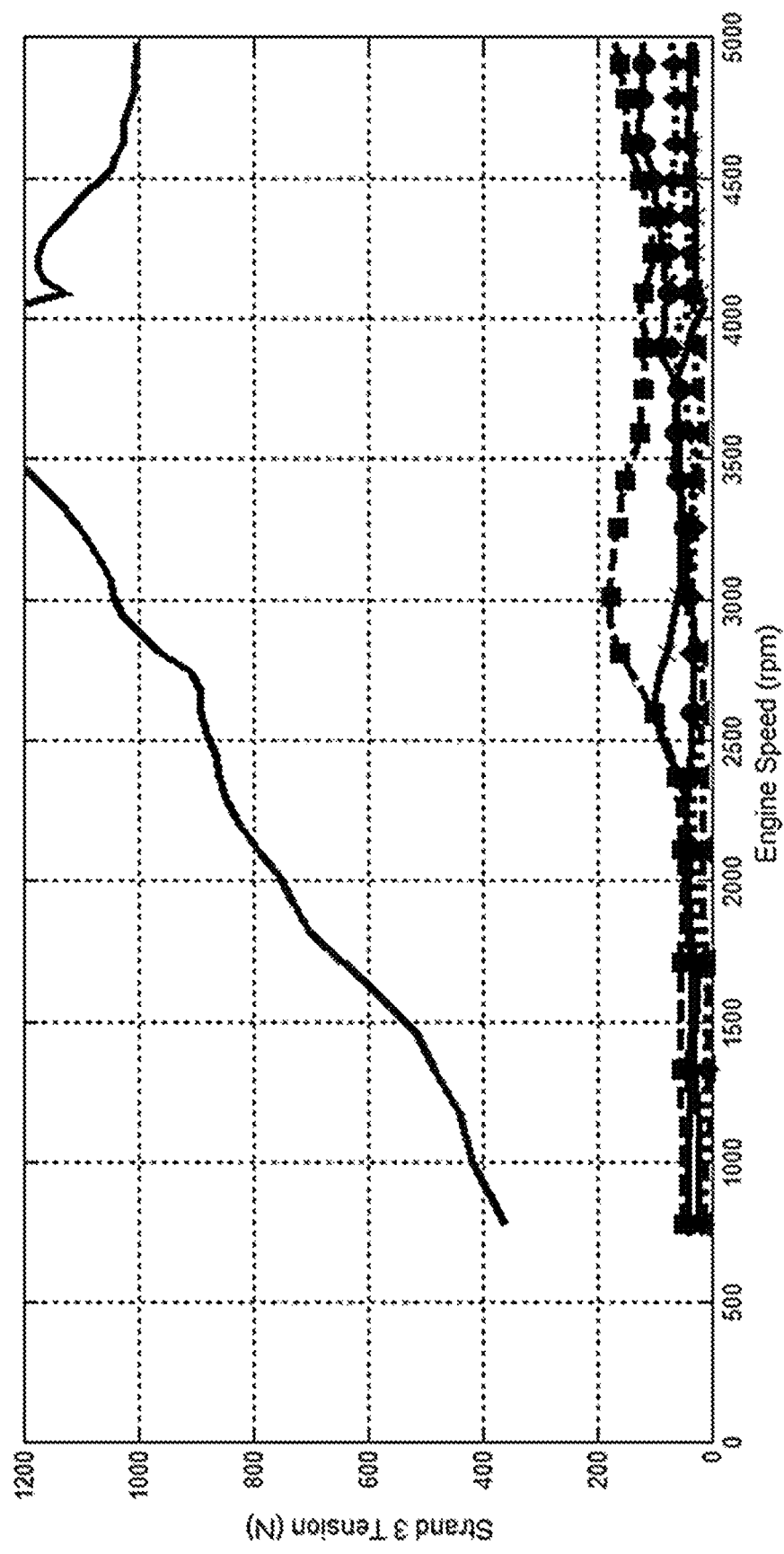
Figure 15F:
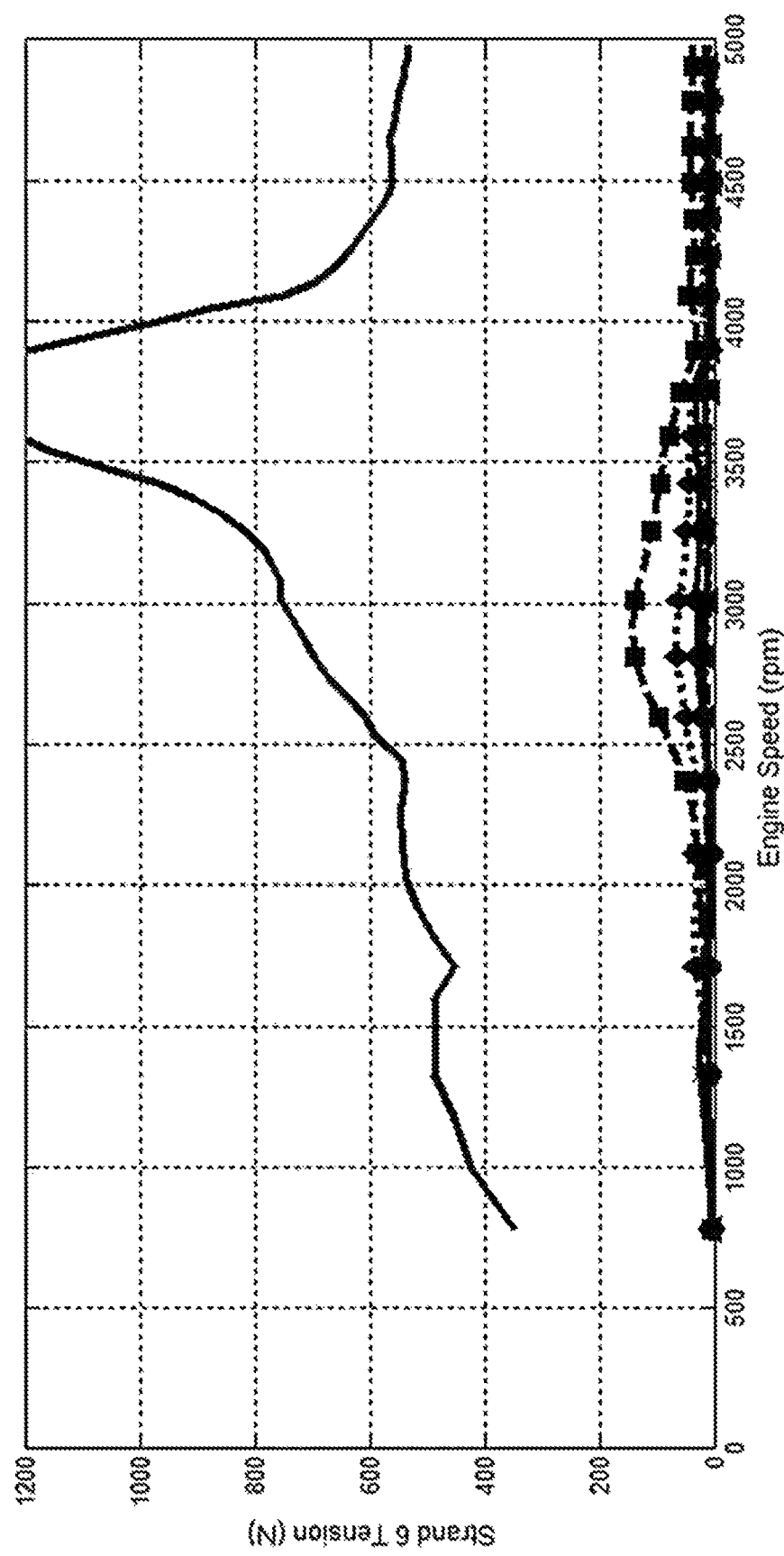
Figure 16A:
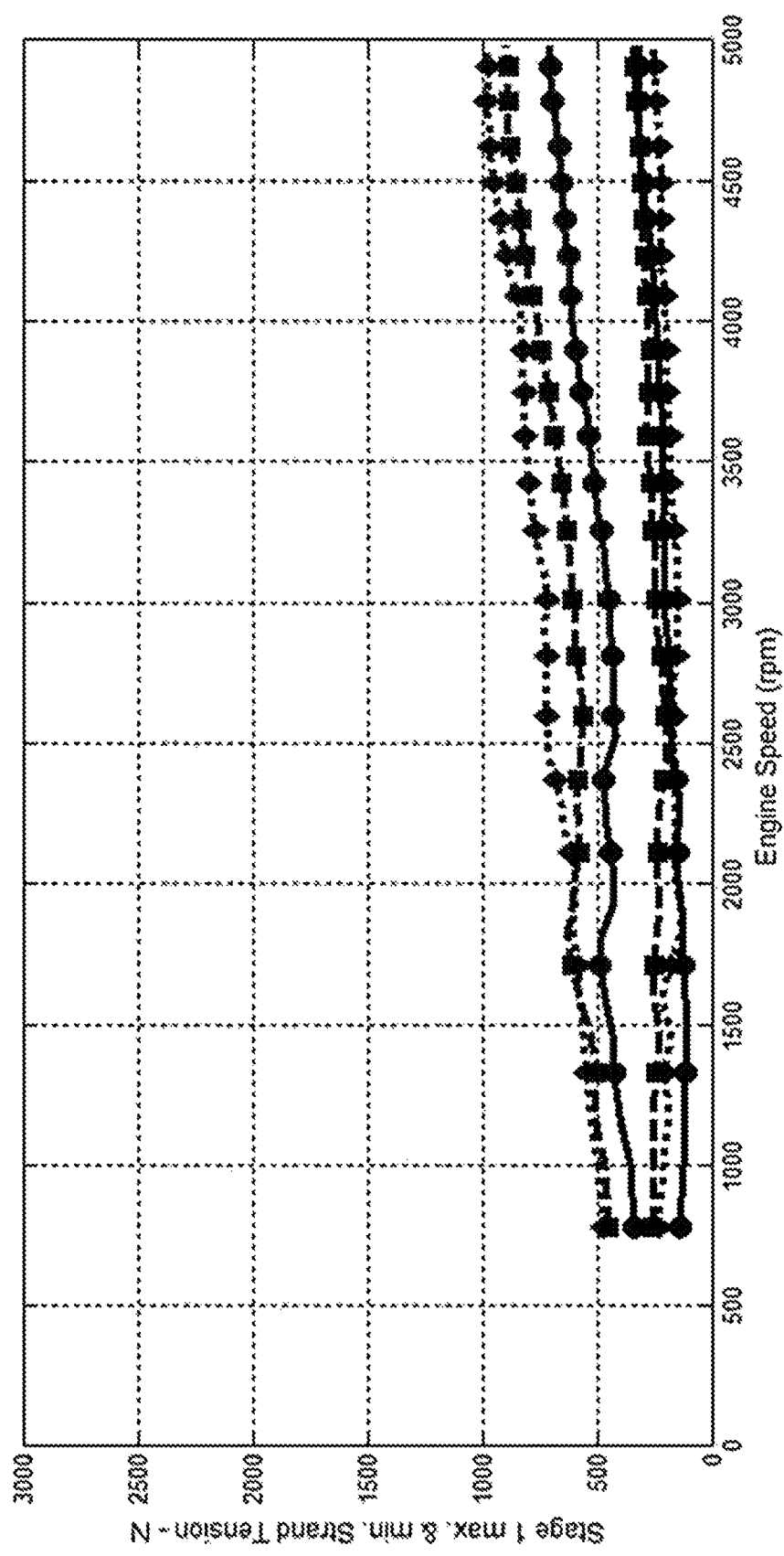
FIGS. 16a-16f show graphs for a system as shown in FIG. 1, with the non-prevalent order (NPO) random sprockets of the invention, and no external excitations.
Figure 16B:
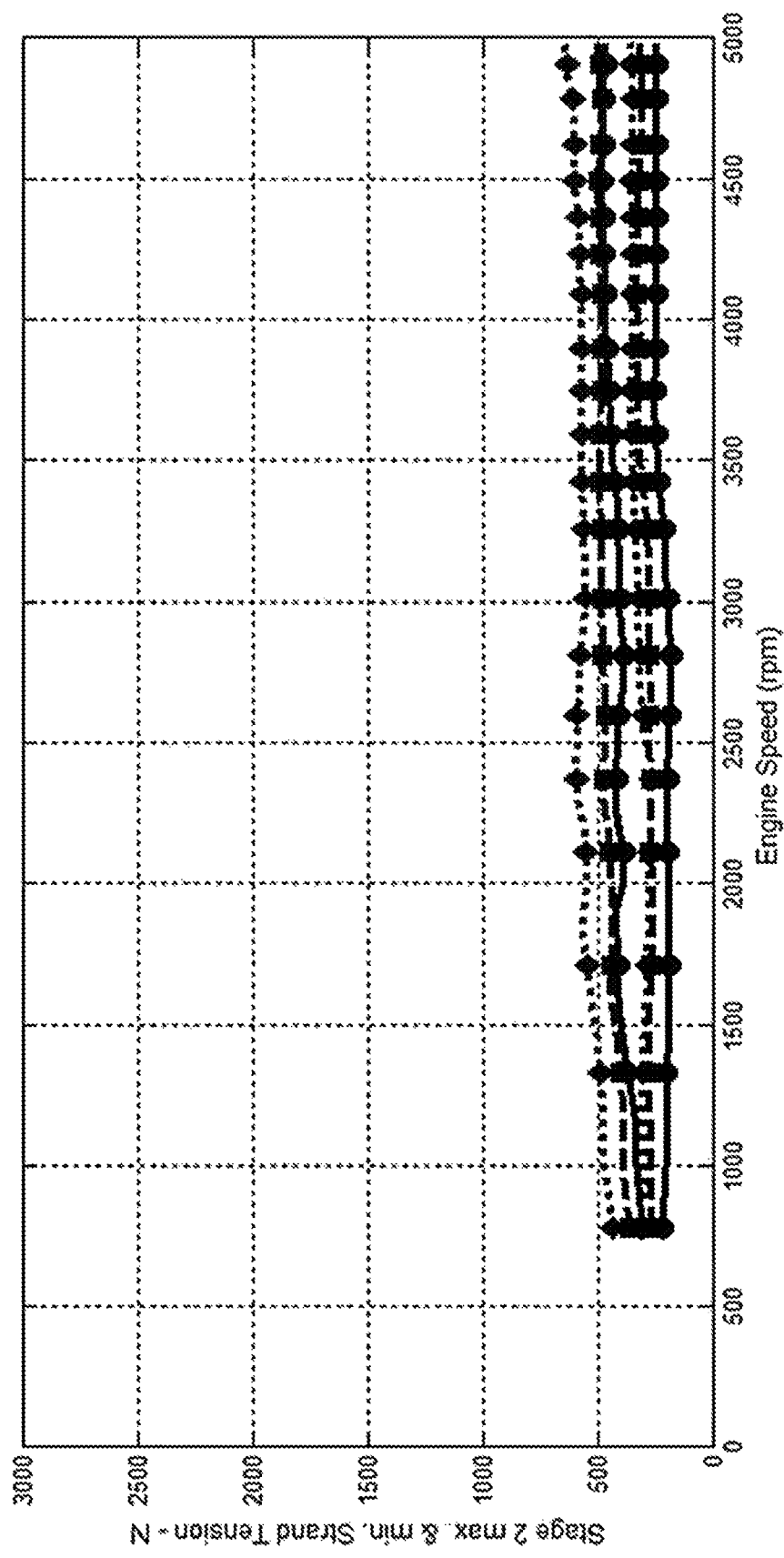
Figure 16C:
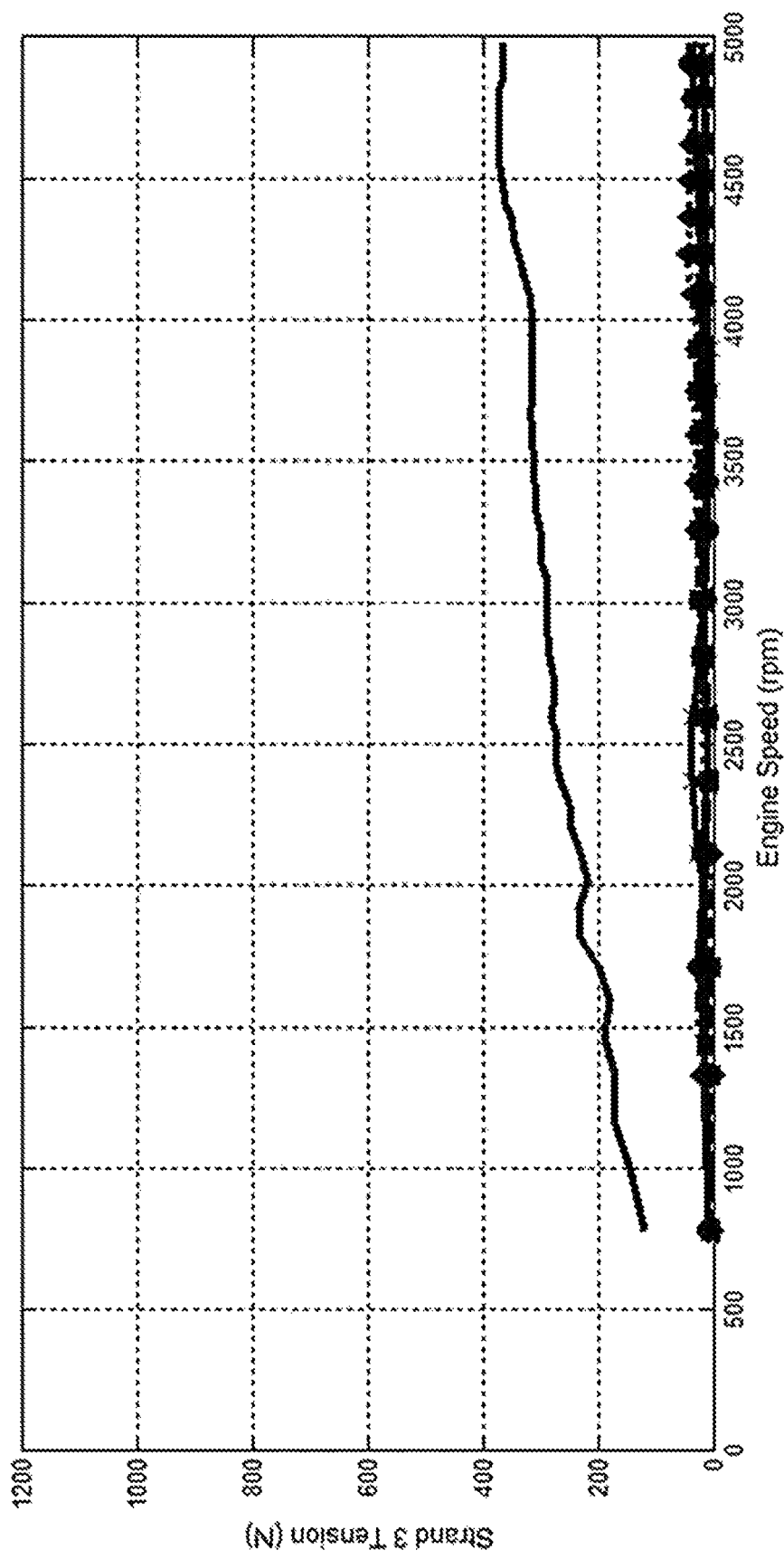
Figure 16D:
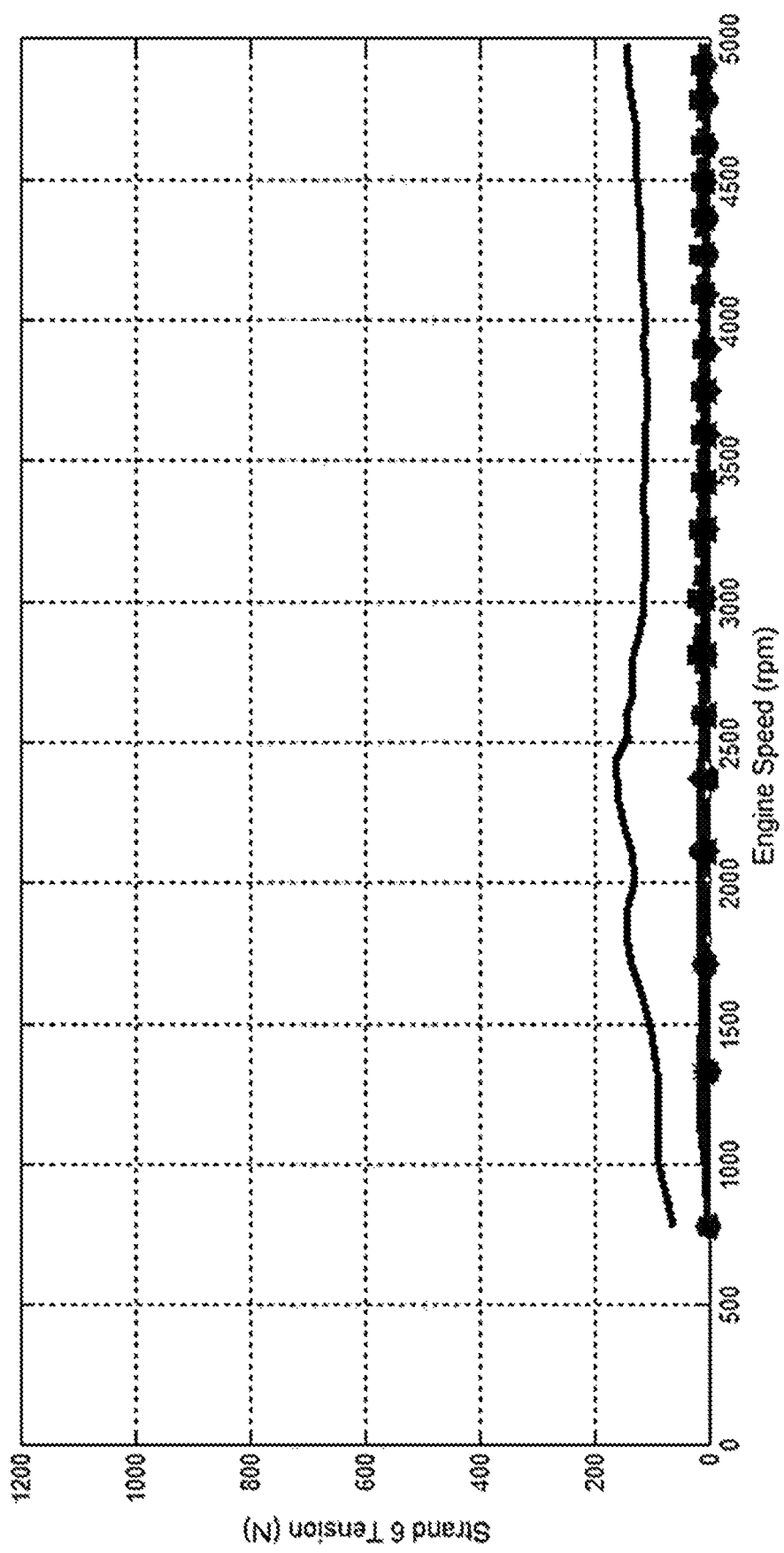
Figure 16E:
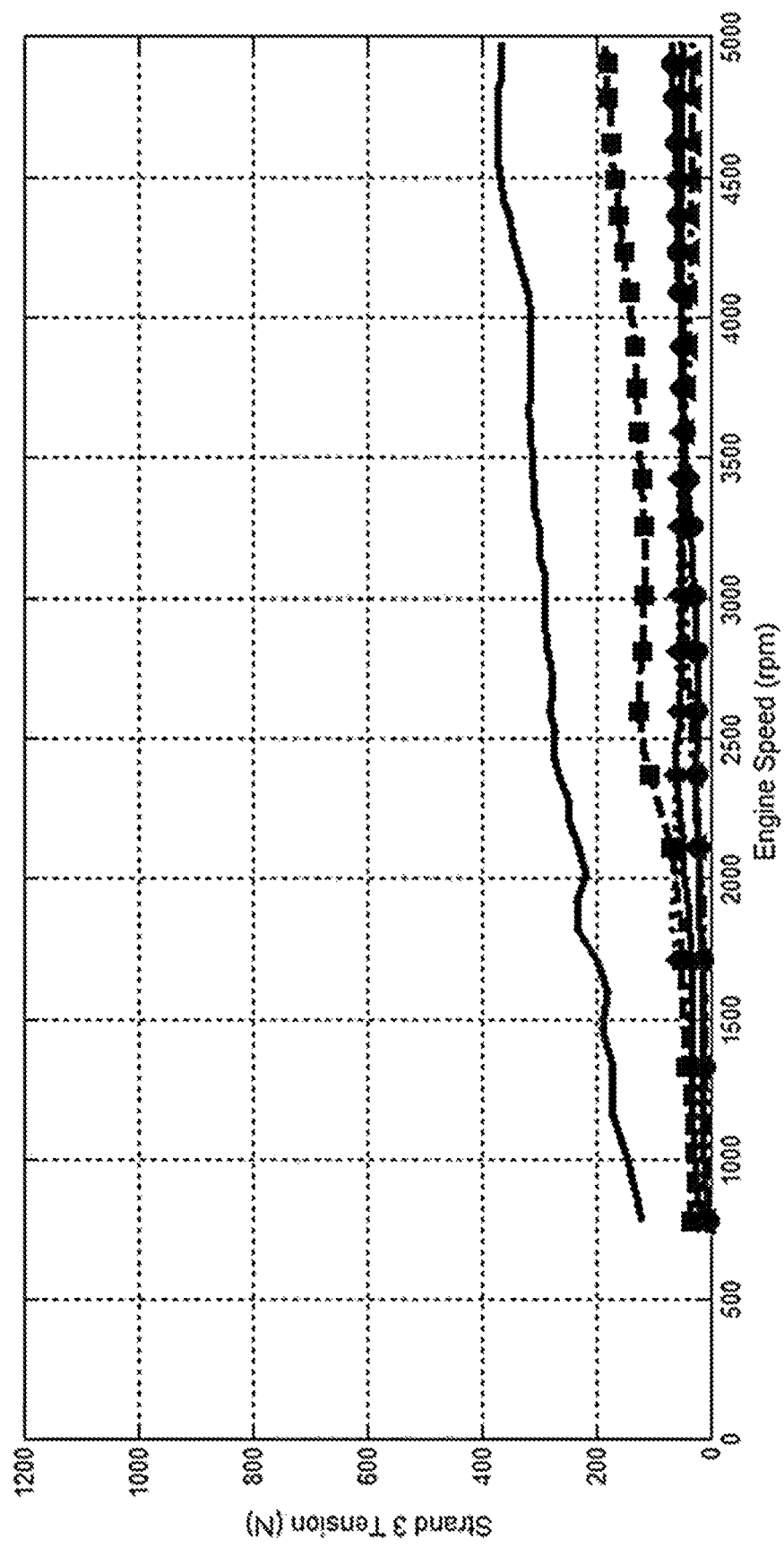
Figure 16F:
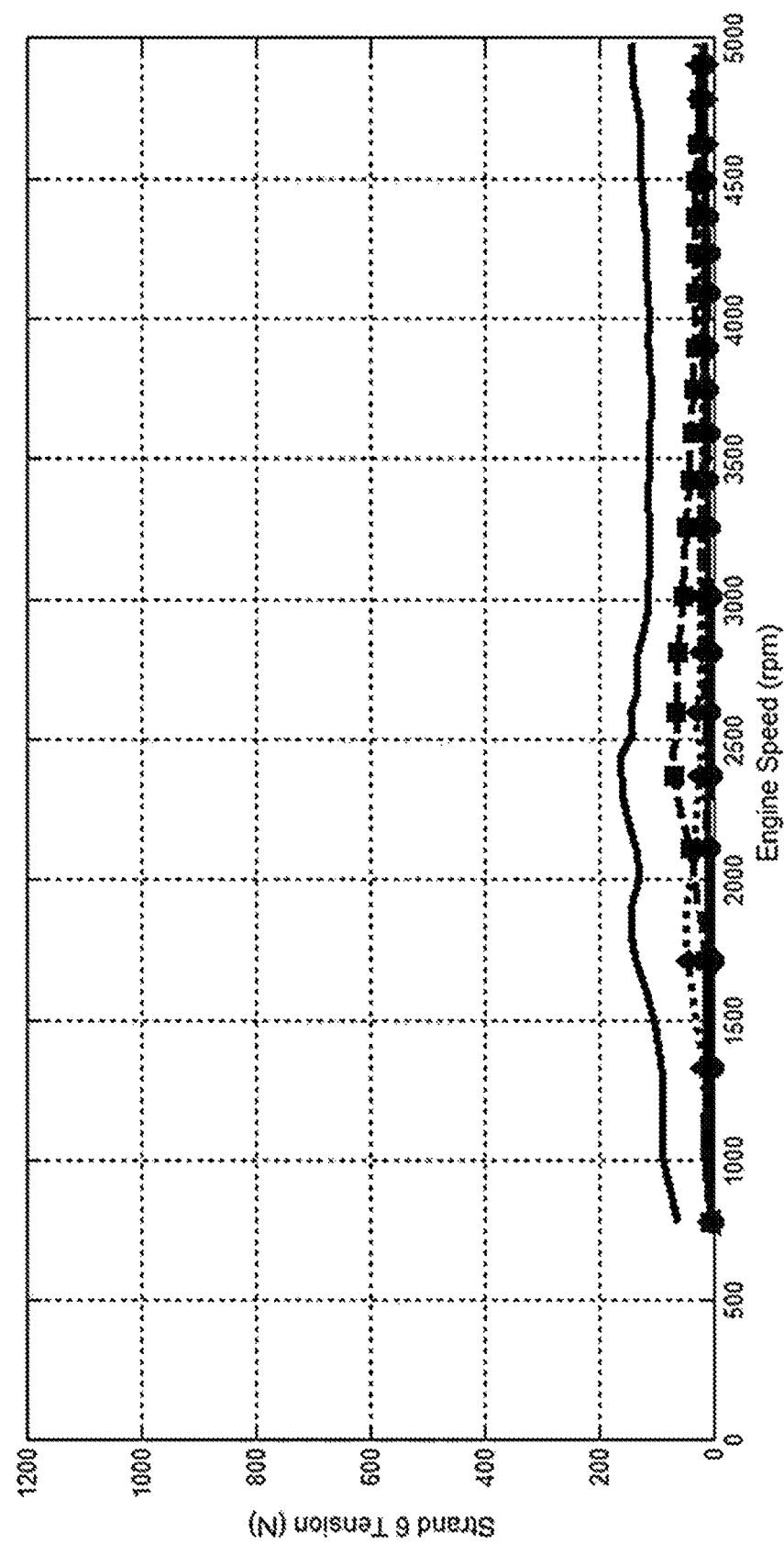

FIGS. 13a and 13b correspond to FIGS. 6a and 6b, respectively, showing the maximum and minimum strand tensions in the fuel pump chain 10 (strands 1-3) and cam timing chain 20 (strands 4-6). FIGS. 13c-13f show the order content of the strands with the highest tension for the fuel pump chain 10 (strand 3) and cam timing chain 20 (strand 6). FIG. 13c corresponds to FIG. 9b, FIG. 13d corresponds to FIG. 12b, FIG. 13e corresponds to FIG. 9c, and FIG. 13f corresponds to FIG. 12c.

The engagement noise for this drive arrangement is not acceptable. The worst noise comes from near the fuel pump sprocket. A random fuel pump sprocket could be used to reduce engagement noise levels to address this issue, as is known to the prior art.

FIGS. 14a-14f show the chain tensions created by a traditional random sprocket when no external excitations are present—that is, without considering any torque variations introduced by the operation of the crankshaft, camshaft(s) or fuel pump. FIGS. 14c-14f show that the traditional random sprocket excites tensions at many orders. Some of the more prominent orders include 4th, 10th and 12th engine cycle orders.

However, it will be understood that external excitations will be present in any real-world engine, created by the impulses of the pistons on the crankshaft, or the valves on the camshaft(s) or the operation of the fuel pump. When combined with the external excitations, it is likely that the 4th and/or 12th order contributions will add together, thereby increasing chain tensions. This is shown in FIGS. 15a-15f. Relative to the baseline shown in FIGS. 14a-14f, there is a large increase in strand 1, 2, 4, 5 and 6 tensions and a smaller increase in the strand 3 tensions. This kind of increase in chain tensions is not acceptable.

FIGS. 16a-16f show the chain tensions created using a random sprocket with pitch radius variation based only on orders not prominent in the baseline system (herinafter referred to as "Non-Prevalent Order" or NPO random sprockets), as taught by the present application. As with FIGS. 14a-14f, above, FIGS. 16a-16f do not take external excitations into account. In this case, the orders that can be used for the NPO random sprocket pattern $1^{st}$, $2^{nd}$, $3^{rd}$, $5^{th}$, $6^{th}$, $7^{th}$, $9^{th}$, $10^{th}$, $11^{th}$, $13^{th}$, . . . engine cycle orders.

In the engine of the example, the fuel pump sprocket rotates twice per engine cycle—that is, at the same speed as the crankshaft. This means that fuel pump sprocket orders are two times engine cycle orders—1st fuel pump sprocket order (a sine wave that repeats once per fuel pump rotation) equals 2nd engine cycle order, and so on. This means the fuel pump sprocket can only be used to create $2^{nd}$, $4^{th}$, $6^{th}$, $8^{th}$, $10^{th}$, $12^{th}$ . . . engine cycle orders.

Eliminating the orders that are already prevalent in the baseline tensions leaves $2^{nd}$, $6^{th}$, $10^{th}$, $11^{th}$, $14^{th}$, $18^{th}$ . . . engine cycle orders—or $1^{st}$, $3^{rd}$, $5^{th}$, $7^{th}$, $9^{th}$ . . . fuel sprocket orders. The order plots in FIGS. 16c-16f show that, for this example, the NPO random sprocket generates tensions mostly at $6^{th}$, $10^{th}$, $14^{th}$ and $18^{th}$ engine cycle orders. The tensions generated at $4^{th}$, $8^{th}$, $12^{th}$, $16^{th}$ . . . engine cycle orders are very small and will not add significantly when combined with the external excitations.

Figure 17A:
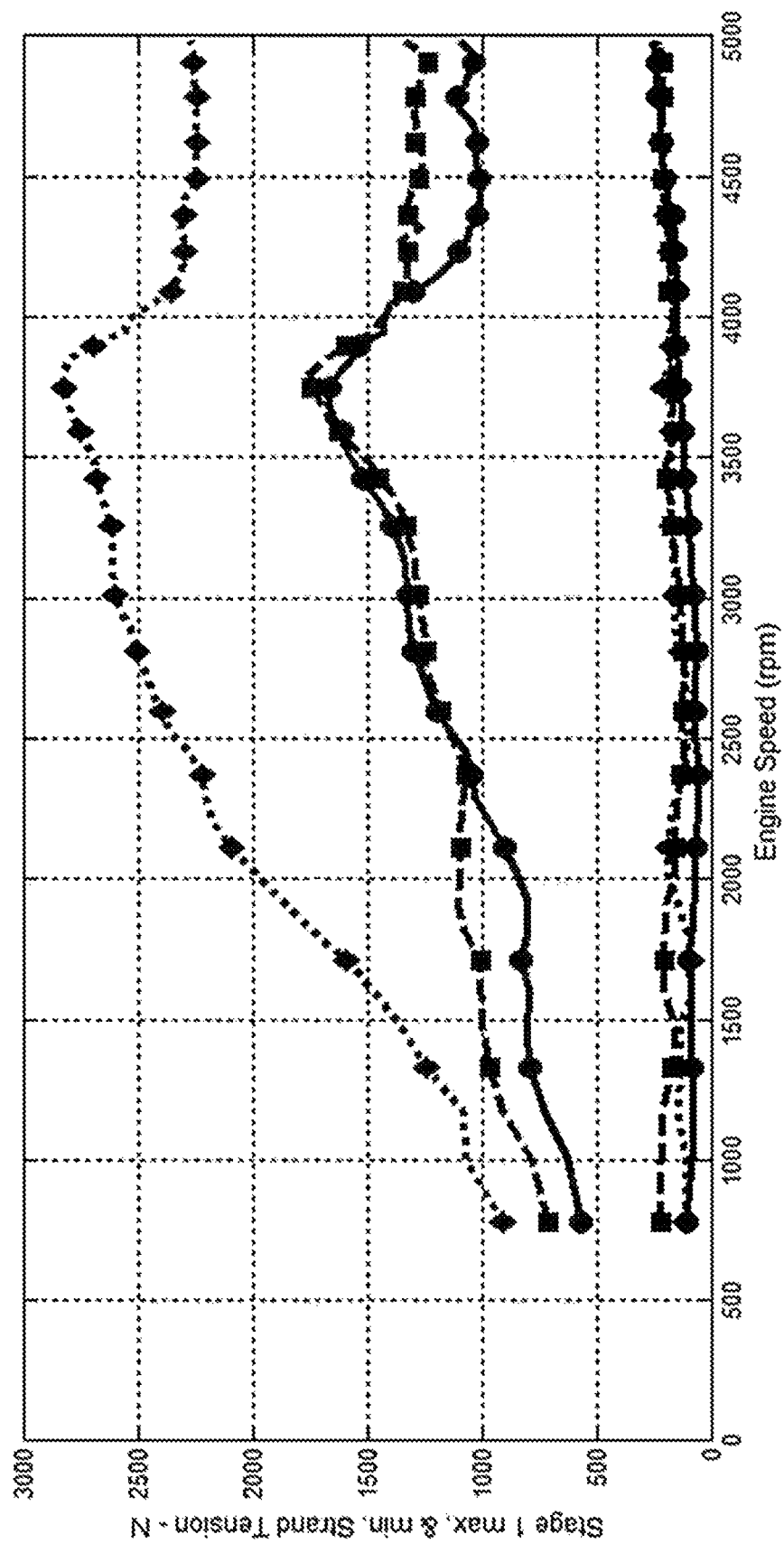
FIGS. 17a-17f show graphs for a system as shown in FIG. 1, with the non-prevalent order (NPO) random sprockets of the invention, and with external excitations.
Figure 17B:
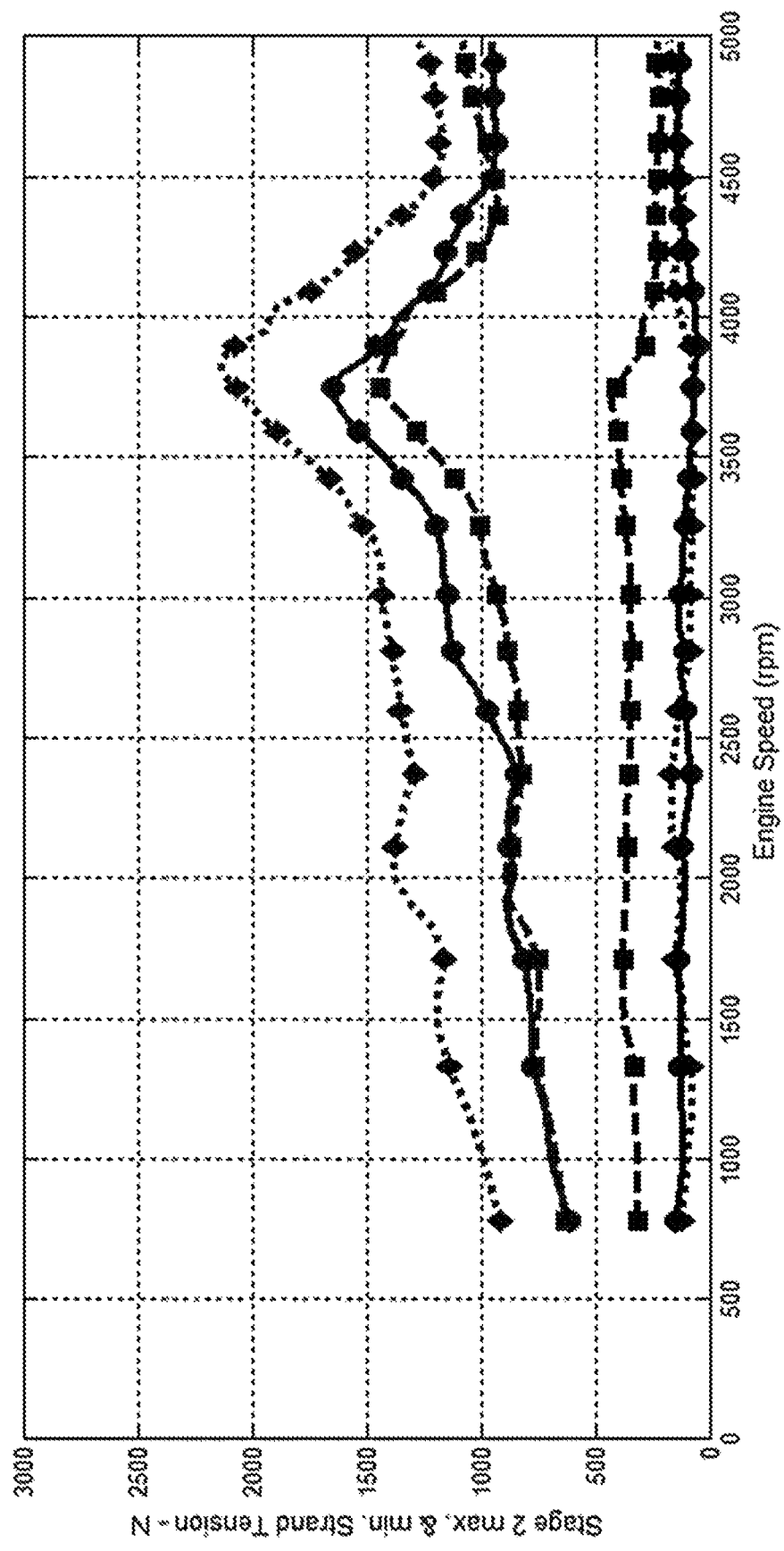
Figure 17C:
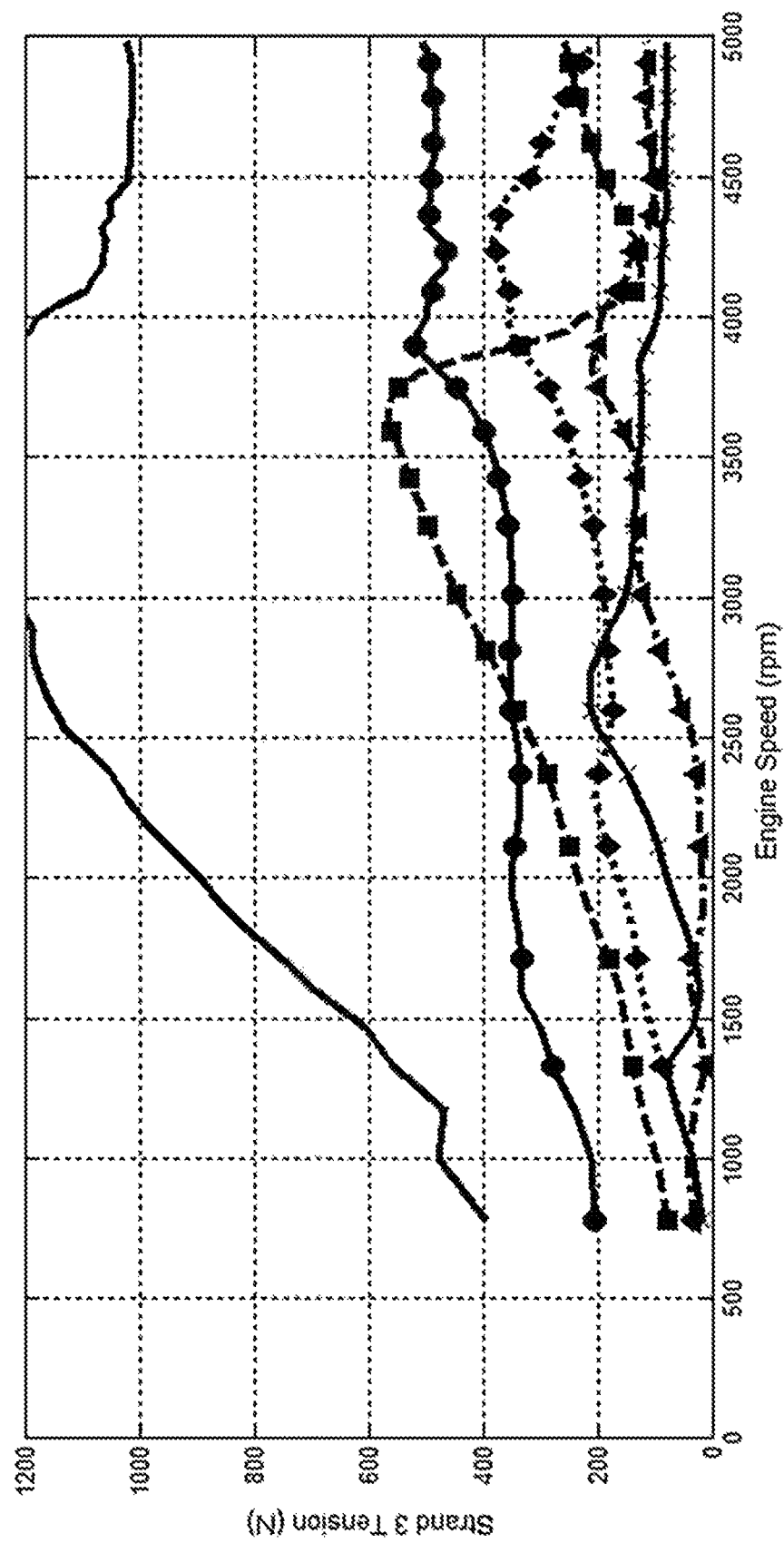
Figure 17D:
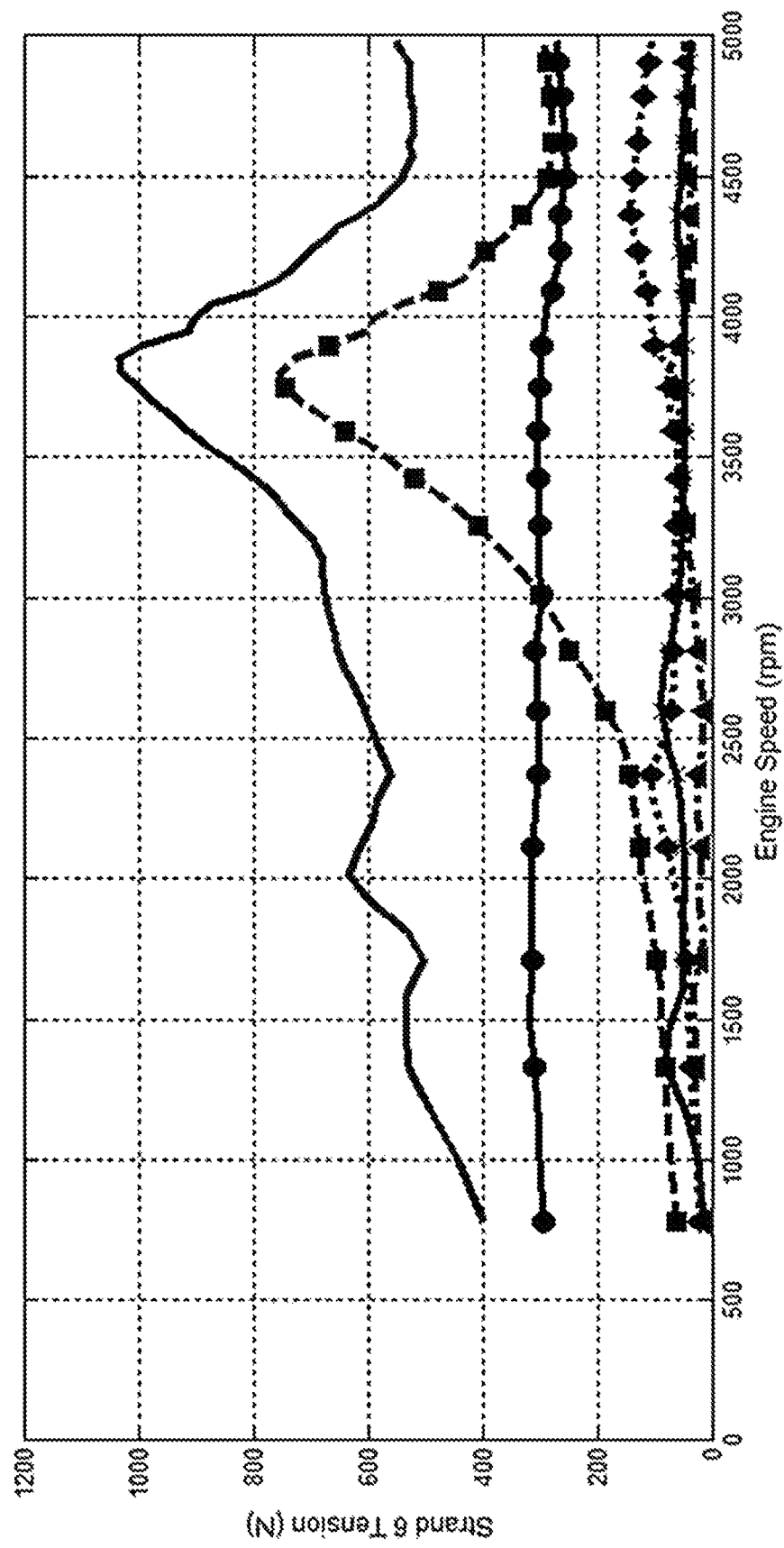
Figure 17E:
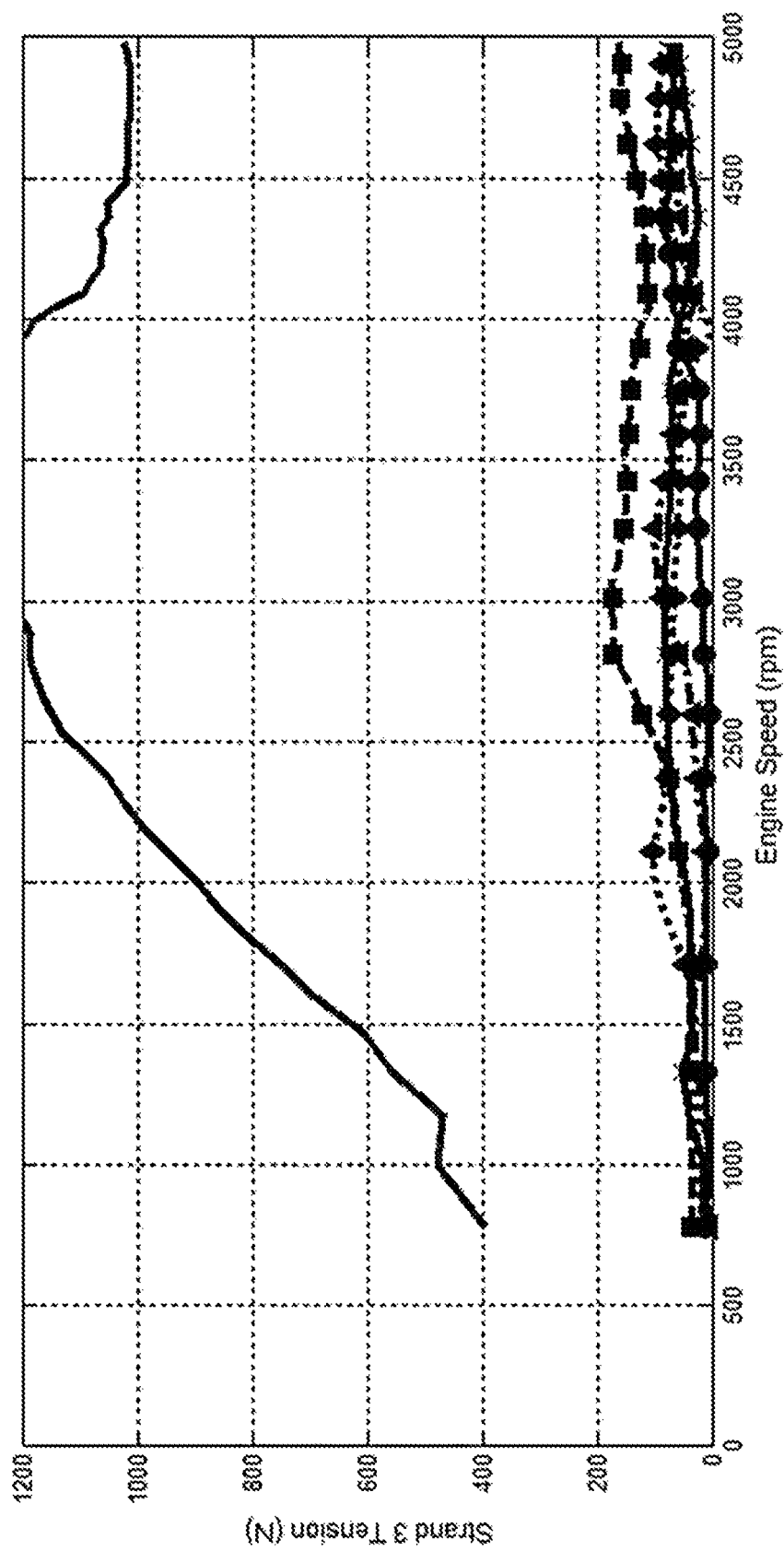
Figure 17F:
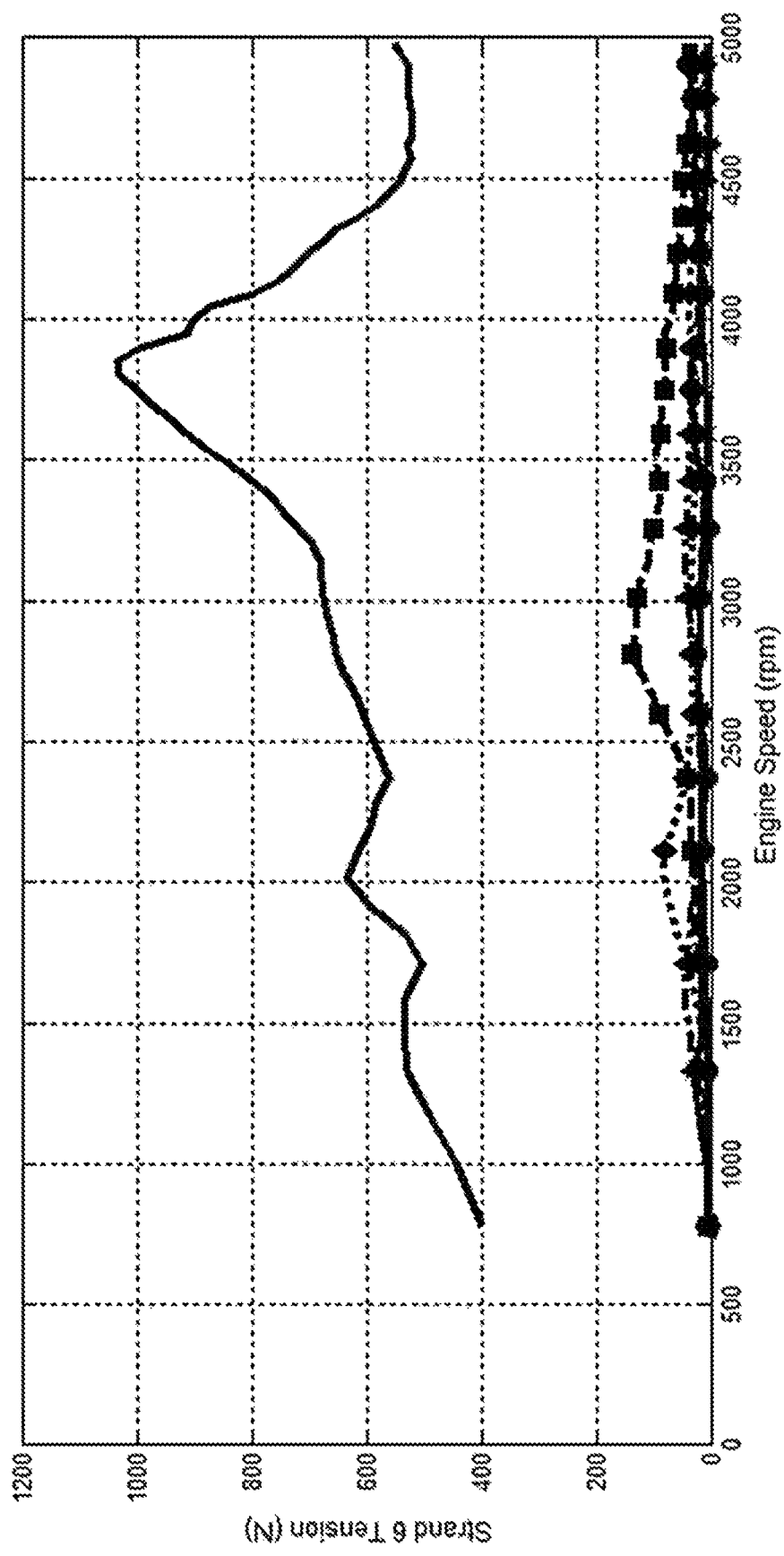

FIGS. 17a-17 shows graphs of the engine with an NPO random sprocket, but taking external excitations into account as in FIGS. 15a-15f. Comparing the order content from the baseline (FIGS. 13a-13f), FIGS. 17a-17f show only small changes in the dominant orders, and the addition of new orders from the NPO random sprocket. The maximum tensions in strands 1, 2, 4, 5, 6 only increase slightly. The tensions in strand 3 increase a little more due to the $10^{th}$ engine cycle order contribution of the NPO random sprocket. This could be improved by reducing the $5^{th}$ sprocket order amplitude used to create the NPO sprocket.

Figure 18A:
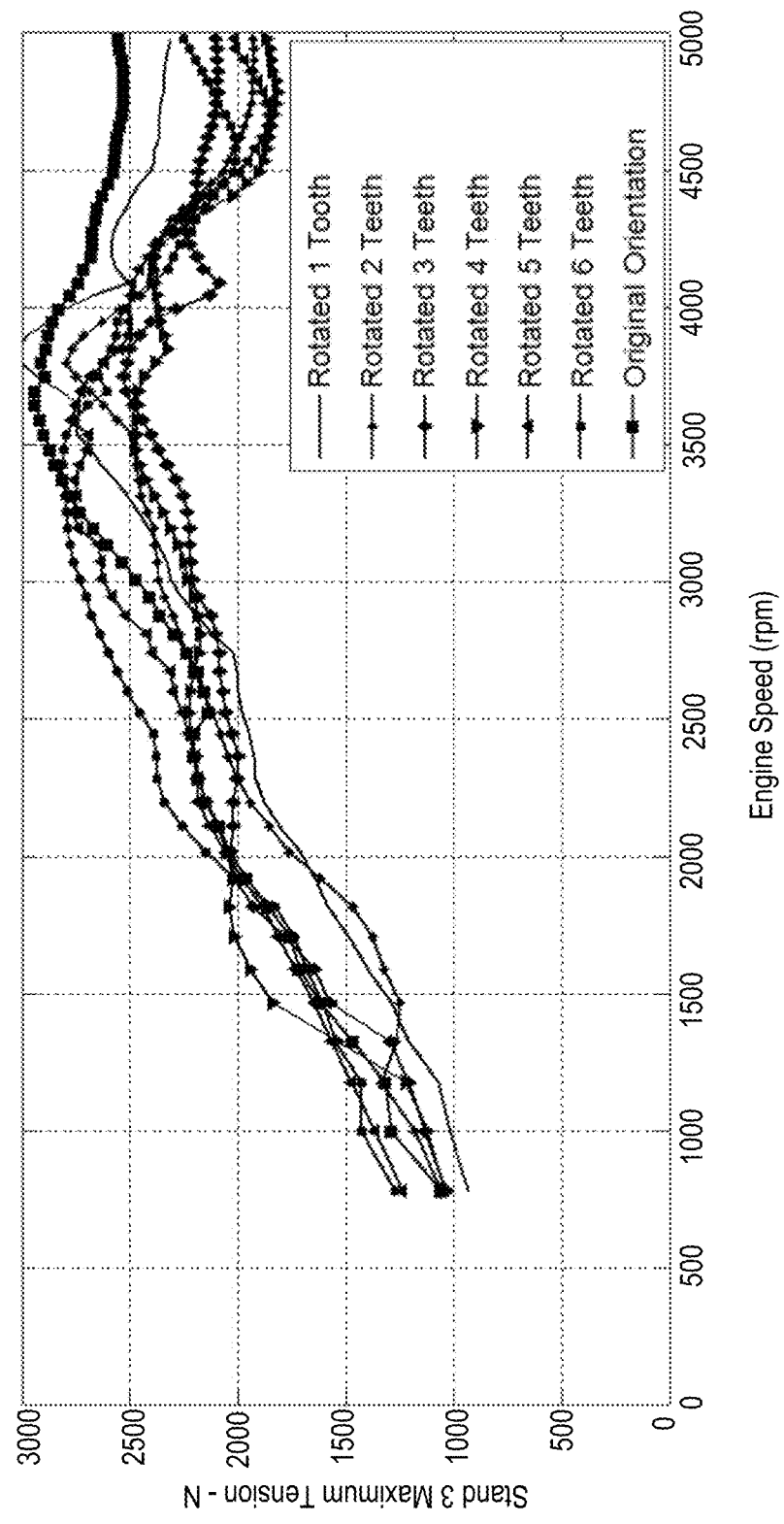
FIGS. 18a-18b show graphs of tensions for a system as shown in FIG. 1, with a traditional random sprocket mounted at differing orientations.
Figure 18B:
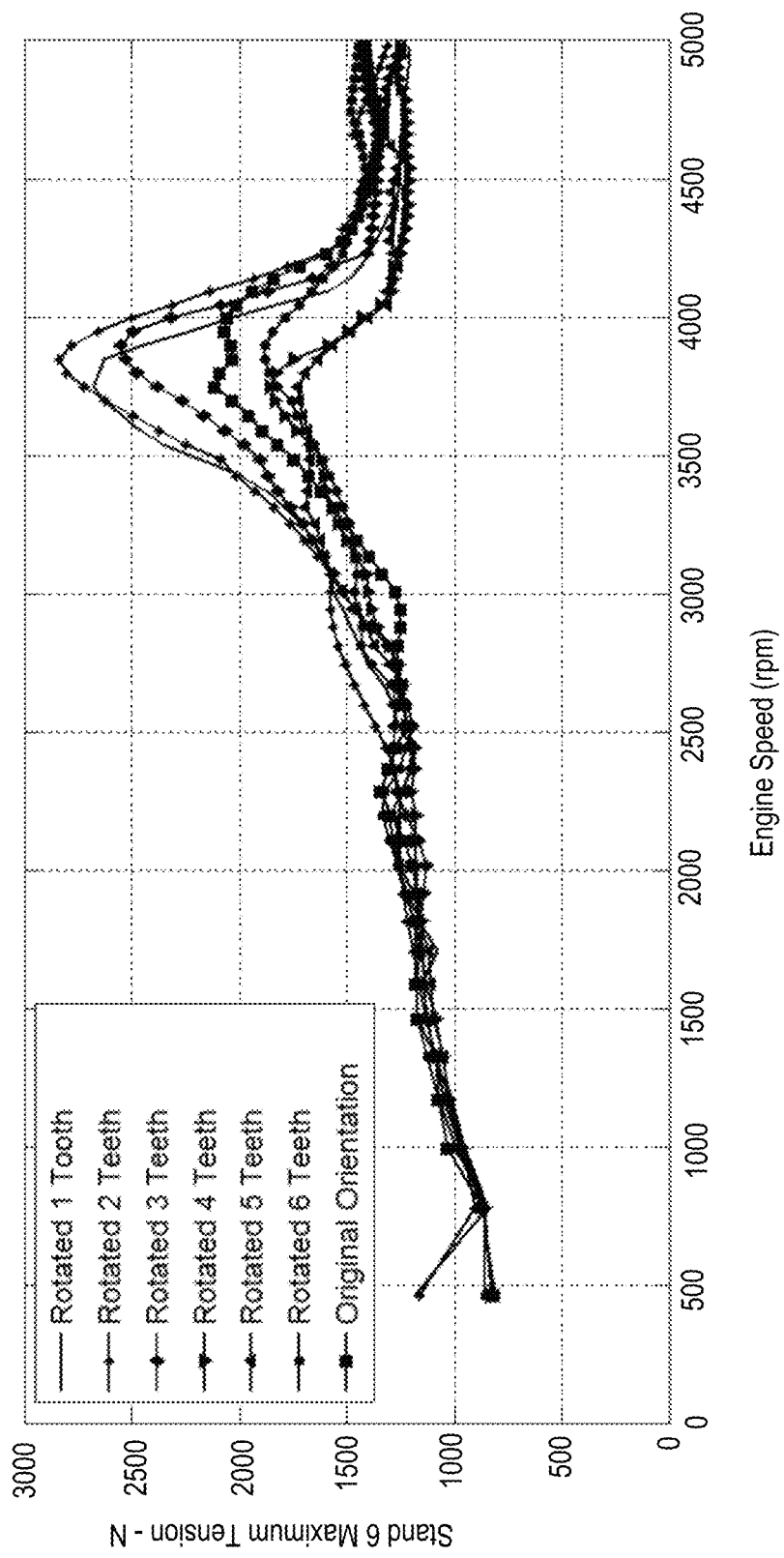
Figure 18C:
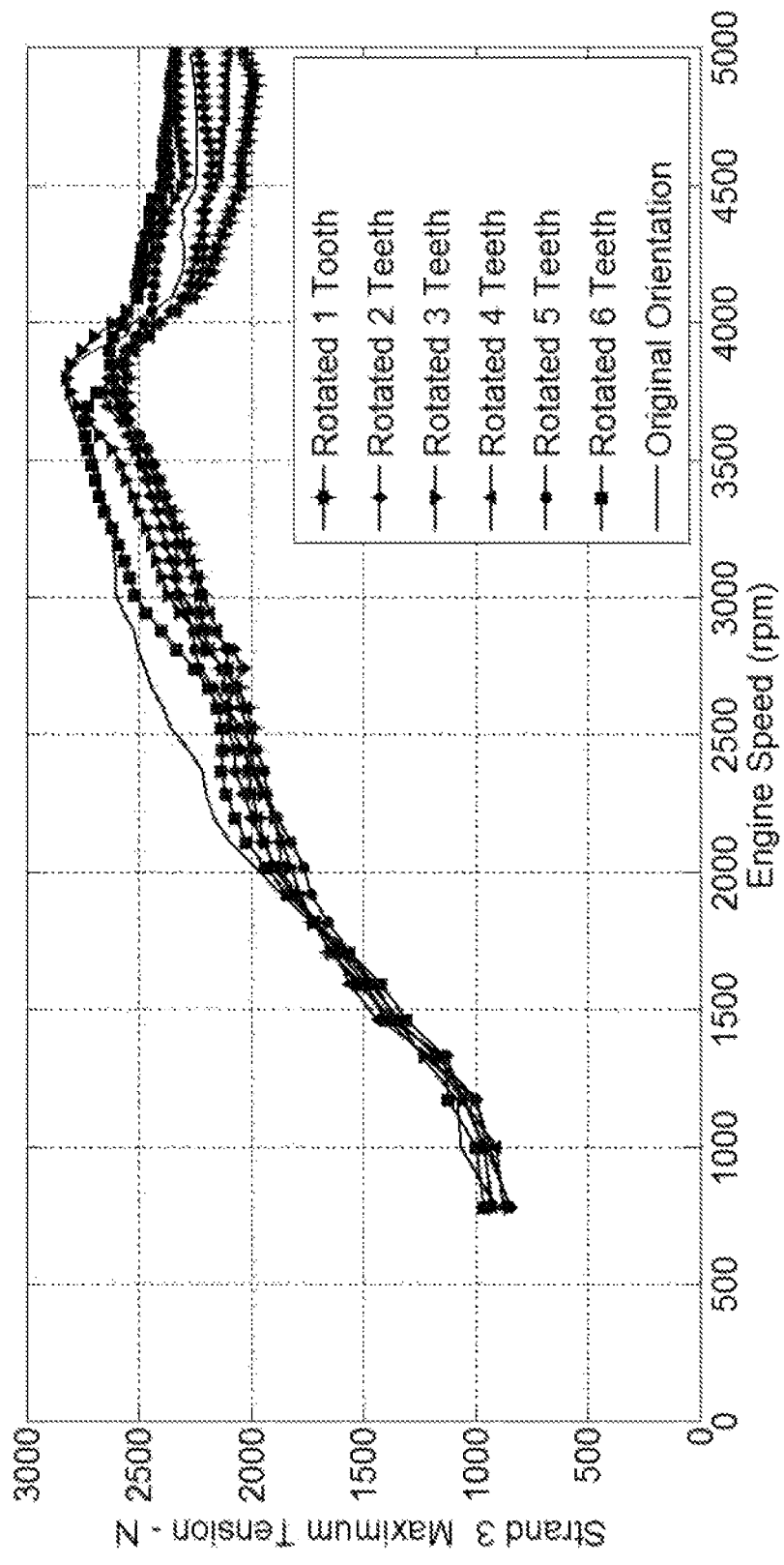
FIGS. 18c-18d show graphs of tensions for a system as shown in FIG. 1, with an NPO random sprocket mounted at differing orientations.
Figure 18D:
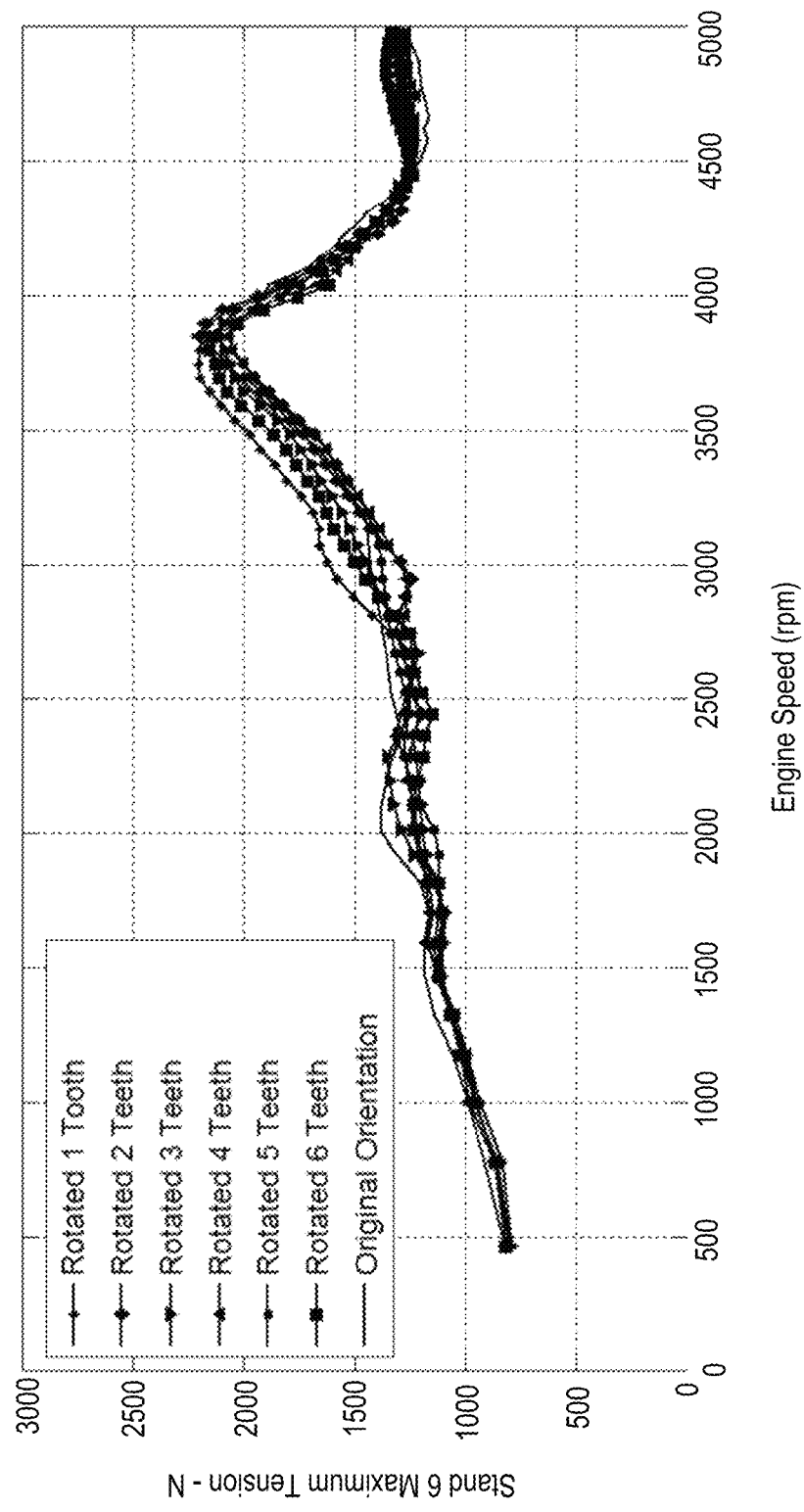
Figure 19A:
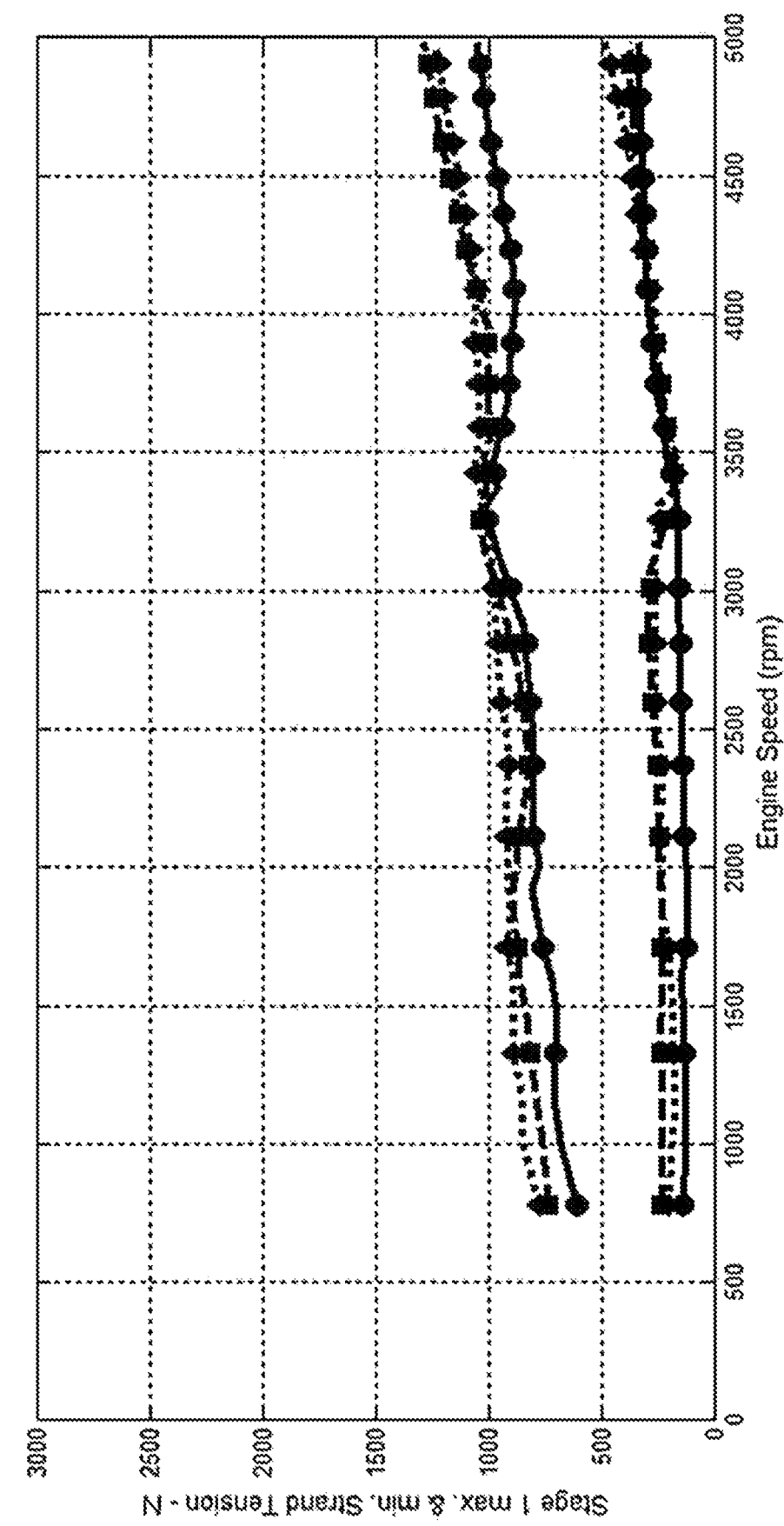
FIGS. 19a-19f show graphs for a system as shown in FIG. 1, with tension reducing random sprockets and no external excitations.
Figure 19B:
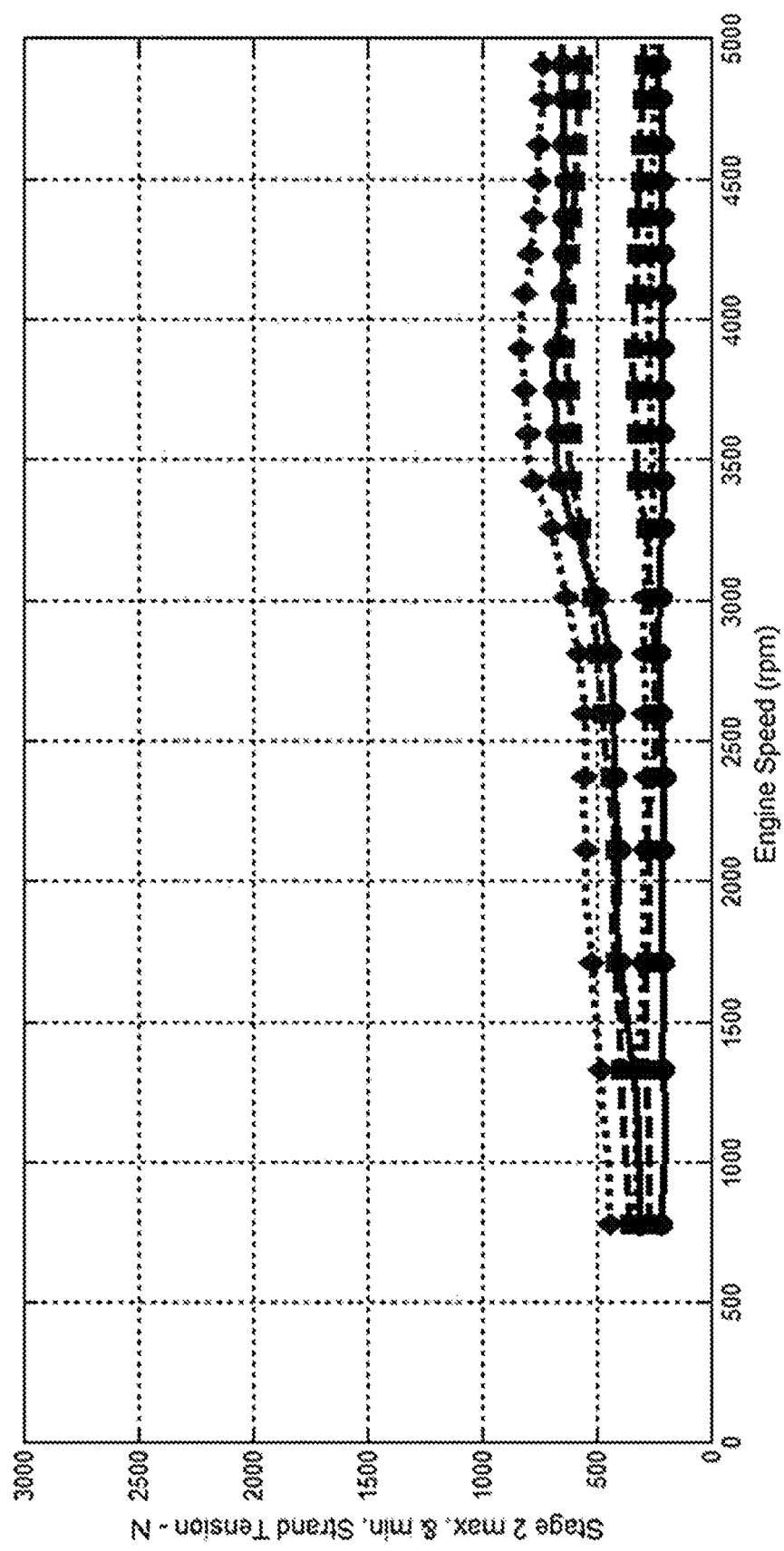
Figure 19C:
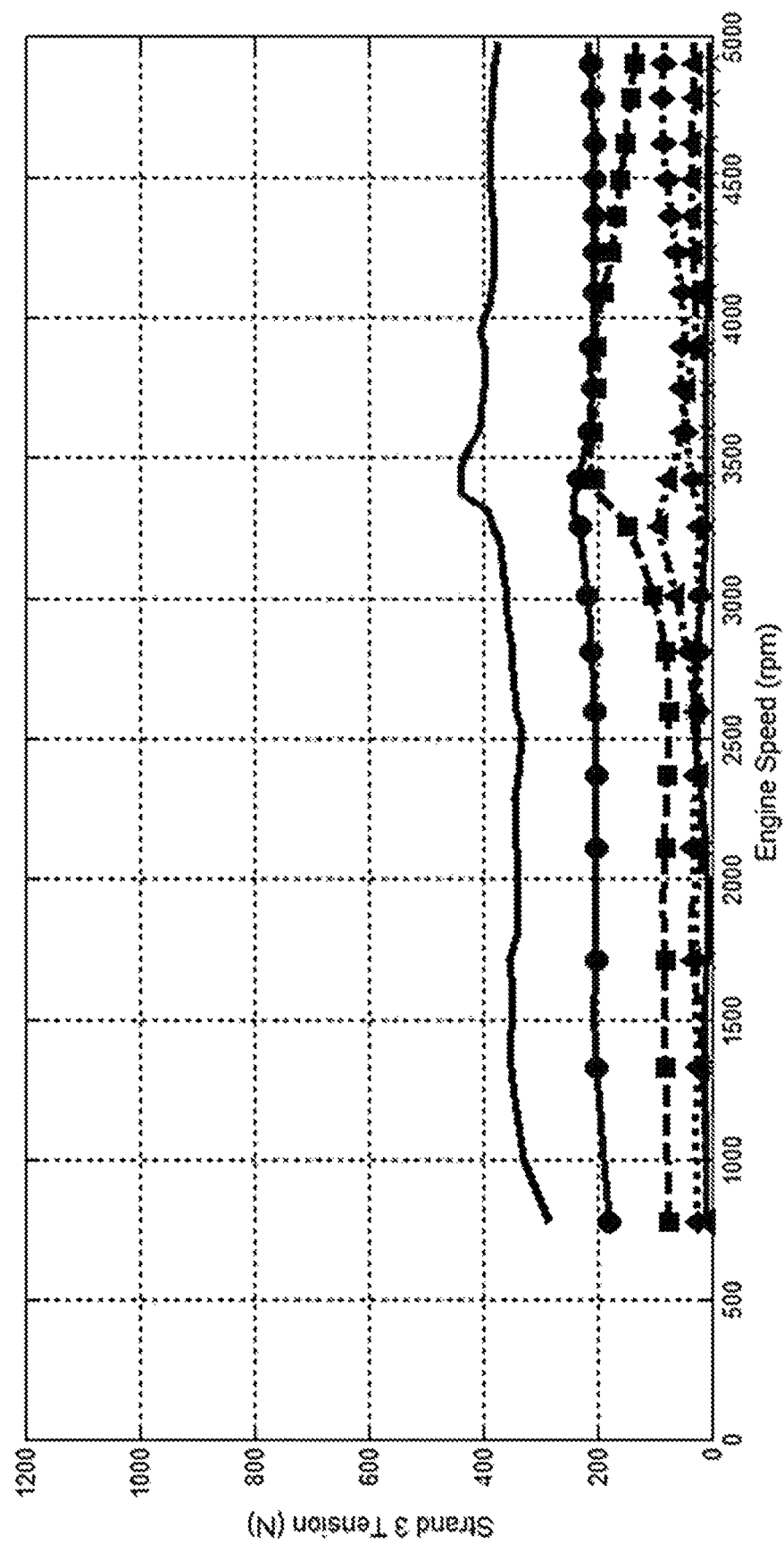
Figure 19D:
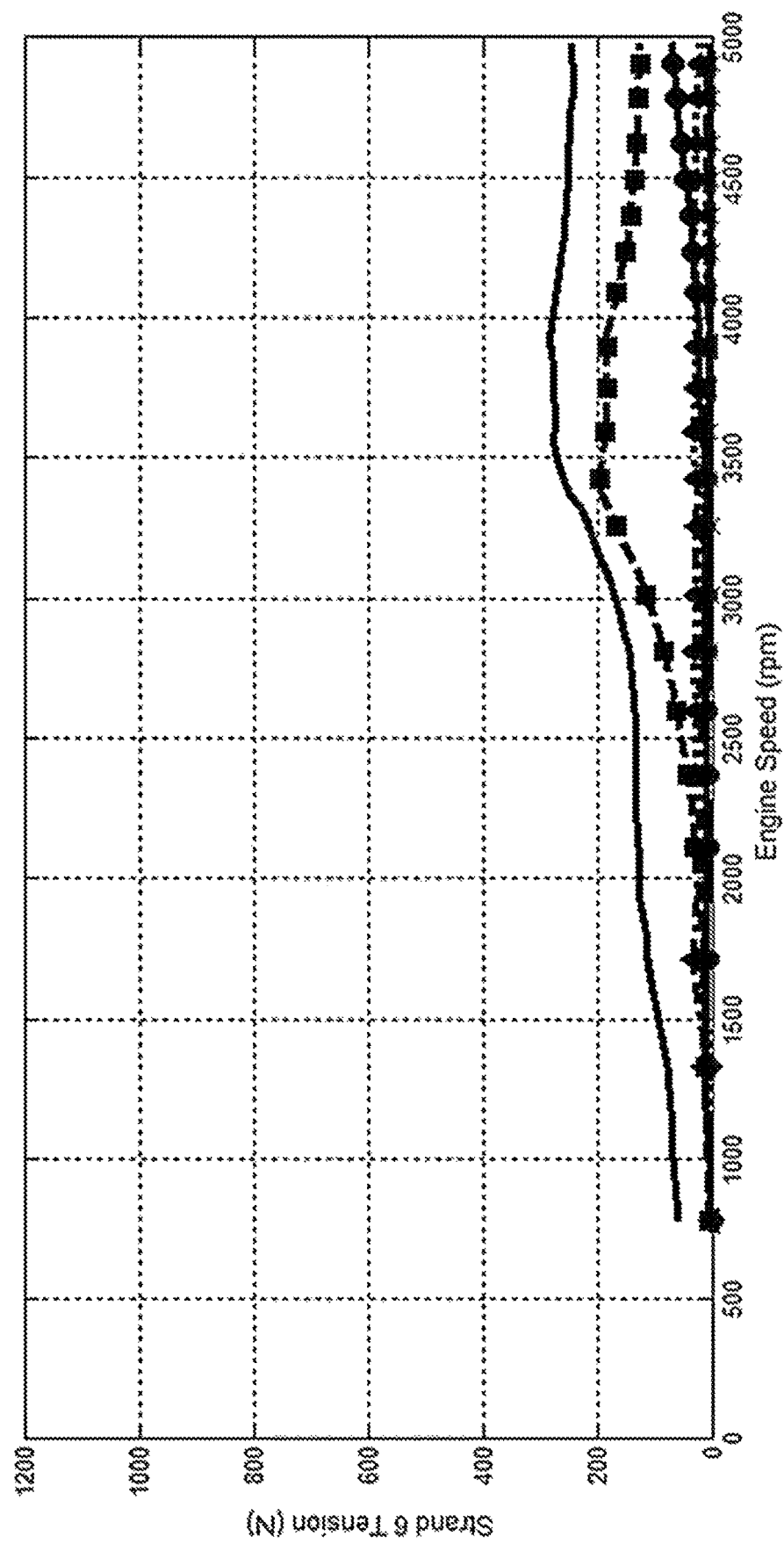
Figure 19E:
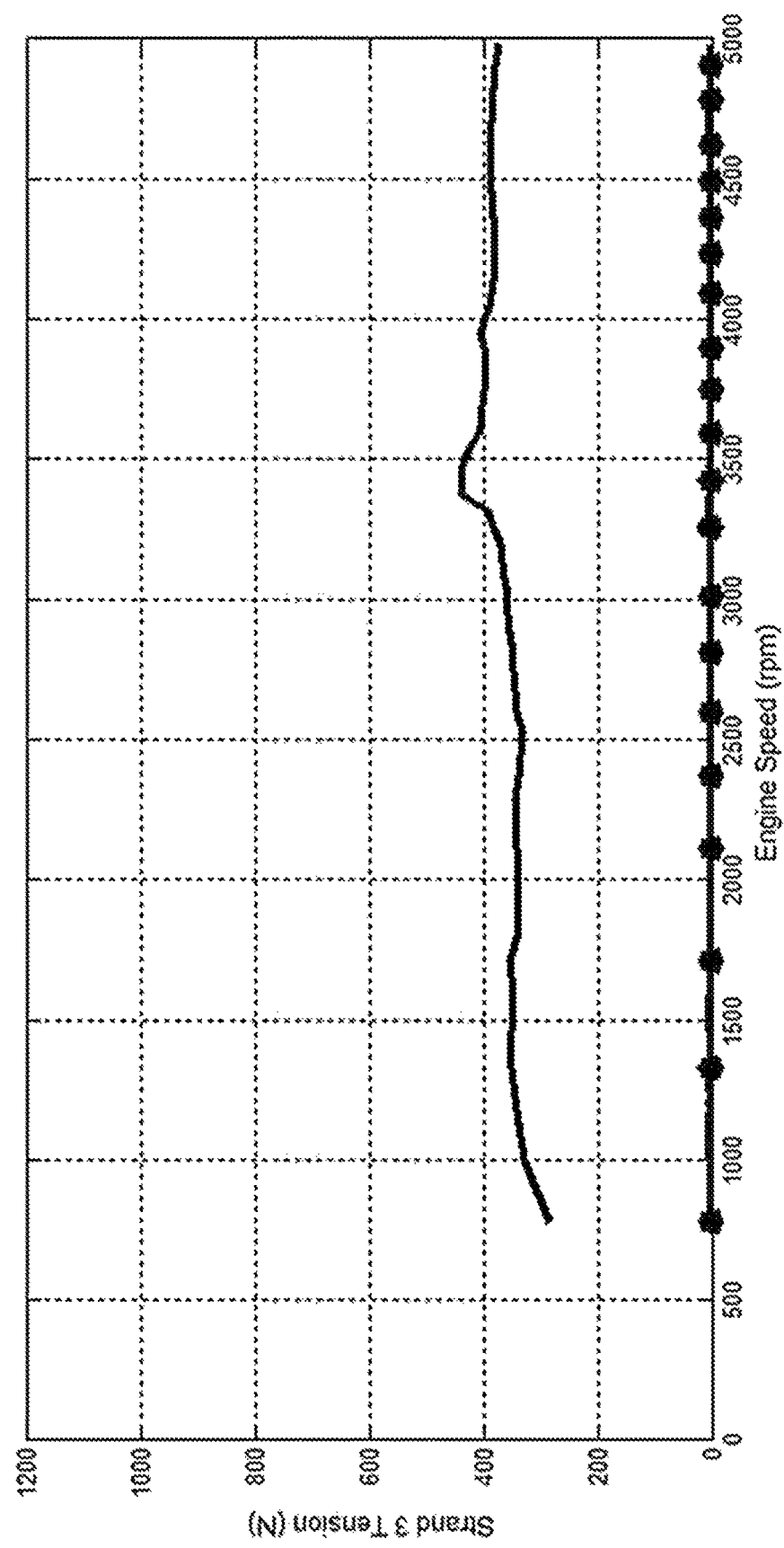
Figure 19F:
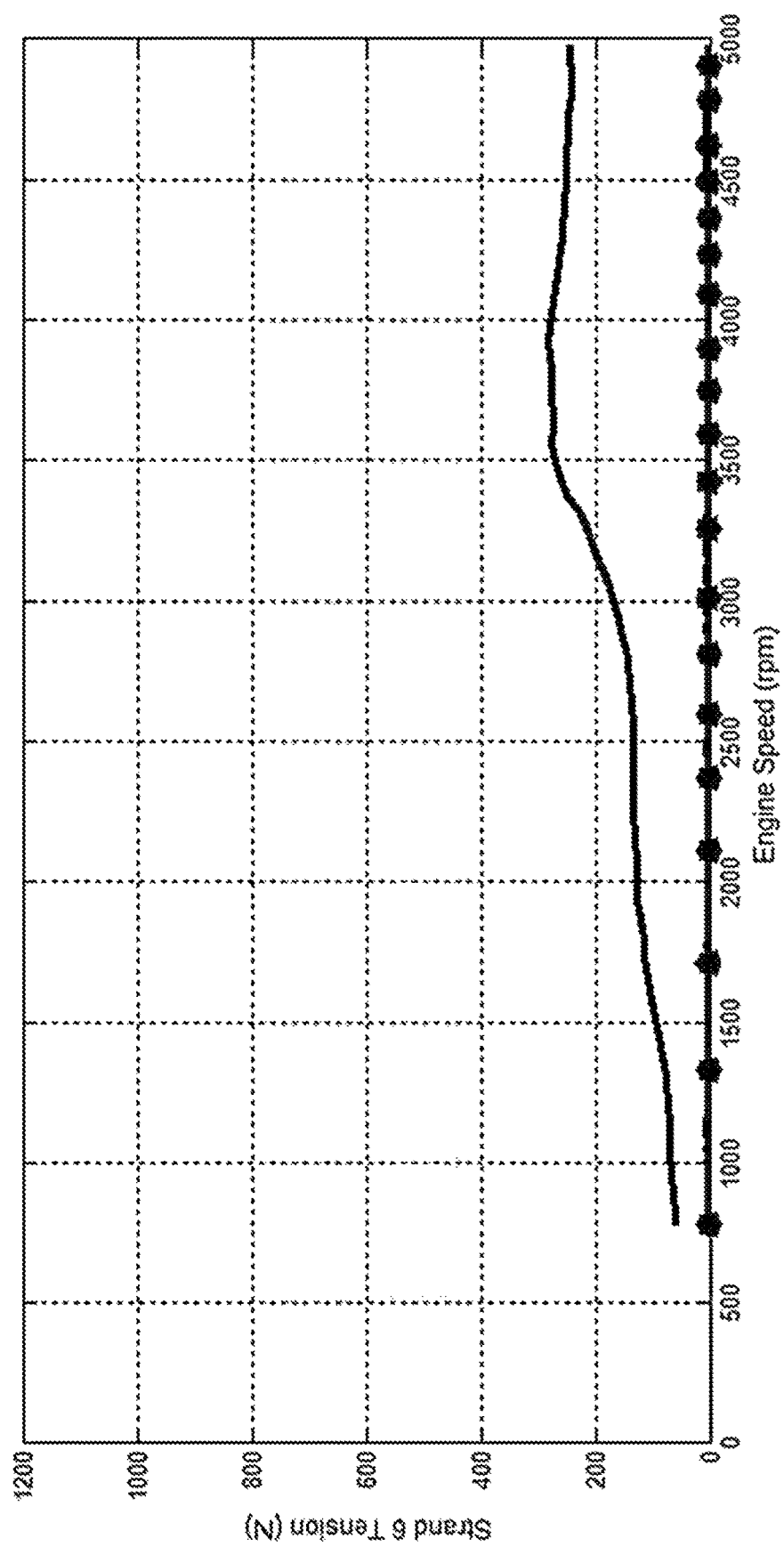
Figure 20A:
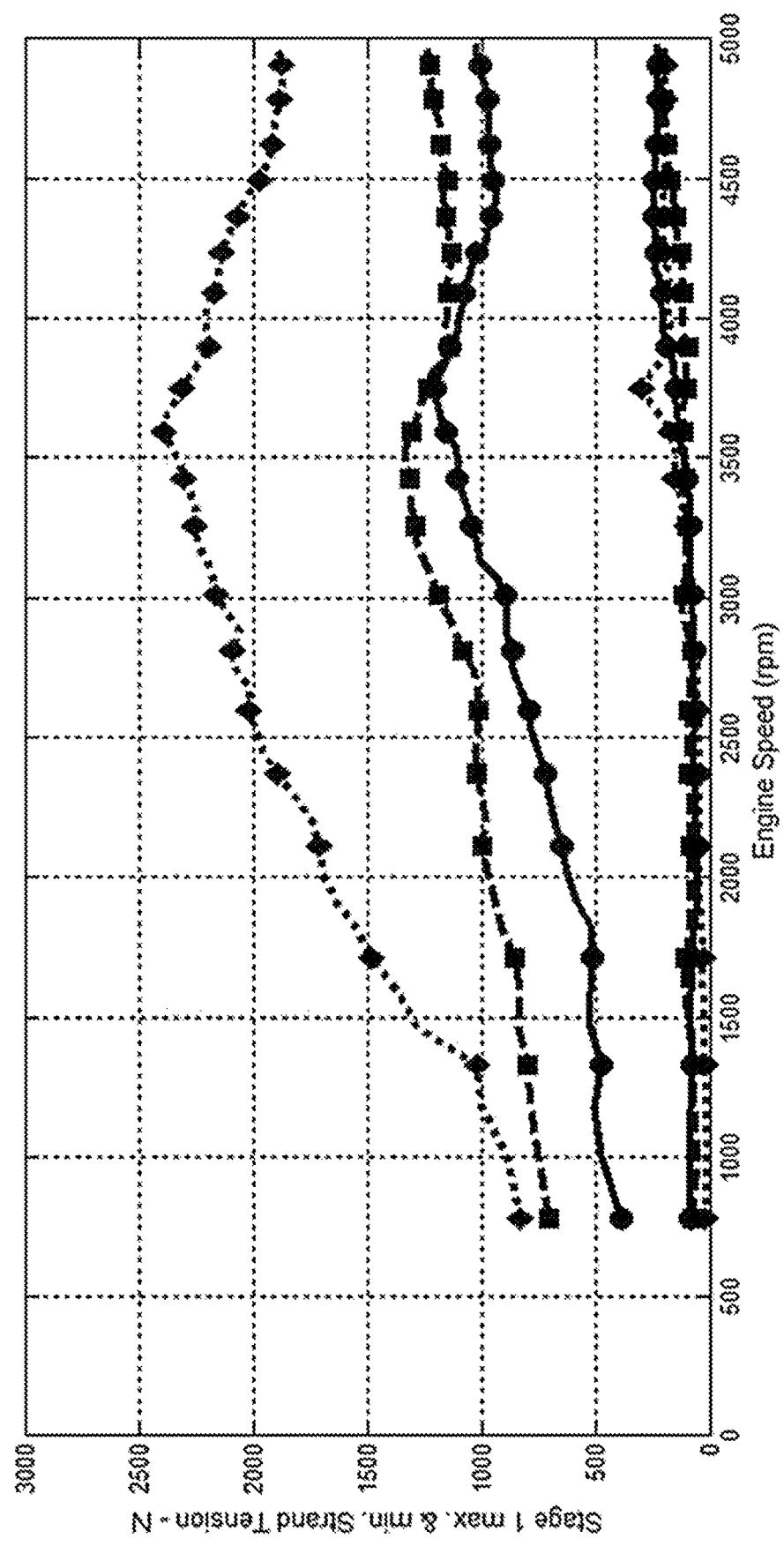
FIGS. 20a-20f show graphs for a system as shown in FIG. 1, with tension reducing random sprockets and with external excitations.
Figure 20B:
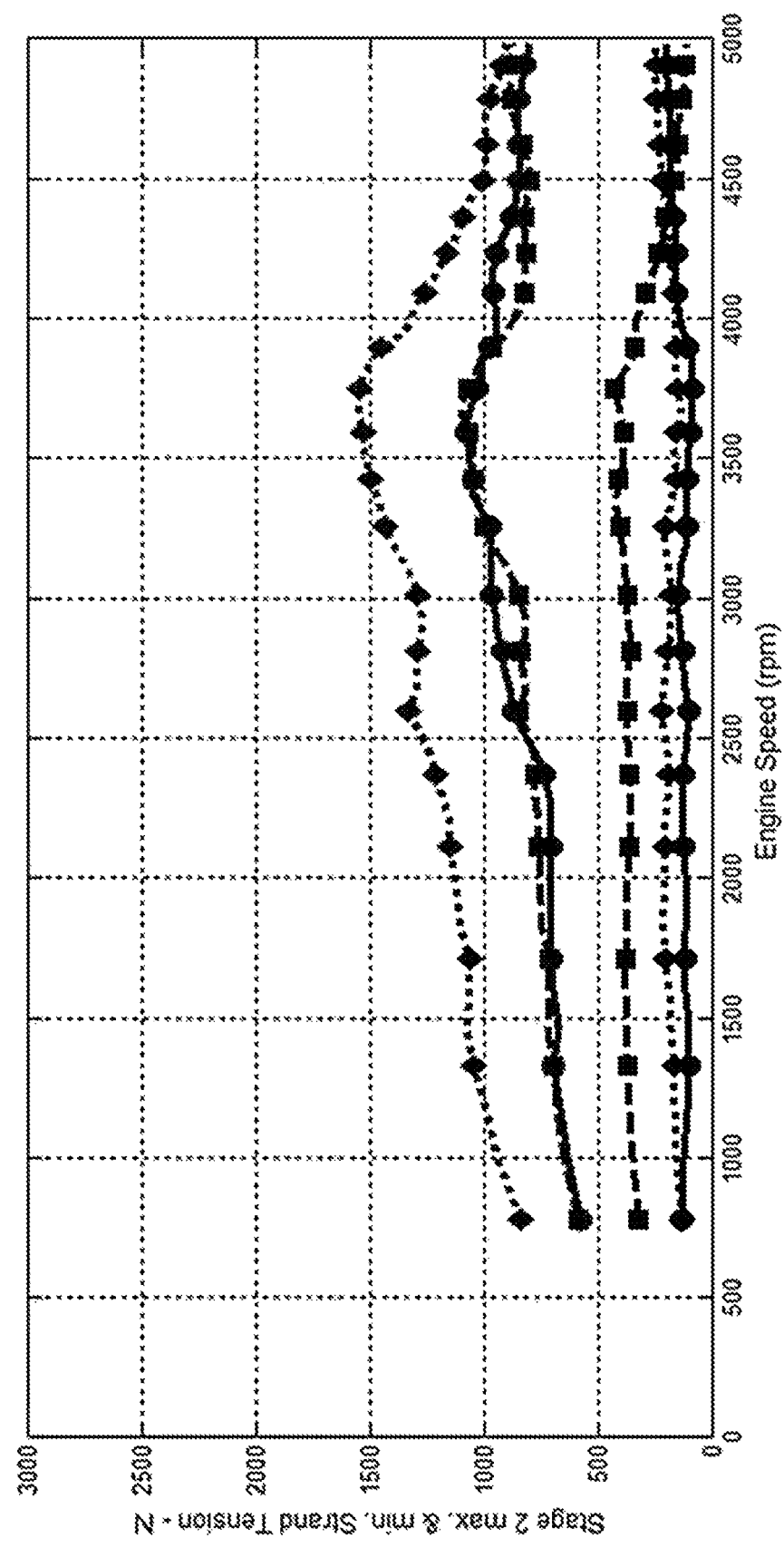
Figure 20C:
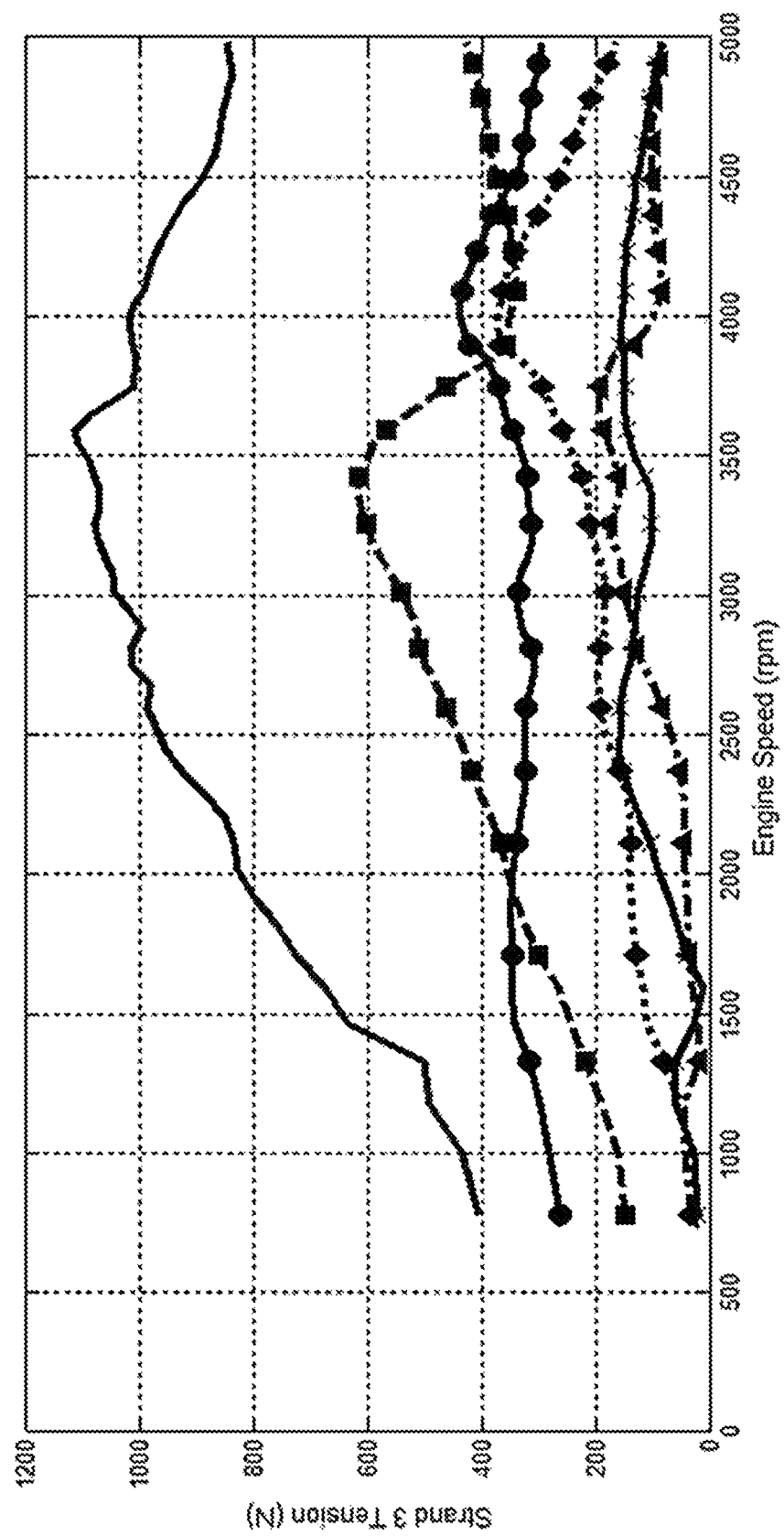
Figure 20D:
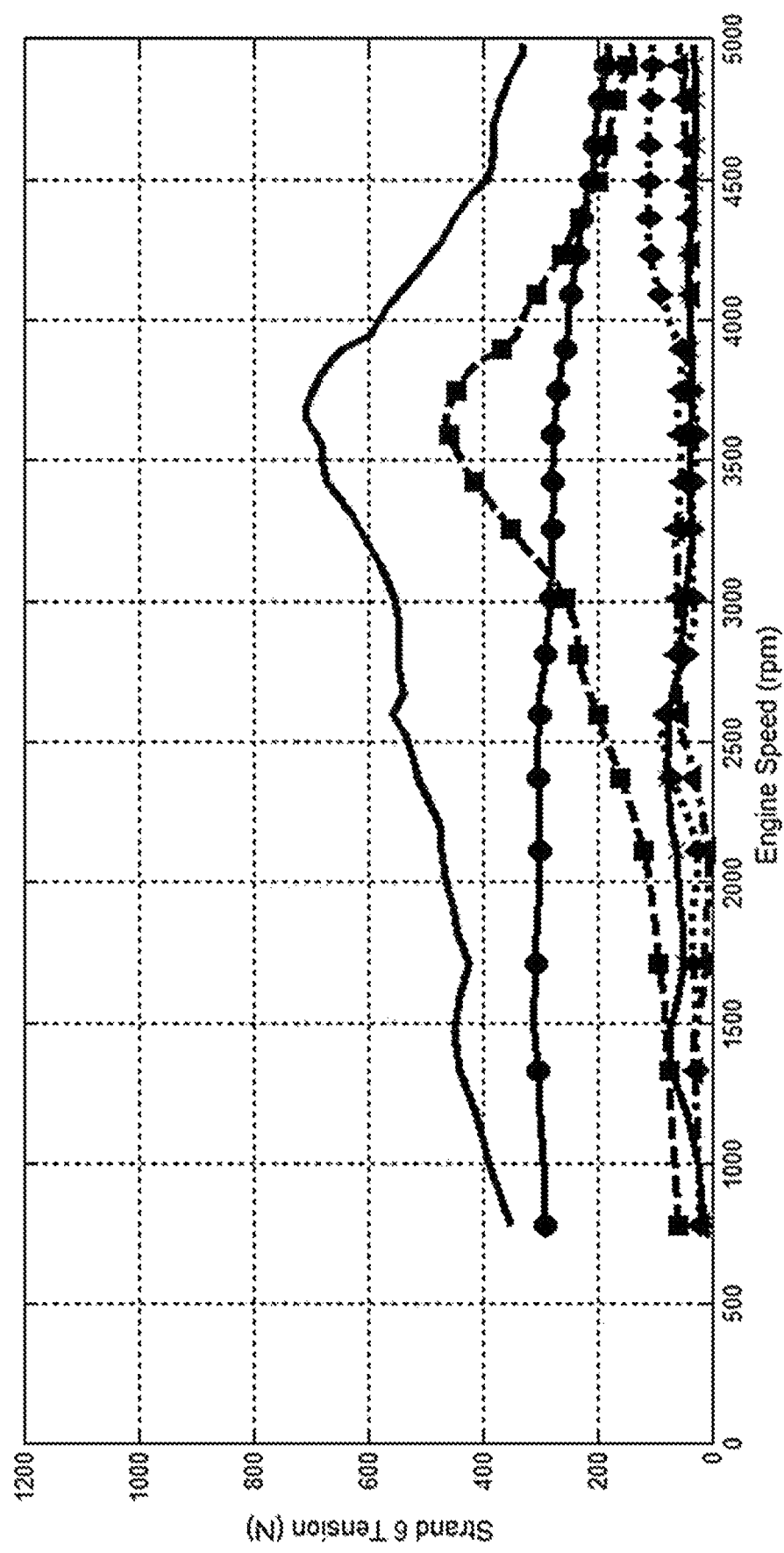
Figure 20E:
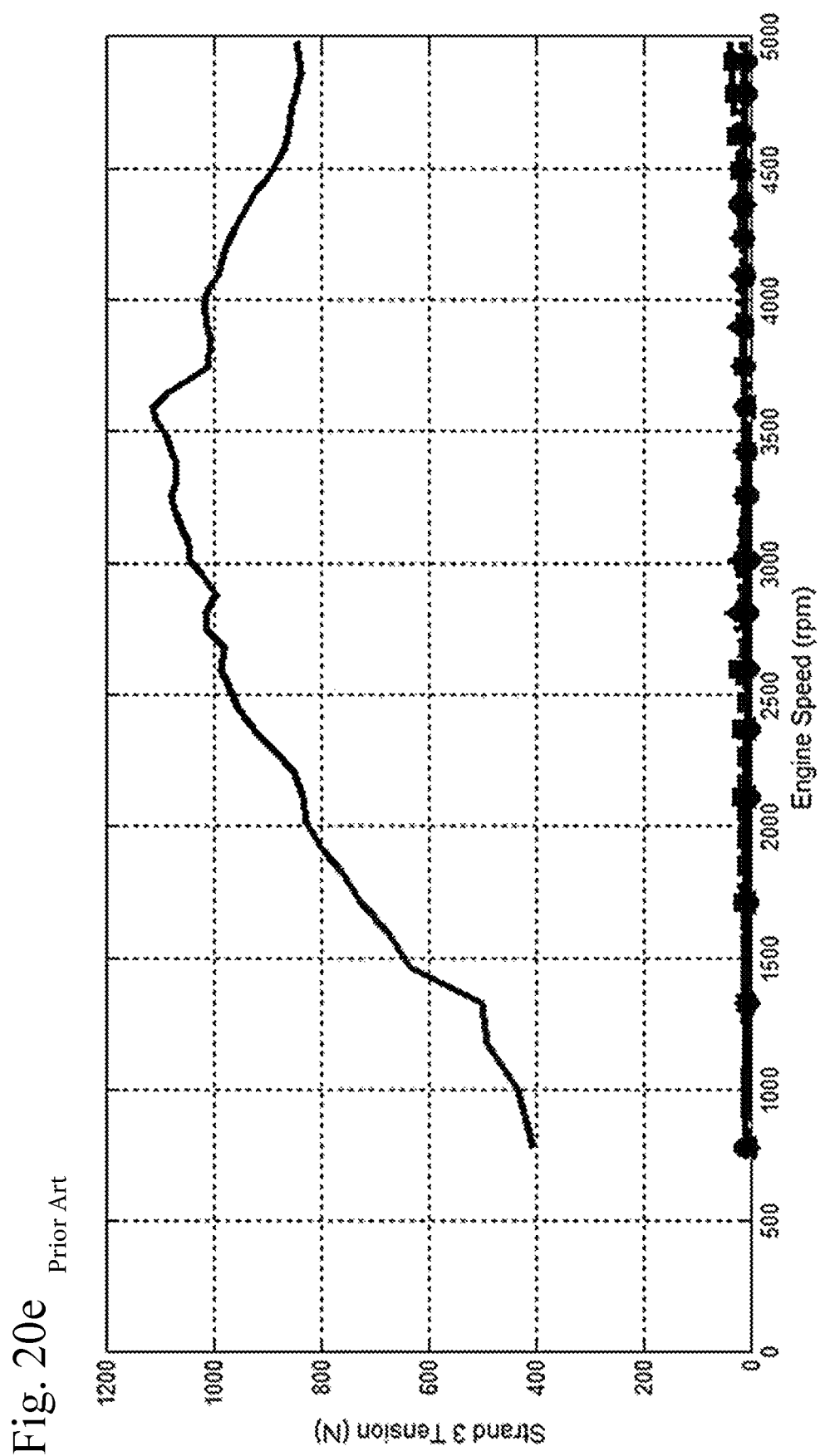
Figure 20F:
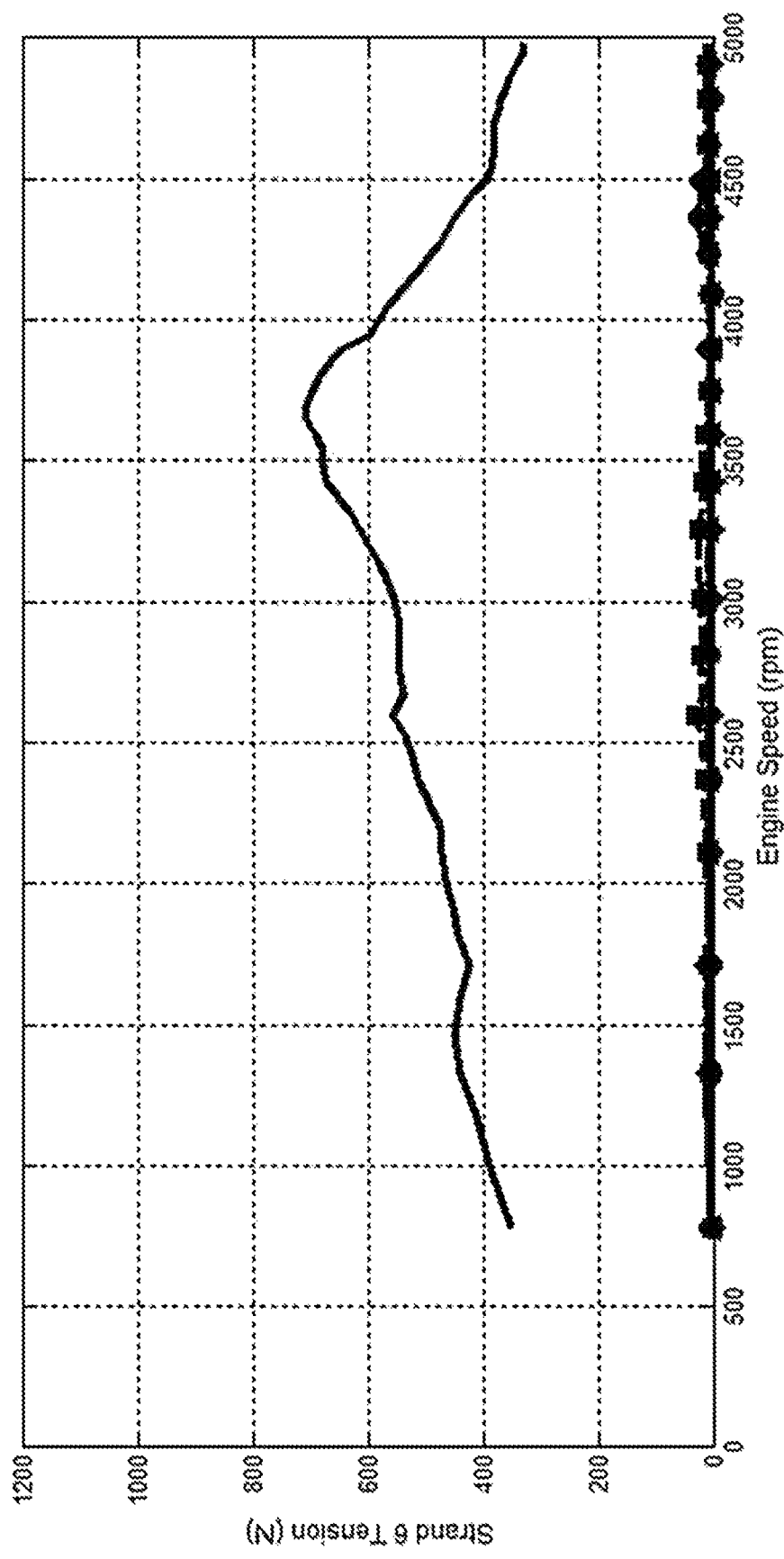
Figure 21A:
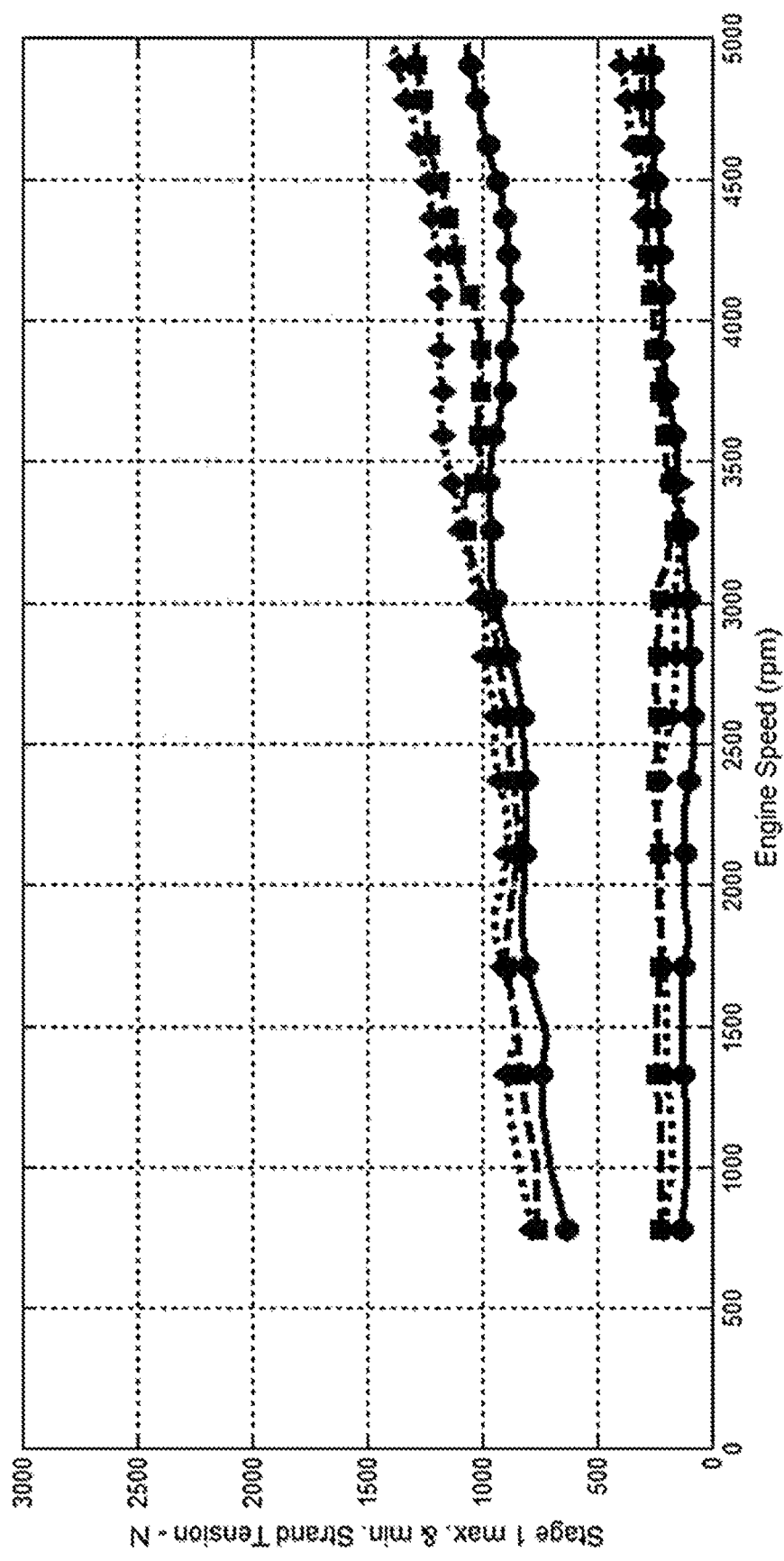
FIGS. 21a-21f show graphs for a system as shown in FIG. 1, with a combination of NPO sprockets and tension reducing random sprockets and no external excitations.
Figure 21B:
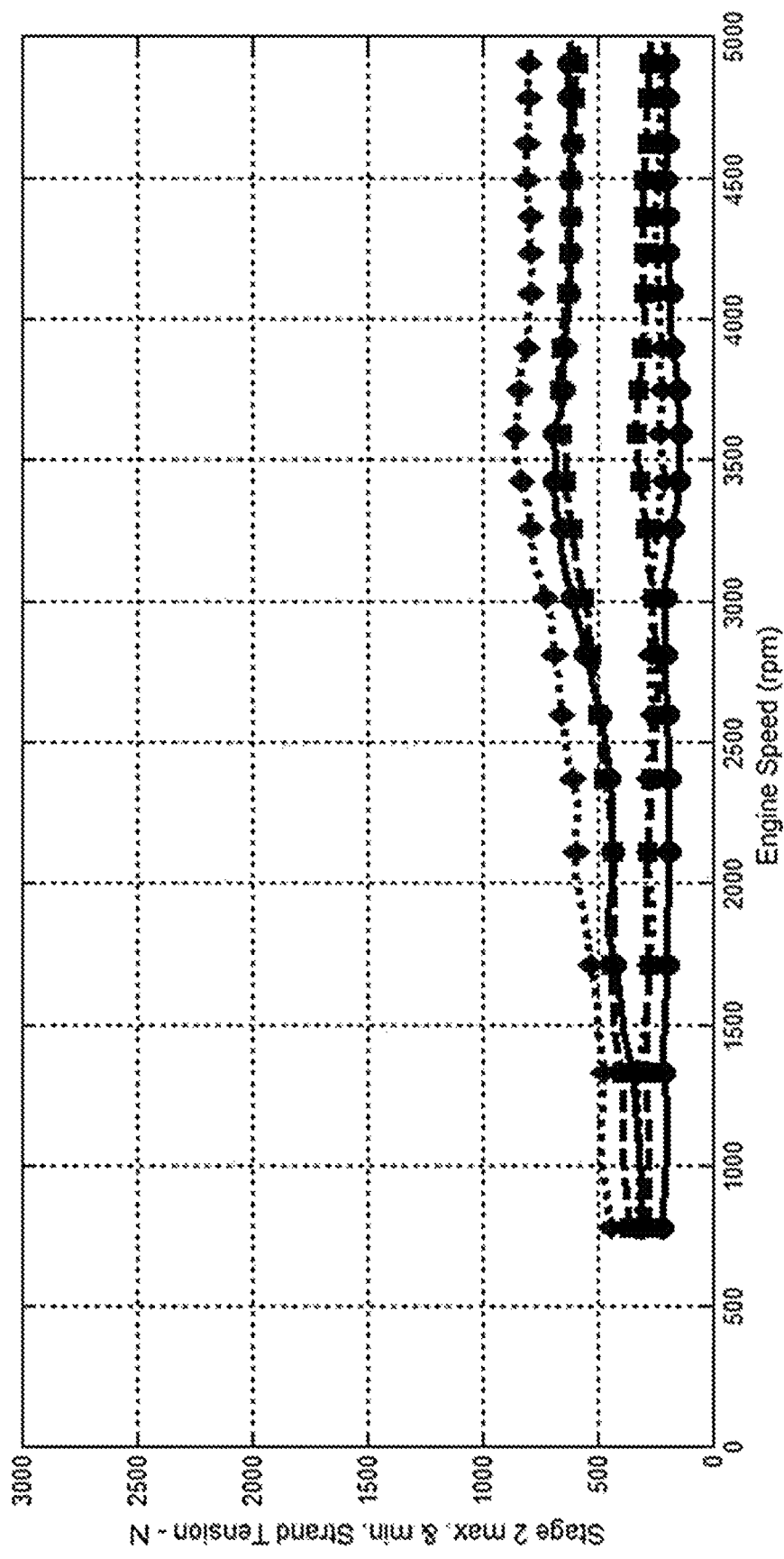
Figure 21C:
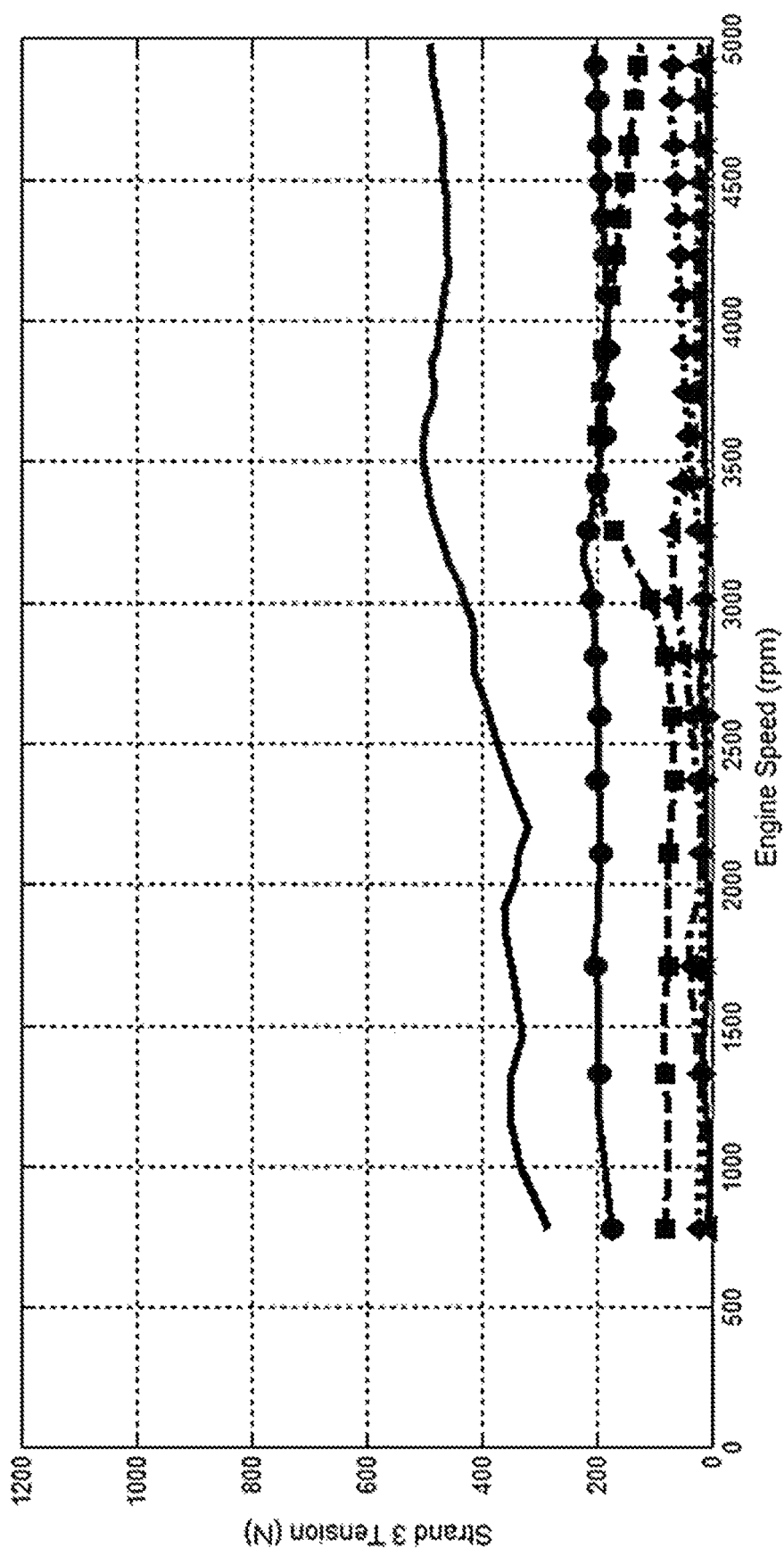
Figure 21D:
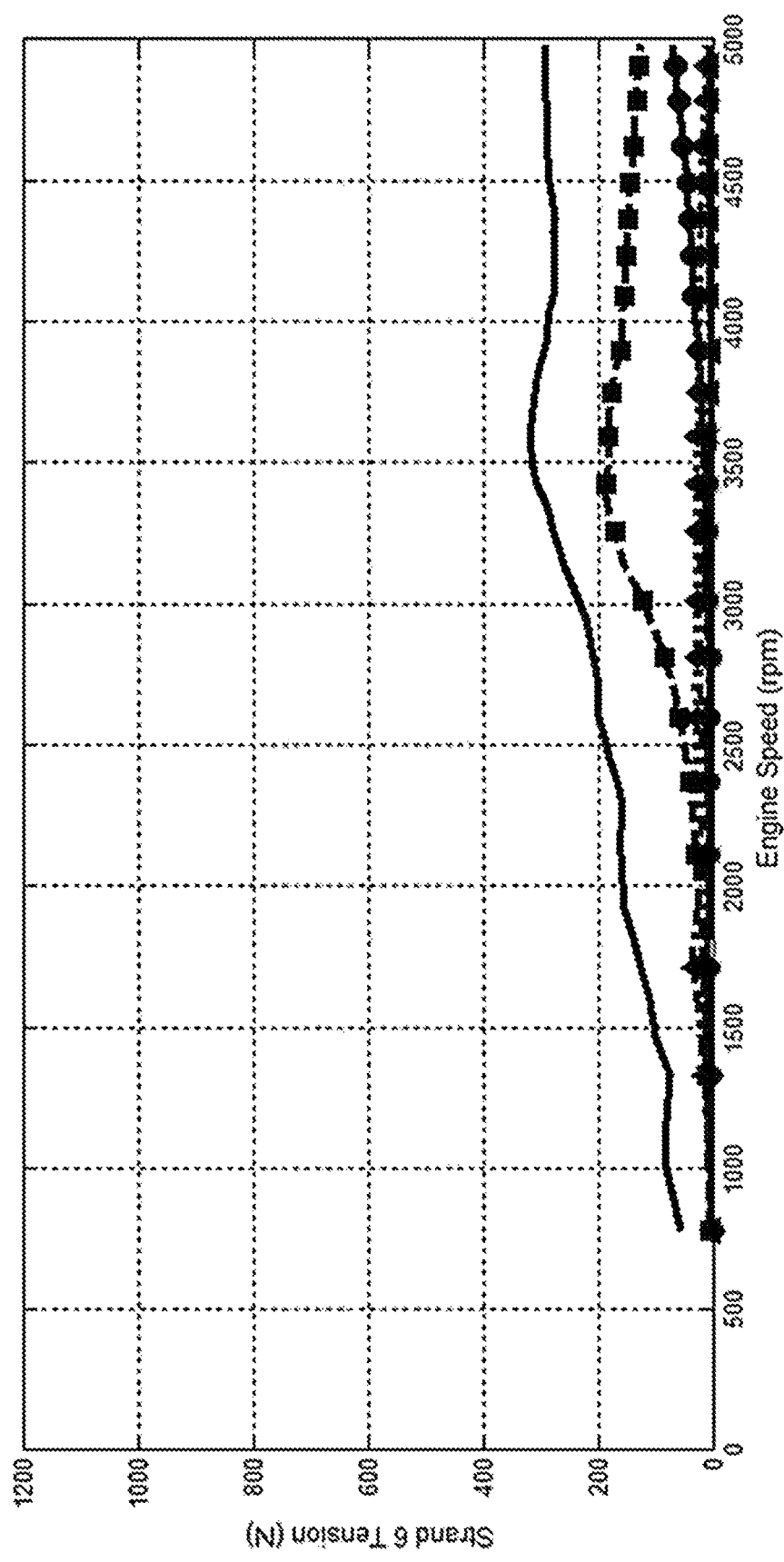
Figure 21E:
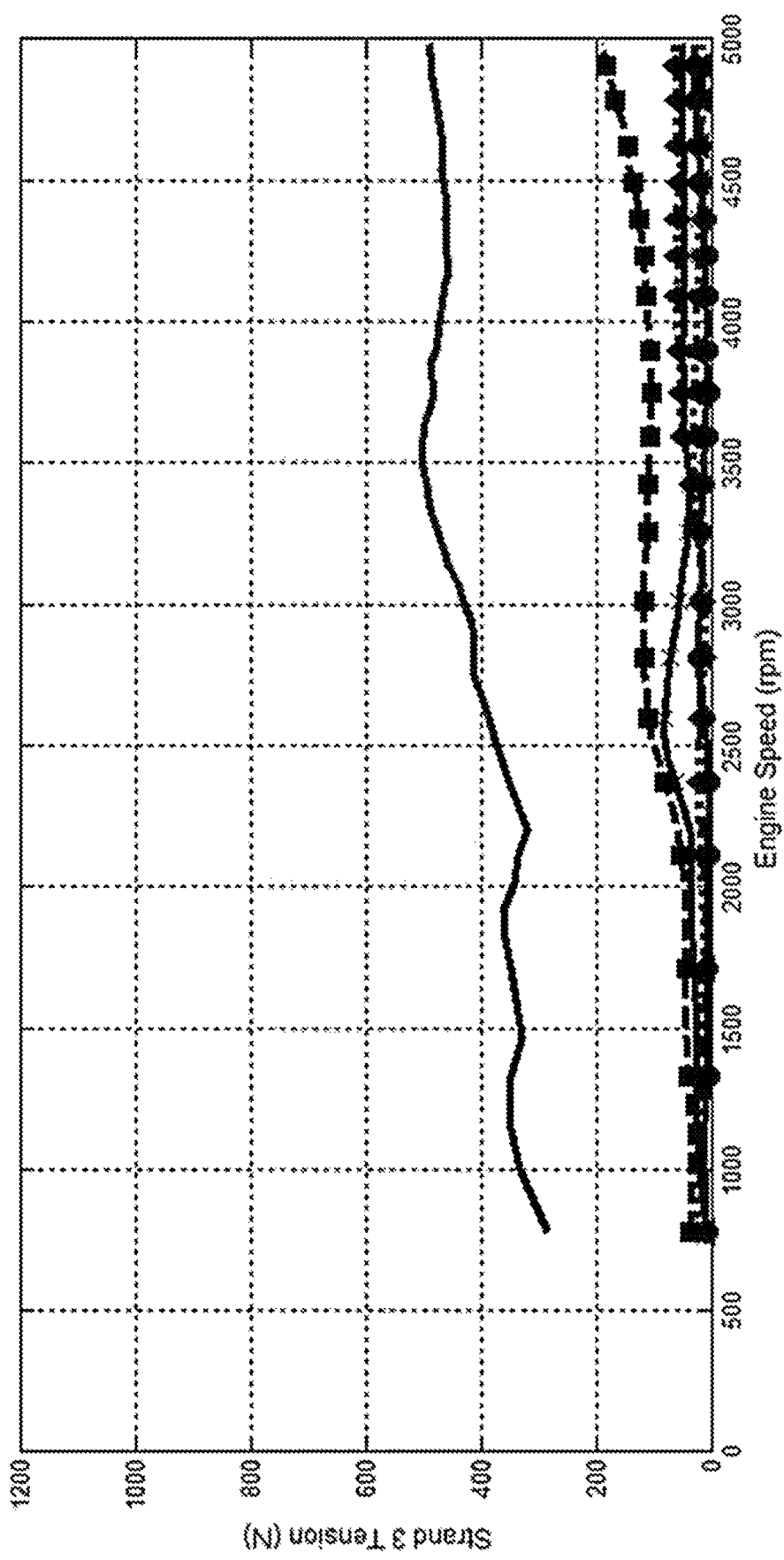
Figure 21F:
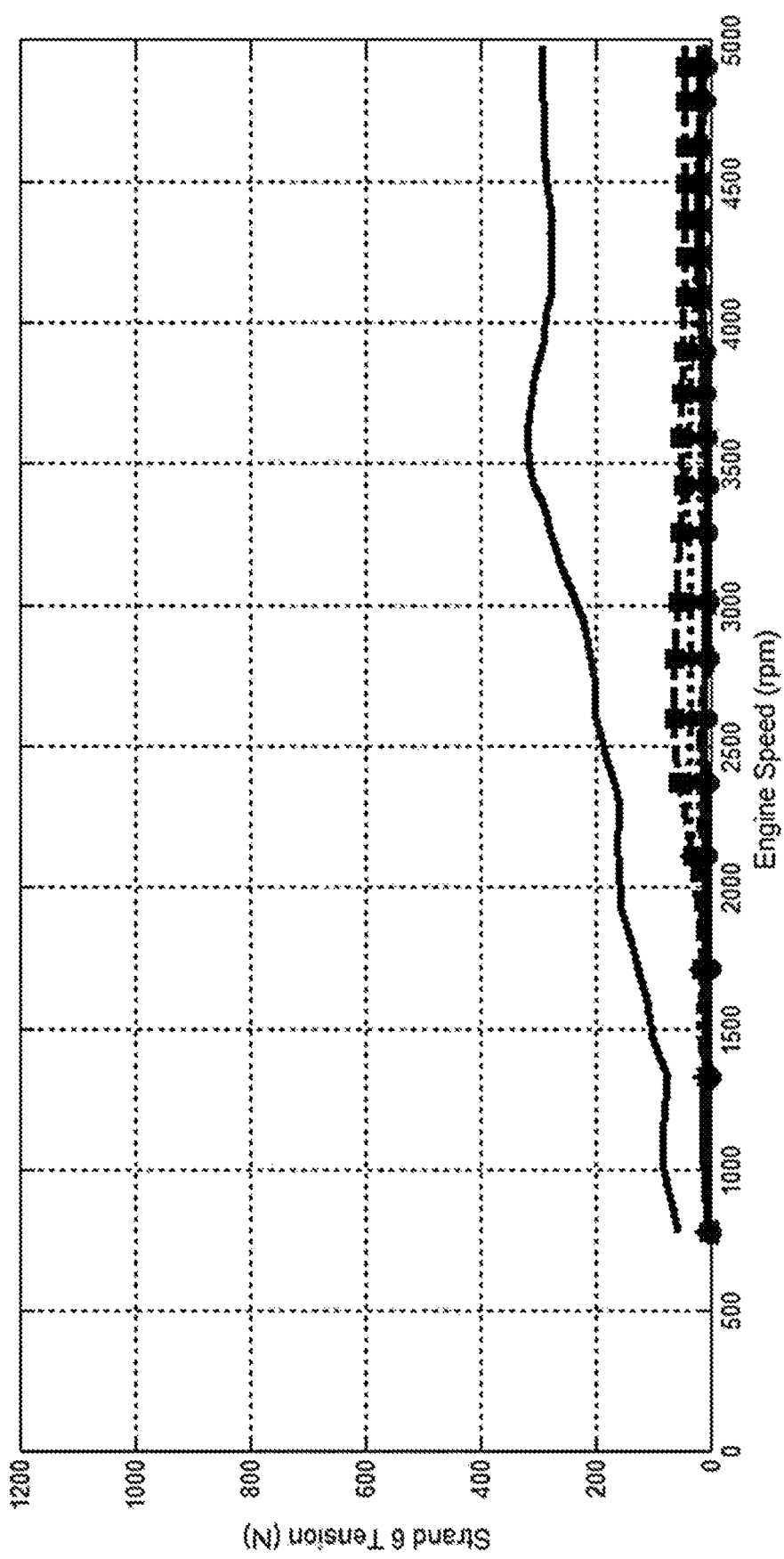
Figure 22A:
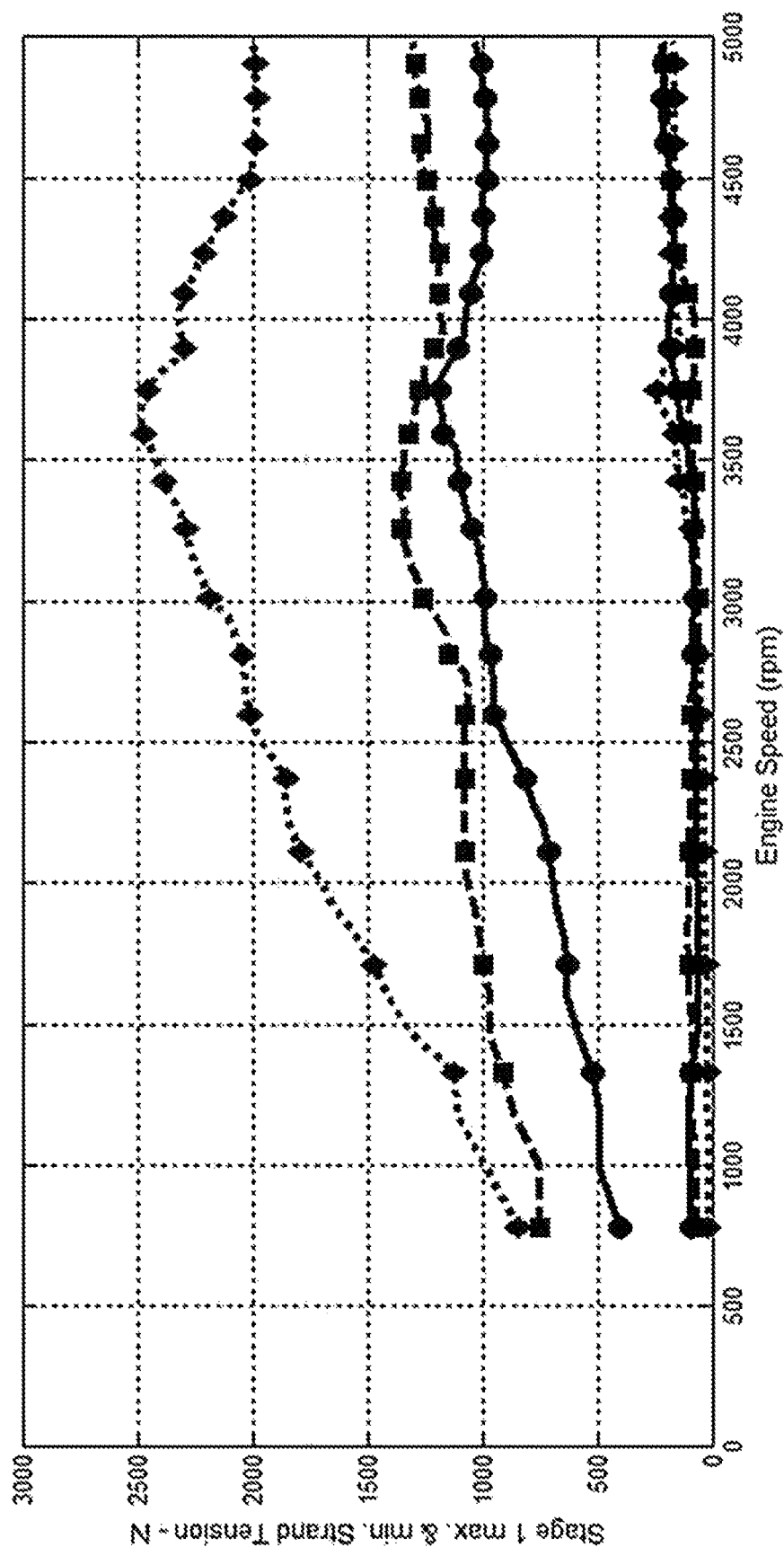
FIGS. 22a-22f show graphs for a system as shown in FIG. 1, with a combination of NPO sprockets and tension reducing random sprockets and with external excitations.
Figure 22B:
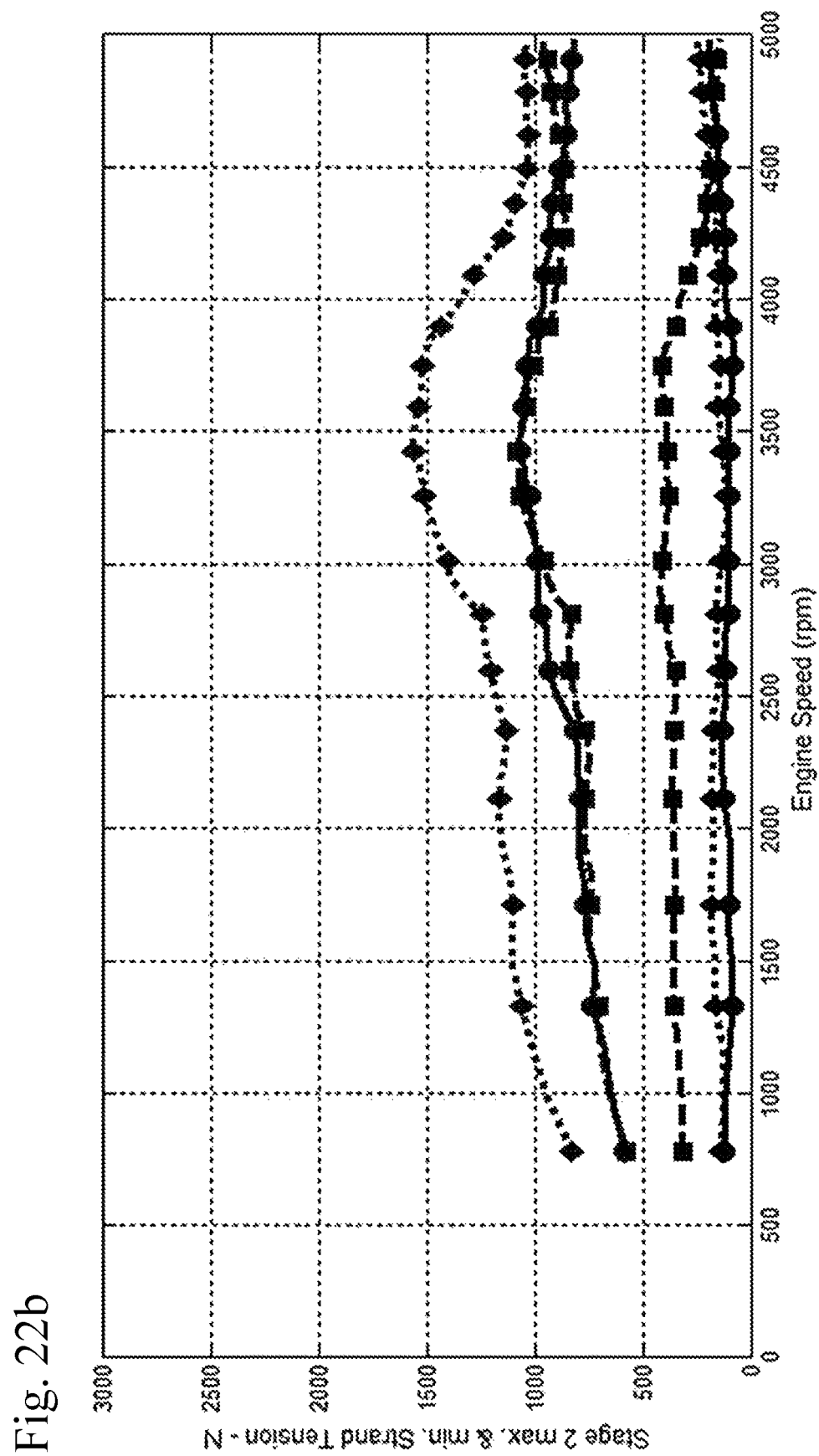
Figure 22C:
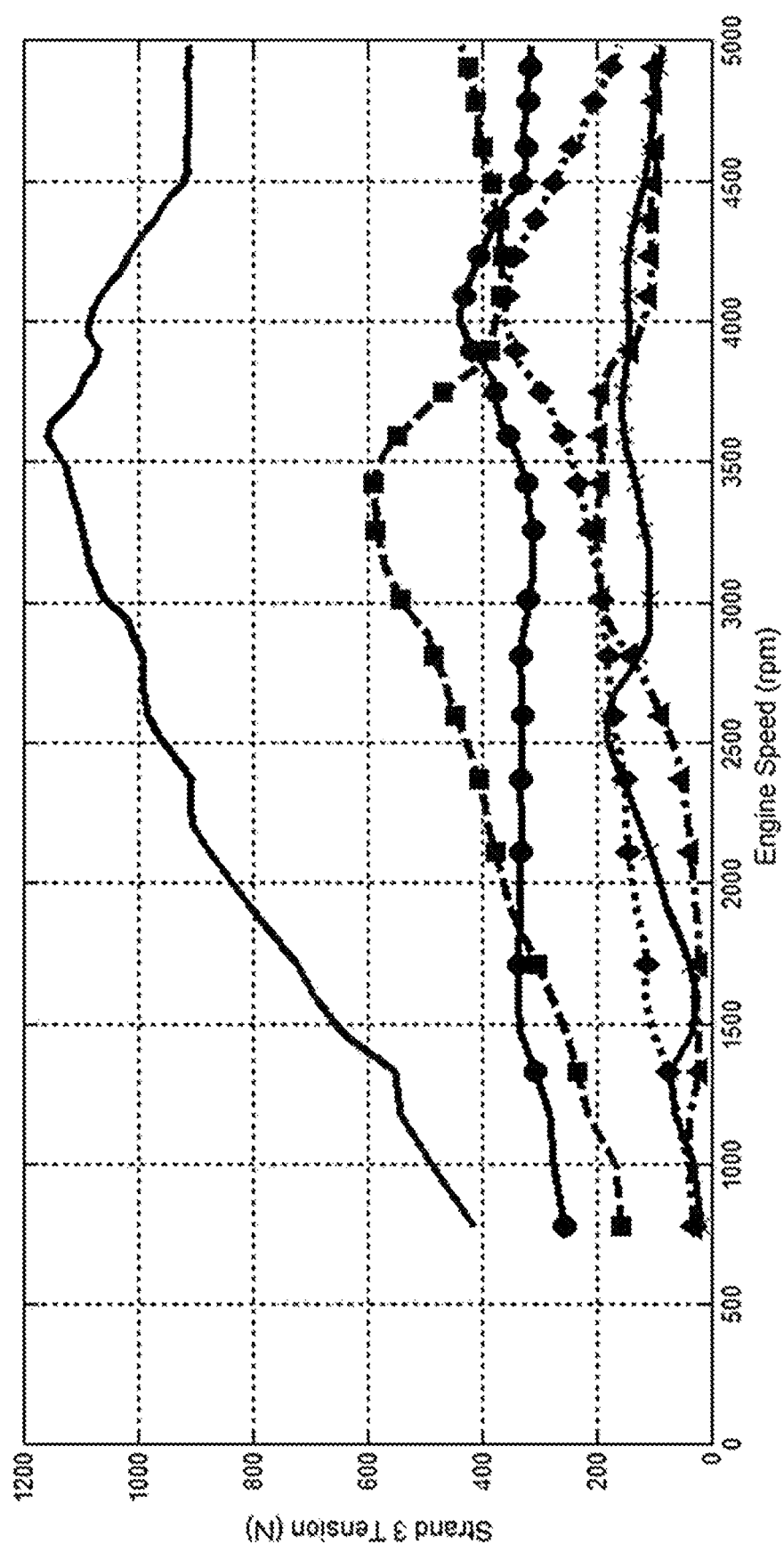
Figure 22D:
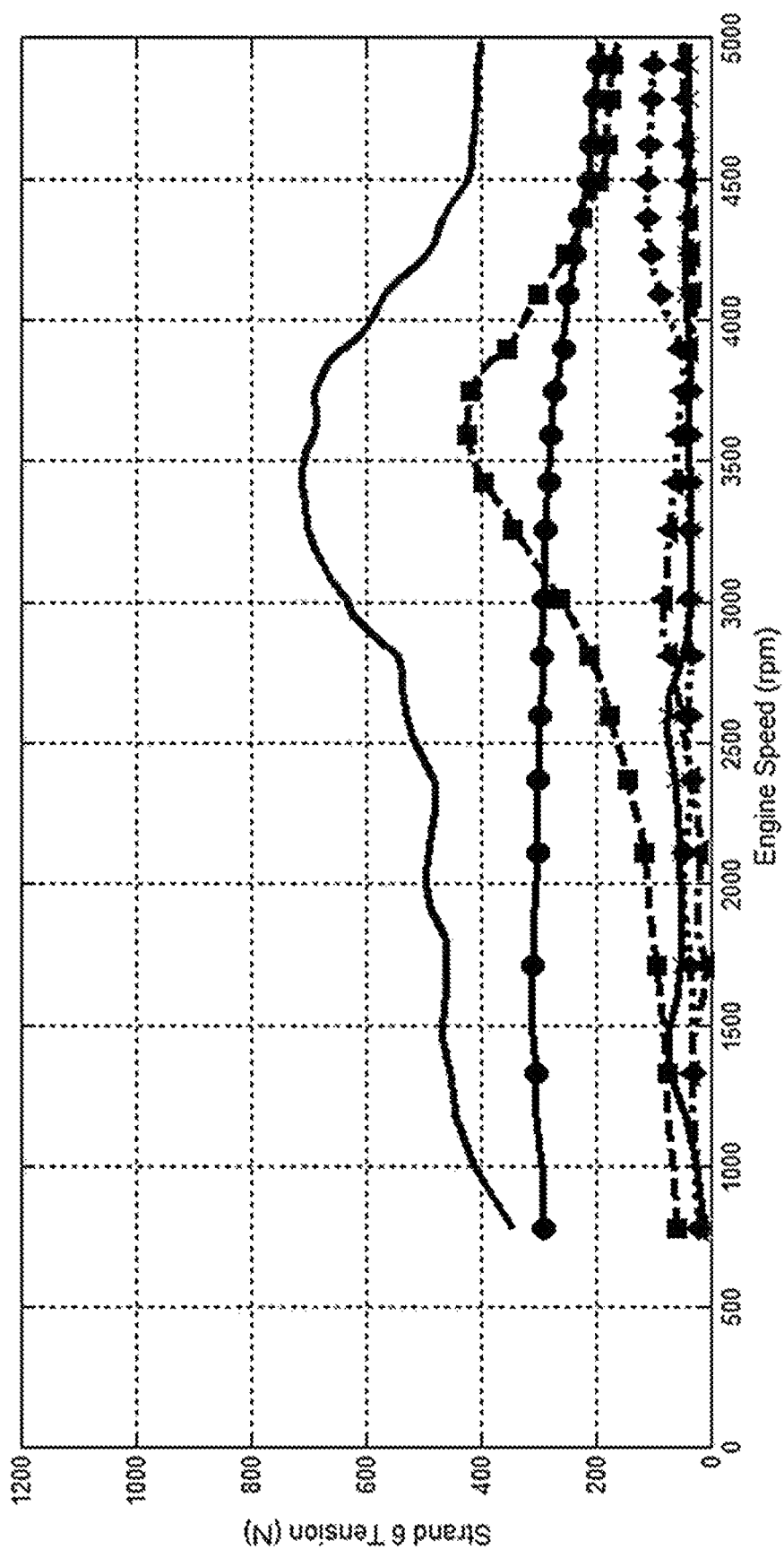
Figure 22E:
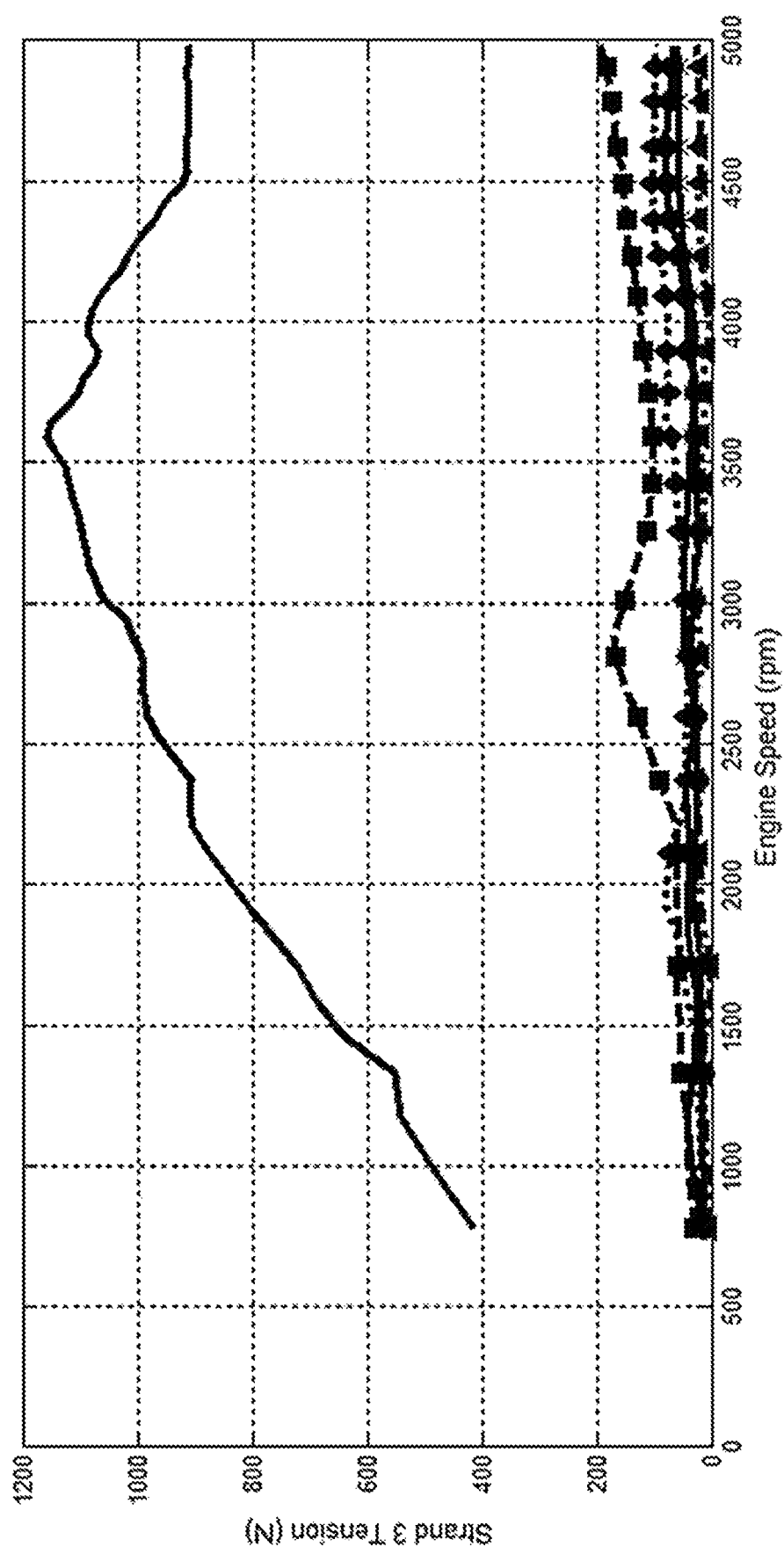
Figure 22F:
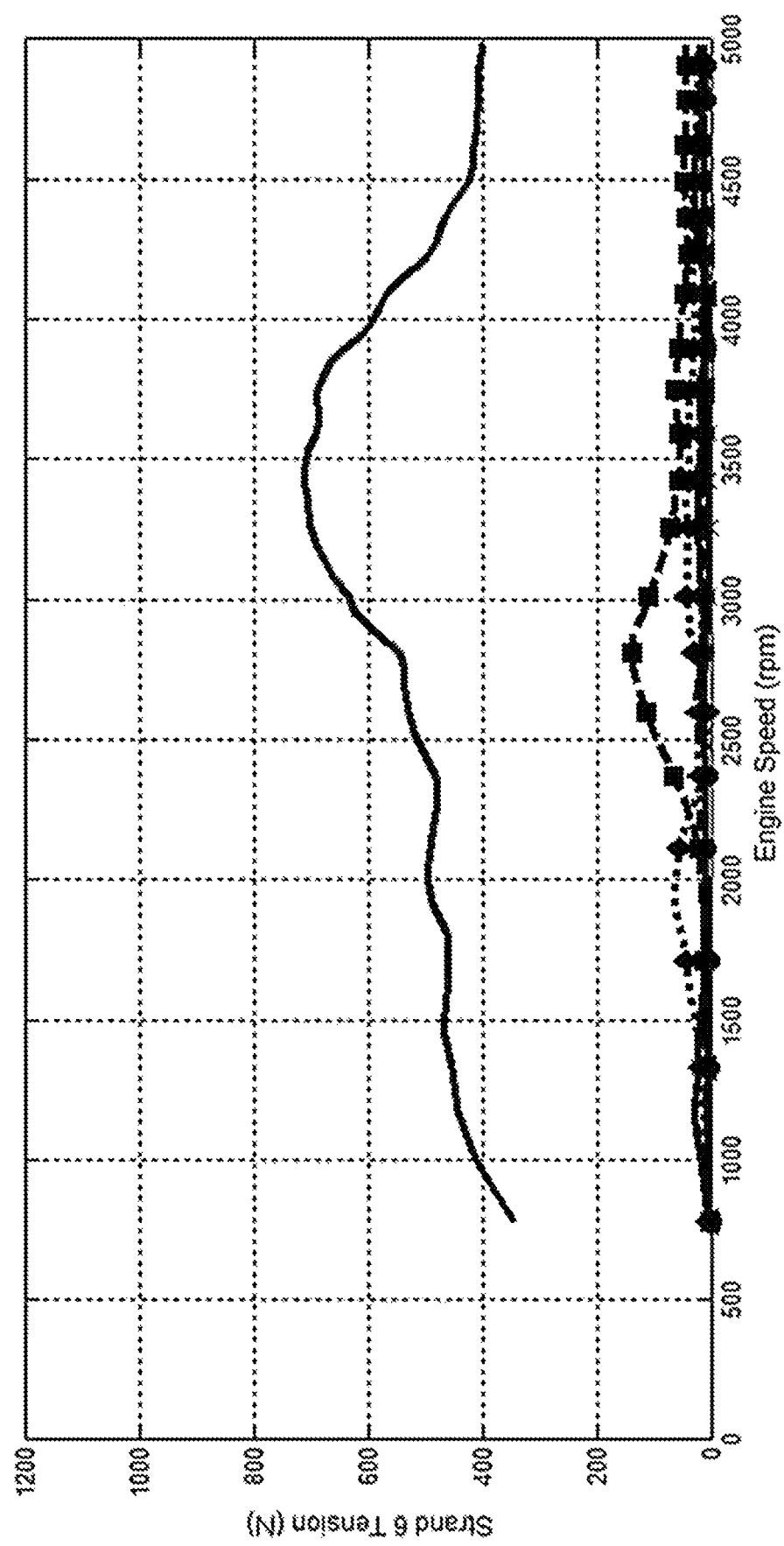

FIGS. 18a-18d shows how the tensions change with orientation of the traditional random sprockets (FIGS. 18a-18b) and the NPO random sprockets of the present application (FIGS. 18c-18d). As used in these figures, the term "orientation" means the angular position of the sprocket at the start of the engine cycle. The sprocket orientation can vary in one tooth increments.

With a traditional random sprocket there can be a large variation in maximum tensions due to sprocket orientation, as shown in FIGS. 18a-18b. Also, selecting an orientation that reduces tensions at some conditions is likely to increase tensions at other conditions. Therefore, when manufacturing or servicing an engine with traditional random sprockets, the manufacturer or mechanic needs to be very careful how the sprocket is assembled onto the shaft—taking a sprocket off and reinstalling it at a slight variation in orientation can result in major changes in chain tension. The tension variation with orientation for the NPO random sprocket is much smaller, providing an advantage for manufacturing and servicing of engines using the NPO sprockets.

FIGS. 19a-19f show an example of the tensions generated by a tension reducing random sprocket of the prior art, without considering external excitations. In this example the tension reducing random sprocket is designed to generate tensions at $4^{th}$ and $8^{th}$ engine cycle orders ($2^{nd}$ and $4^{th}$ fuel pump sprocket orders). Under the conditions considered, the $8^{th}$ engine cycle order excites the chain drive torsional resonance in a range between 3000-4000 RPM.

Sprocket orientation is very important for tension reducing random sprockets. The tensions generated by the tension reducing random sprocket must be timed to have the opposite phase relative to the baseline tensions—when the baseline tensions are high, the tensions from the tension reducing random sprocket must be low, and vice versa.

FIGS. 20a-20f show the effect of the tension reducing random sprocket when combined with the external excitations. The maximum tensions in strands 1, 2, 4, 5, and 6 are significantly reduced from those using the traditional random sprocket shown in FIGS. 15a-15f, while the strand 3 maximum tension is reduced a smaller amount.

The NPO random sprocket pattern made up of odd fuel pump sprocket orders of the present application can be combined with the $2^{nd}$ and $4^{th}$ fuel pump sprocket orders of the tension reducing random sprocket of the prior art to combine the benefits of each. The tensions generated by just the sprocket are shown in FIGS. 21a-21f and the result when combined with external excitations is shown in FIGS. 22a-22f.

Figure 23:
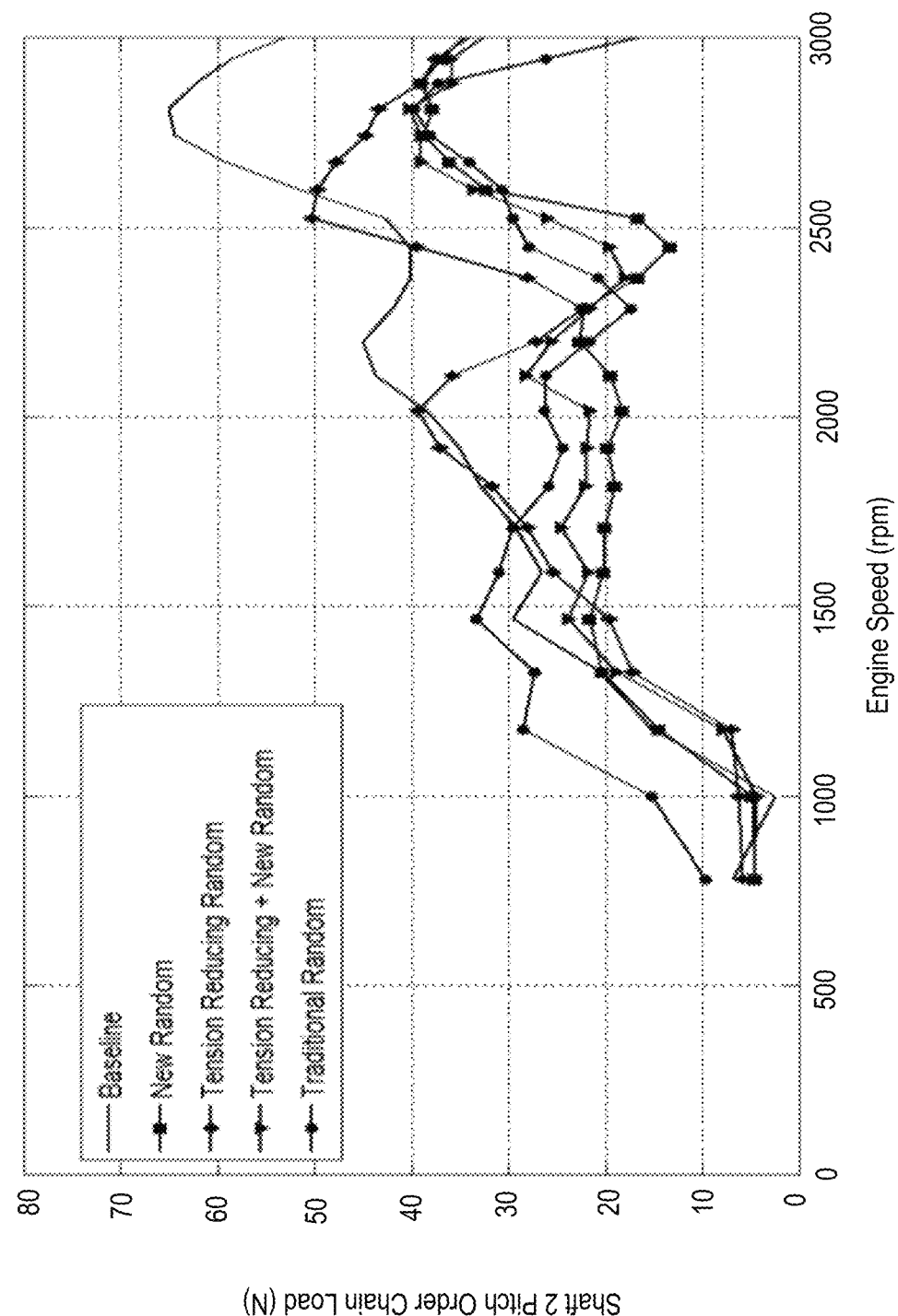
FIG. 23 is a graph of chain load vs engine RPM for a system as shown in FIG. 1, showing straight sprockets, traditional random sprockets, tension reducing random sprockets, NPO random sprockets and a combination of NPO random and tenstion reducing random sprockets.

As can be seen in FIG. 23, the noise improvement of the new random sprocket pattern is gained with almost no increase in chain tensions. Note that because this design includes the tension reducing orders, the combined NPO random and tension reducing random sprocket must be oriented correctly relative to the engine cycle.

FIG. 23 shows engagement order chain force on the fuel pump sprocket. This is a measure of the system noise characteristics. In this example, suppose the noise of concern occurs when the engine is operated in the 1500 to 2500 RPM range.

The traditional random sprocket (trace with circles) does not show an improvement below 1700 RPM, but does show a significant improvement above 1700 RPM. The acceptability of this will depend largely on what frequencies are amplified and attenuated in the noise path from the chain to the listener. The tension reducing random sprocket (trace with diamonds) shows some improvement in certain speed ranges.

The NPO random sprocket of the present application (trace with squares) shows a significant improvement, starting around 1400 RPM, and between about 1400 RPM and and about 2200 RPM it is the least noisy. Combining the NPO random and the tension reducing random sprocket (trace with triangles) gives noise results similar to the NPO random sprocket.

Table 1 shows the orders, amplitudes and phases used to construct the radial variation patterns for the example NPO random and tension reducing random sprockets. The traditional random sprocket is not included because the pattern is not generated based on order content. The radial variation is calculated using $$\Delta R = \Delta R_p + A_{n1} \times \sin(n1 \times \Theta + \phi_{n1}) + A_{n2} \times \sin(n2 \times \Theta + \phi_{n2}) + A_{n3} \times \sin(n3 \times \Theta + \phi_{n3}) + \ldots$$

Where: $A_n$=amplitude for order 1, 2, 3, . . . .
$\phi_n$=phase for order 1, 2, 3, . . . .
$\Theta$=sprocket angle
n*=sprocket order for order 1, 2, 3, . . . .
$\Delta R_p$=pitch radius mean shift A pitch radius mean shift is included to maintain a constant pitch length between all seated pin positions. For the NPO random sprocket orders, the phase, like the sprocket orientation, has only a minor impact on the resulting chain tensions.

TABLE 1

| NPO Random | Sprocket Order | 3 | 5 | 7 | 9 | 11 |
|---|---|---|---|---|---|---|
| | Amplitude (mm) | 0.2 | 0.2 | 0.2 | 0.2 | 0.2 |
| | Phase (deg) | 0 | 60 | 0 | 60 | 0 |

TABLE 1-continued

| Tension Reducing Random | Sprocket Order | 2 | 4 | | | | |
|---|---|---|---|---|---|---|---|
| | Amplitude (mm) | 0.25 | 0.3 | | | | |
| | Phase (deg) | 0 | 15 | | | | |
| NPO Random + Tension Reducing Random | Sprocket Order | 2 | 4 | 3 | 5 | 7 | 9 | 11 |
| | Amplitude (mm) | 0.25 | 0.3 | 0.15 | 0.15 | 0.15 | 0.15 | 0.15 |
| | Phase (deg) | 0 | 15 | 30 | 45 | 60 | 75 | 90 |

Table 2 shows a table of radial variation and angular variation for a traditional random sprocket for each sprocket root around the sprocket. Angular variation must be included to keep the pitch length between seated pin centers constant. The far right column contains numbers assigned to each pitch radius variation. One is the highest radial variation, two is the next highest radial variation and so on. In this case there are only three different radial variations. A typical traditional random sprocket only uses a few fixed radial variation values. The numbers in the far right column are referred to as the sprocket pattern. In a traditional random sprocket, repetition in the pattern is avoided.

TABLE 2

| | Traditional Random | | |
|---|---|---|---|
| Root Number | Radial Variation (m) | Angular Variation (deg) | Pattern |
| 1 | −0.00003724 | 0.00000000 | 2 |
| 2 | 0.00056276 | −0.13710377 | 1 |
| 3 | 0.00056276 | −0.36622326 | 1 |
| 4 | 0.00056276 | −0.59534276 | 1 |
| 5 | −0.00003724 | −0.73244652 | 2 |
| 6 | −0.00063724 | −0.62141636 | 3 |
| 7 | −0.00003724 | −0.51038620 | 2 |
| 8 | −0.00003724 | −0.49497202 | 2 |
| 9 | −0.00063724 | −0.38394186 | 3 |
| 10 | −0.00063724 | −0.11573631 | 3 |
| 11 | −0.00003724 | −0.00470615 | 2 |
| 12 | 0.00056276 | −0.14180991 | 1 |
| 13 | 0.00056276 | −0.37092941 | 1 |
| 14 | −0.00003724 | −0.50803318 | 2 |
| 15 | −0.00003724 | −0.49261900 | 2 |
| 16 | −0.00063724 | −0.38158884 | 3 |
| 17 | −0.00003724 | −0.27055868 | 2 |
| 18 | 0.00056276 | −0.40766244 | 1 |
| 19 | 0.00056276 | −0.63678194 | 1 |
| 20 | −0.00003724 | −0.77388571 | 2 |
| 21 | −0.00063724 | −0.66285554 | 3 |
| 22 | −0.00063724 | −0.39464999 | 3 |
| 23 | −0.00063724 | −0.12644444 | 3 |
| 24 | −0.00003724 | −0.01541428 | 2 |

Table 3 shows the radial variation and pattern for the example NPO random sprocket. The sprocket pattern contains many root radii and there are no regular repeating patterns. This will be true for most NPO random sprocket cases. However, depending on the orders being used and how they are phased, it is possible to have an NPO random sprocket with a regular repeating pattern.

TABLE 3

NPO Random

| Root Number | Radial Variation (m) | Angular Variation (deg) | Pattern |
|---|---|---|---|
| 1 | 0.00045216 | 0.00000000 | 1 |
| 2 | -0.00014849 | -0.09191165 | 14 |
| 3 | -0.00022102 | -0.01556084 | 16 |
| 4 | -0.00027698 | 0.08784889 | 17 |
| 5 | 0.00035263 | 0.03982474 | 4 |
| 6 | -0.00052479 | 0.01229768 | 20 |
| 7 | -0.00020601 | 0.15653050 | 15 |
| 8 | 0.00033360 | 0.10642216 | 5 |
| 9 | -0.00014650 | 0.04903780 | 14 |
| 10 | 0.00042817 | -0.03587976 | 3 |
| 11 | -0.00004409 | -0.13300690 | 13 |
| 12 | -0.00027728 | -0.07073505 | 17 |
| 13 | -0.00054637 | 0.09551772 | 21 |
| 14 | 0.00006078 | 0.16622696 | 10 |
| 15 | 0.00012561 | 0.12745052 | 9 |
| 16 | 0.00018183 | 0.06390381 | 7 |
| 17 | -0.00044885 | 0.08664837 | 19 |
| 18 | 0.00043023 | 0.02718861 | 2 |
| 19 | 0.00013455 | -0.09575846 | 8 |
| 20 | -0.00043694 | -0.05980716 | 18 |
| 21 | 0.00005215 | 0.00050452 | 11 |
| 22 | -0.00052388 | 0.07135210 | 20 |
| 23 | -0.00004314 | 0.17045394 | 12 |
| 24 | 0.00018644 | 0.13658762 | 6 |

Table 4 shows the radial variation and pattern for the example tension reducing random sprocket. The tension reducing sprocket contains a pattern that repeats twice. Note that tension reducing random sprockets often contain patterns that substantially repeat—but this is not necessary.

TABLE 4

Tension Reducing Random

| Root Number | Radial Variation (m) | Angular Variation (deg) | Pattern |
|---|---|---|---|
| 1 | 0.00038923 | 0.00000000 | 2 |
| 2 | 0.00050651 | -0.18402762 | 1 |
| 3 | 0.00027312 | -0.34789208 | 3 |
| 4 | -0.00015029 | -0.38787539 | 8 |
| 5 | -0.00043365 | -0.27278710 | 12 |
| 6 | -0.00037869 | -0.10319079 | 11 |
| 7 | -0.00011090 | -0.00718662 | 7 |
| 8 | 0.00007272 | -0.00204583 | 4 |
| 9 | 0.00001445 | -0.02032081 | 6 |
| 10 | -0.00016084 | 0.00748878 | 9 |
| 11 | -0.00018517 | 0.07931510 | 10 |
| 12 | 0.00005801 | 0.10080725 | 5 |
| 13 | 0.00038923 | -0.00000001 | 2 |
| 14 | 0.00050651 | -0.18402763 | 1 |
| 15 | 0.00027312 | -0.34789209 | 3 |
| 16 | -0.00015029 | -0.38787540 | 8 |
| 17 | -0.00043365 | -0.27278710 | 12 |
| 18 | -0.00037869 | -0.10319080 | 11 |
| 19 | -0.00011090 | -0.00718663 | 7 |
| 20 | 0.00007272 | -0.00204584 | 4 |
| 21 | 0.00001445 | -0.02032082 | 6 |
| 22 | -0.00016084 | 0.00748877 | 9 |
| 23 | -0.00018517 | 0.07931510 | 10 |
| 24 | 0.00005801 | 0.10080724 | 5 |

Table 5 shows the radial variation and pattern for the example NPO random+tension reducing random sprocket. Like the NPO random sprocket, there are few, if any, radial variations that repeat. There is no repetition in the pattern. Pattern repetition in a combined NPO random and tension reducing random sprocket is highly unlikely.

TABLE 5

NPO Random + Tension Reducing Random

| Root Number | Radial Variation (m) | Angular Variation (deg) | Pattern |
|---|---|---|---|
| 1 | 0.00043712 | 0.00000000 | 4 |
| 2 | 0.00036833 | -0.16506344 | 5 |
| 3 | 0.00048720 | -0.34100703 | 2 |
| 4 | -0.00006821 | -0.45221964 | 14 |
| 5 | -0.00024039 | -0.39058046 | 17 |
| 6 | -0.00067213 | -0.21495299 | 22 |
| 7 | -0.00047945 | 0.02388610 | 21 |
| 8 | -0.00001873 | 0.11011456 | 12 |
| 9 | 0.00044284 | 0.00562428 | 3 |
| 10 | -0.00048038 | -0.05647269 | 21 |
| 11 | -0.00002469 | 0.03157918 | 13 |
| 12 | 0.00016577 | -0.00048956 | 8 |
| 13 | 0.00028252 | -0.09370295 | 6 |
| 14 | 0.00059376 | -0.28052046 | 1 |
| 15 | 0.00000646 | -0.43157742 | 11 |
| 16 | -0.00028560 | -0.38064430 | 18 |
| 17 | -0.00067748 | -0.19157652 | 23 |
| 18 | -0.00013636 | -0.04562900 | 16 |
| 19 | 0.00020302 | -0.06880547 | 7 |
| 20 | 0.00012111 | -0.13606274 | 9 |
| 21 | -0.00046899 | -0.09241800 | 20 |
| 22 | 0.00010597 | -0.04416562 | 10 |
| 23 | -0.00039885 | -0.00429549 | 19 |
| 24 | -0.00010176 | 0.09265492 | 15 |

Figure 24:
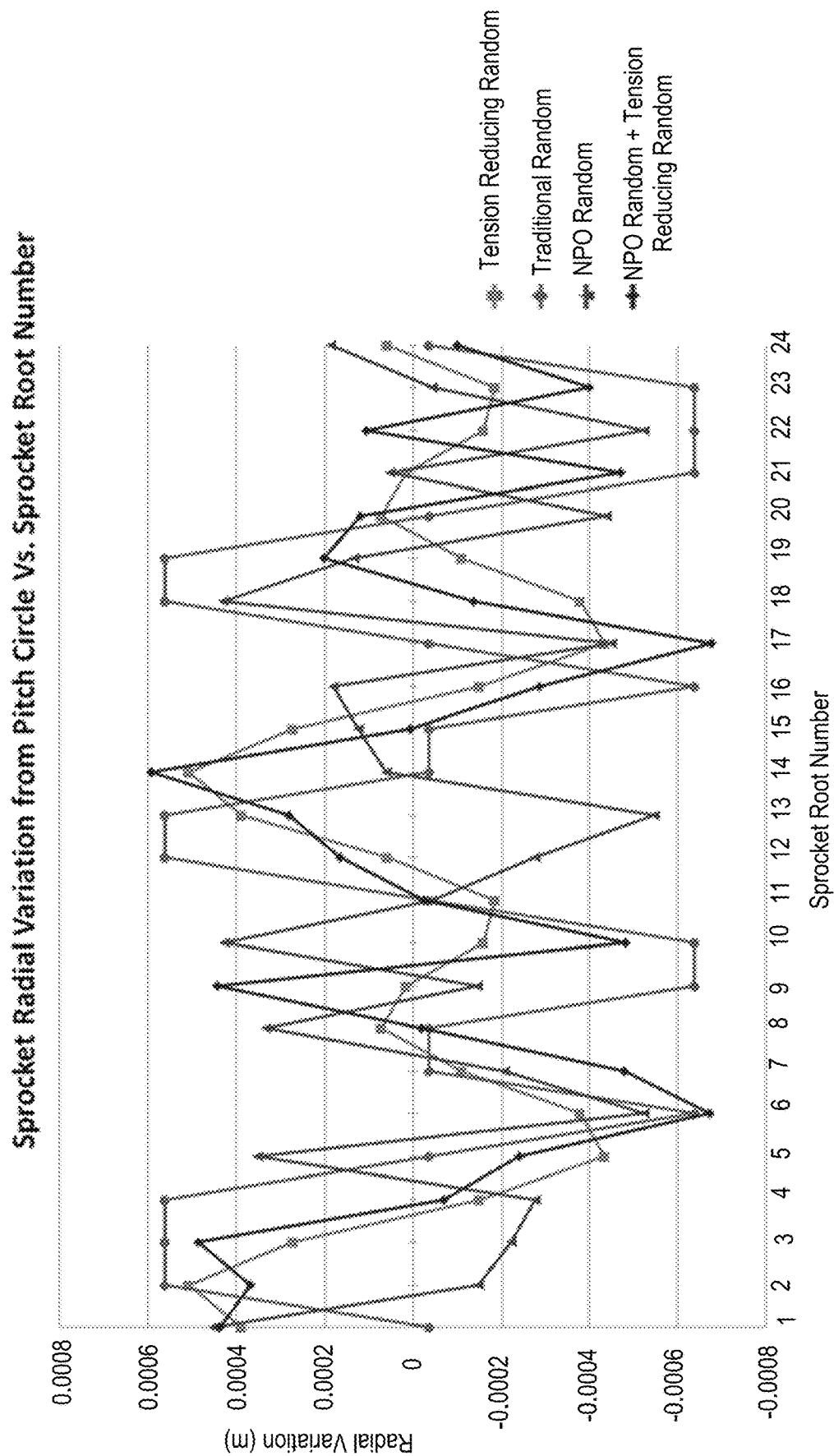
FIG. 24 is a graph of sprocket radial variation vs root number for straight sprockets, traditional random sprockets, tension reducing random sprockets, NPO random sprockets and a combination of NPO random and tenstion reducing random sprockets.

FIG. 24 contains a plot comparing the radial variation versus sprocket root number for the example sprockets. This shows the repetition in the tension reducing random sprocket and the lack of repetition in the other sprockets. It also shows the few discrete radial variations used in a traditional random sprocket.

The engine cycle orders that can be used for a new random sprocket will vary depending on the engine configuration. The sprocket orders that can be used for an NPO random sprocket will depend on the speed ratio between the crank and the new random sprocket. Table 6 shows examples of engine cycle orders which can be used for an NPO random sprocket:

TABLE 6

| Engine Type | Engine Cycle Orders |
|---|---|
| 2 Cylinder Engine | 1, 3, 5, 7, 9, . . . |
| 3 Cylinder Engine | 1, 2, 4, 5, 7, 8, . . . |
| Inline 4 Cylinder Engine | 1, 2, 3, 5, 6, 7, 9, . . . |
| Inline 5 Cylinder Engine | 1, 2, 3, 4, 6, 7, 8, 9, 11, . . . |
| Inline 6 Cylinder Engine | 1, 2, 3, 4, 5, 7, 8, 9, 10, 11, 13, . . . |
| V6 Single Bank | 1, 2, 4, 5, 7, 8, . . . |
| V6 Serpentine | 1, 2, 3, 4, 5, 7, 8, 9, 10, 11, 13, . . . |
| Standard-firing V8 Single Bank | 2, 4, 6, 10, 12, 14, 15, . . . |
| V8 Serpentine | 1, 2, 3, 4, 5, 6, 7, 9, 10, 11, 12, 13, 14, 15, 17, . . . |
| Alternating banks V8 Single bank | 1, 2, 3, 5, 6, 7, 9, . . . |

These orders may change if the engine has a fuel pump that does not have torques that are dominated by firing order and/or its harmonics. In some cases there may be additional orders that should not be used due to orders in the crank torsional vibrations that are not firing order or its harmonics.

If the NPO random sprocket rotates at crank speed, the sprocket orders that can be used will be the above orders times two. If the NPO random sprocket rotates at cam speed (half crank speed), the sprocket orders will be the same as the orders above. Likewise, if other speed ratios are used, the sprocket orders that can be used will be twice the orders above times the ratio of the NPO random sprocket speed over the crank sprocket speed.

Figure 25:
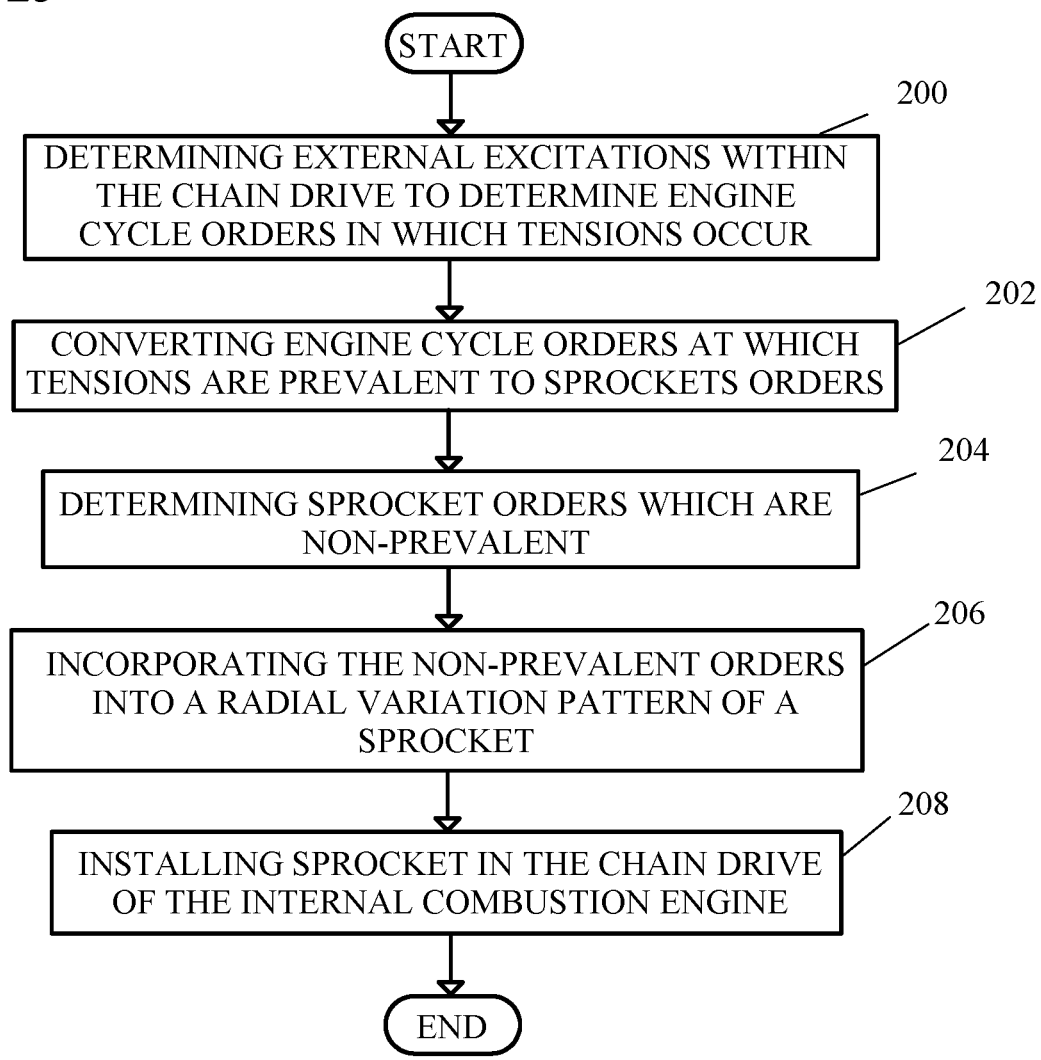
FIG. 25 is a flowchart of a method of reducing tensions using NPO random sprockets.

FIG. 25 is a flowchart of a method of reducing engagement noise without increasing maximum chain tensions using NPO random sprockets.

In a first step, external excitations within the chain drive are determined to determine engine cycle orders in which tensions occur (step 200). Alternatively, excitations can be applied to the chain drive in order to determine the tensions and then determine the prevalent engine cycle order(s).

Engine cycle orders at which tensions are prevalent within the chain drive are converted into sprocket orders (step 202). For example, sprocket orders are half as much as engine cycle orders. So, a fourth engine cycle order is a second crank sprocket order.

The orders which are non-prevalent are determined (step 204). These are the orders which were not discovered in steps 200-202.

The non-prevalent orders are incorporated into the radial variation pattern of a sprocket (step 206) to create a non-prevalent order (NPO) sprocket. The amplitude of the non-prevalent orders determines the tensions that will be introduced into the chain drive and corresponds to the radial variation pattern of the sprocket. In a preferred embodiment, non-prevalent orders chosen are less than half of the number of teeth of the sprocket and first and second orders are typically avoided, since orders above half the number of sprocket teeth are aliased and appear as lower orders. Low orders, like the first and the second orders, typically have little impact on engagement noise because they do not cause enough change in engagement timing and is why there is not much reduction in engagement noise with tensioner reducing random sprockets.

The non-prevalent order (NPO) sprocket is installed in the chain drive of the internal combustion engine (step 208) and the method ends.

It should be noted that that while the chain drive system described above refer to camshafts, fuel pumps, etc., the NPO sprocket of the invention is equally useful with other engine accessories and components driven by a chain, such as balance shafts or water pumps, etc.

It should also be noted that while the description above is in the context of internal combustion engines, the NPO sprocket of the invention can also be used with other chain applications such as transmissions, transfer cases, hybrid drives, and so on. It will be understood that the NPO concept can be applied to any chain-driven system that has excitations at specific orders or interactions with other systems at specific orders (creating orders than need to be avoided in the random pattern).

It should also be noted that the term "sprocket" includes the pulleys used in toothed belt driven systems.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A non-prevalent order random sprocket for chain-driven or belt-driven systems that have excitations or interactions at specific orders, comprising:
a pattern of pitch radii, such that the radial variation of the pitch radii excite tensions only at orders which are not prevalent in the specific orders of the excitations or interactions of the chain-driven system.

2. A chain drive or belt drive for an internal combustion engine having a crankshaft having a driving sprocket and at least one driven sprocket, comprising:
a) at least one of the driving sprocket or the at least one driven sprocket being a non-prevalent order random sprocket, comprising: a pattern of pitch radii, such that the radial variation of the pitch radii excite tensions at non-prevalent orders in a drive system of the internal combustion engine; and
b) a chain engaging the driving sprocket and the at least one driven sprocket.

3. The chain drive or belt drive of claim 2, in which the internal combustion engine further comprises at least one accessory having an accessory sprocket, and the chain engages the accessory sprocket.

4. The chain drive or belt drive of claim 3, in which the accessory is a fuel pump.

5. The chain drive or belt drive of claim 3, in which the accessory sprocket is a non-prevalent order random sprocket, comprising: a pattern of pitch radii, such that the radial variation of the pitch radii excite tensions only at orders which are not prevalent in the specific orders of the excitations or interactions of the drive system.

6. The chain drive or belt drive of claim 5, in which at least one of the driving sprocket or the at least one driven sprocket is a tension reducing random sprocket.

7. The chain drive or belt drive of claim 2, in which at least one of the driving sprocket or the at least one driven sprocket is a tension reducing random sprocket.

8. The chain drive or belt drive of claim 2, wherein the at least one driven sprocket is on a camshaft of the internal combustion engine.

9. The chain drive or belt drive of claim 2, wherein the at least one driven sprocket is on a balance shaft of the internal combustion engine.

10. A chain drive or belt drive for an internal combustion engine having a crankshaft having a driving sprocket and at least one camshaft having a driven sprocket and at least one accessory having an accessory sprocket, comprising:
a) at least one of the driving sprocket or the at least one driven sprocket or the at least one accessory sprocket being a non-prevalent order random sprocket, comprising: a pattern of pitch radii, such that the radial variation of the pitch radii excite tensions only at orders which are not prevalent in the specific orders of the excitations or interactions of a drive system of the internal combustion engine; and
b) a chain engaging the driving sprocket and the at least one driven sprocket and the at least one accessory sprocket.

11. The chain drive or belt drive of claim 10, in which at least one of the driving sprocket or the at least one driven sprocket or the at least one accessory sprocket is a tension reducing random sprocket.

12. The chain drive or belt drive of claim 10, in which the accessory is a fuel pump.

13. A method of reducing engagement noise in a chain drive or belt drive for an internal combustion engine having a crankshaft having a driving sprocket and at least one shaft having a driven sprocket, comprising the steps of:
determining external excitations within the chain drive to determine engine cycle orders at which tensions occur;
converting engine cycle orders at which tensions are prevalent to sprocket orders;
determining sprocket orders which are non-prevalent;
incorporating at least one of the non-prevalent orders into a radial variation pattern of a sprocket; and installing sprocket in the chain drive or belt drive of the internal combustion engine.

14. The method of claim 13, further comprising a tension reducing sprocket within the chain drive of the internal combustion engine comprising a repeating pattern of pitch radii, such that the radial variation of the pitch radii excite tensions at non-prevalent orders in a drive system of the internal combustion engine.

\* \* \* \* \*